US012738271B2

(12) United States Patent
Xiao et al.

(10) Patent No.: US 12,738,271 B2
(45) Date of Patent: Sep. 15, 2026

(54) VOICE WAKEUP METHOD AND APPARATUS, STORAGE MEDIUM, AND SYSTEM

(71) Applicant: HUAWEI TECHNOLOGIES CO., LTD., Shenzhen (CN)

(72) Inventors: Longshuai Xiao, Beijing (CN); Yinan Zhen, Beijing (CN); Wenjie Li, Beijing (CN); Chao Peng, Beijing (CN); Zhanlei Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 18/474,968

(22) Filed: Sep. 26, 2023

(65) Prior Publication Data

US 2024/0029736 A1 Jan. 25, 2024

Related U.S. Application Data

(63) Continuation of application No. PCT/CN2022/083055, filed on Mar. 25, 2022.

(30) Foreign Application Priority Data

Mar. 31, 2021 (CN) ........................ 202110348176.6

(51) Int. Cl.
*G10L 15/00* (2013.01)
*G10L 15/02* (2006.01)
(Continued)

(52) U.S. Cl.
CPC .............. *G10L 15/22* (2013.01); *G10L 15/02* (2013.01); *G10L 15/063* (2013.01); *G10L 15/16* (2013.01);
(Continued)

(58) Field of Classification Search
CPC ......... G10L 15/16; G10L 25/27; G10L 25/30; G10L 19/005; G10L 19/00; G10L 15/12;
(Continued)

(56) References Cited

U.S. PATENT DOCUMENTS 11,564,036 B1 * 1/2023 Kamath Koteshwara .................. H04R 5/027
2018/0254040 A1 * 9/2018 Droppo .................. G10L 15/20
(Continued)

FOREIGN PATENT DOCUMENTS

CN 110277093 A 9/2019
CN 110875045 A 3/2020
(Continued)

OTHER PUBLICATIONS

Ji et al., "Integration of Multi-Look Beamformers for Multi-Channel Keyword Spotting," ICASSP 2020-2020 IEEE International Conference on Acoustics, Speech and Signal Processing (ICASSP), Barcelona, Spain, pp. 7464-7468, doi: 10.1109/ICASSP40776.2020.9054538 (May 4-8, 2020).
(Continued)

*Primary Examiner* — Vu B Hang
(74) *Attorney, Agent, or Firm* — Leydig, Voit & Mayer, Ltd.

(57) ABSTRACT

A method for voice wakeup is provided, which includes: obtaining original first microphone data; performing first-stage processing based on the first microphone data to obtain first wakeup data, wherein the first-stage processing includes first-stage separation processing and first-stage wakeup processing that are based on a neural network model; performing second-stage processing based on the first microphone data to obtain second wakeup data when the first wakeup data indicates that pre-wakeup succeeds, wherein the second-stage processing includes second-stage separation pro-
(Continued)

cessing and second-stage wakeup processing that are based on the neural network model; and determining a wakeup result based on the second wakeup data. According to this application, a two-stage separation and wakeup solution is designed, e.g., pre-wakeup determining is performed by using a first-stage separation and wakeup solution, and wakeup determining is performed again after pre-wakeup succeeds, to reduce a false wakeup rate while ensuring a high wakeup rate.

20 Claims, 29 Drawing Sheets

(51) Int. Cl.
*G10L 15/06* (2013.01)
*G10L 15/16* (2006.01)
*G10L 15/22* (2006.01)

(52) U.S. Cl.
CPC .. *G10L 2015/025* (2013.01); *G10L 2015/223* (2013.01)

(58) Field of Classification Search
CPC ....... G10L 15/063; G10L 15/02; G10L 15/07; G10L 15/20; G10L 15/22; G10L 15/26; G10L 15/30; G10L 15/08; G10L 21/0208; G10L 25/78; G10L 25/87; G10L 15/14; G10L 15/197; G10L 15/1815; G10L 2015/025; G10L 2015/088; G10L 2015/223; G10L 15/32
See application file for complete search history.

(56) References Cited

U.S. PATENT DOCUMENTS

2020/0012887 A1* 1/2020 Li ........................ G06F 18/2415
2020/0349927 A1* 11/2020 Stoimenov ........... G06N 3/0495
2022/0189471 A1* 6/2022 Sharifi .................... G10L 15/22

FOREIGN PATENT DOCUMENTS

CN 111223488 A 6/2020
CN 112289311 A 1/2021

OTHER PUBLICATIONS

Wang et al., "Wake Word Detection with Alignment-Free Lattice-Free MMI," arXiv:2005.08347v3 [eess.AS], total 5 pages (Jul. 28, 2020).
You et al., "Two-stage Strategy for Small-footprint Wake-up-word Speech Recognition System," 2020 International Joint Conference of Neural Networks (IJCNN), IEEE, XP033831820, total 6 pages (Jul. 19, 2020).

* cited by examiner

VOICE WAKEUP METHOD AND APPARATUS, STORAGE MEDIUM, AND SYSTEM

CROSS-REFERENCE TO RELATED APPLICATIONS

This application is a continuation of International Application No. PCT/CN2022/083055, filed on Mar. 25, 2022, which claims priority to Chinese Patent Application No. 202110348176.6, filed on Mar. 31, 2021. The disclosures of the aforementioned applications are hereby incorporated by reference in their entireties.

TECHNICAL FIELD

Embodiments of this application relate to the field of terminal technologies, and in particular, to a voice wakeup method and apparatus, a storage medium, and a system.

BACKGROUND

With the emergence of intelligent voice interaction, more electronic devices support a voice interaction function. As a start of voice interaction, voice wakeup is widely applied to different electronic devices, for example, a smart speaker box and a smart television. When an electronic device that supports voice wakeup exists in space in which a user is located, after the user makes a wakeup voice, the woken-up electronic device responds to a request of a speaker, and interacts with the user.

In a related technology, to improve a wakeup rate of an electronic device, multi-condition training may be performed on a wakeup module in the electronic device, and voice wakeup is performed by using a trained wakeup module; voice wakeup may be performed by using a microphone array processing technology; or voice wakeup may be performed by using a conventional sound source separation technology.

According to the foregoing method, although the wakeup rate has been improved, when background noise exists, human voice recognition is poor. Especially, in a scenario of multi-sound source interference, strong sound source interference, or a far-field echo scenario, the wakeup rate is lower, and voice wakeup effect of the electronic device is poor.

SUMMARY

In view of this, a voice wakeup method and apparatus, a storage medium, and a system are provided. In embodiments of this application, a two-stage separation and wakeup solution is designed. In a first-stage scenario, pre-wakeup determining is performed by using a first-stage separation and wakeup solution, and wakeup determining is performed again in a second-stage scenario after pre-wakeup succeeds, to reduce a false wakeup rate while ensuring a high wakeup rate. Therefore, better voice wakeup effect is obtained.

According to a first aspect, an embodiment of this application provides a voice wakeup method. The method includes:

- obtaining original first microphone data;
- performing first-stage processing based on the first microphone data to obtain first wakeup data, where the first-stage processing includes first-stage separation processing and first-stage wakeup processing that are based on a neural network model;
- performing second-stage processing based on the first microphone data to obtain second wakeup data when the first wakeup data indicates that pre-wakeup succeeds, where the second-stage processing includes second-stage separation processing and second-stage wakeup processing that are based on the neural network model; and
- determining a wakeup result based on the second wakeup data.

In this implementation, a two-stage separation and wakeup solution is designed. In a first-stage scenario, first-stage separation processing and first-stage wakeup processing are performed on the original first microphone data to obtain the first wakeup data, and pre-wakeup determining is performed based on the first wakeup data. The first-stage separation and wakeup solution can ensure a high wakeup rate as much as possible, but also cause a high false wakeup rate. Therefore, when the first wakeup data indicates that pre-wakeup succeeds, second-stage separation processing and second-stage wakeup processing are then performed on the first microphone data in a second-stage scenario, that is, wakeup determining is performed on the first microphone data again. In this way, better separation performance can be obtained, thereby reducing a false wakeup rate while ensuring a high wakeup rate. In this way, better voice wakeup effect is obtained.

With reference to the first aspect, in a possible implementation of the first aspect, the performing first-stage processing based on the first microphone data to obtain first wakeup data includes:

- preprocessing the first microphone data to obtain multi-channel feature data;
- invoking, based on the multi-channel feature data, a first-stage separation module that completes training in advance to output first separation data, where the first-stage separation module is configured to perform first-stage separation processing; and
- invoking, based on the multi-channel feature data and the first separation data, a first-stage wakeup module that completes training in advance to output the first wakeup data, where the first-stage wakeup module is configured to perform first-stage wakeup processing.

In this implementation, the first microphone data is preprocessed to obtain the multi-channel feature data, so that the first-stage separation module may be first invoked based on the multi-channel feature data to output the first separation data, and then the first-stage wakeup module is invoked based on the multi-channel feature data and the first separation data to output the first wakeup data. In this way, first-stage separation processing and first-stage wakeup processing are performed on the first microphone data in the first-stage scenario, to ensure a high wakeup rate of pre-wakeup as possible.

With reference to the first possible implementation of the first aspect, in a second possible implementation of the first aspect, the performing second-stage processing based on the first microphone data to obtain second wakeup data when the first wakeup data indicates that pre-wakeup succeeds includes:

- when the first wakeup data indicates that pre-wakeup succeeds, invoking, based on the multi-channel feature data and the first separation data, a second-stage separation module that completes training in advance to output second separation data, where the second-stage separation module is configured to perform second-stage separation processing; and invoking, based on the multi-channel feature data, the first separation data, and the second separation data, a second-stage wakeup module that completes training in advance to output the second wakeup data, where the second-stage wakeup module is configured to perform second-stage wakeup processing.

In this implementation, when the first wakeup data indicates that pre-wakeup succeeds, the second-stage separation module is invoked based on the multi-channel feature data and the first separation data to output the second separation data, and the second-stage wakeup module is invoked based on the multi-channel feature data, the first separation data, and the second separation data to output the second wakeup data. In this way, second-stage separation processing and second-stage wakeup processing are performed on the first microphone data based on the first separation data output by the first-stage separation module in the second-stage scenario, that is, wakeup determining is performed on the first microphone data again, to reduce a false wakeup rate while ensuring a high wakeup rate. Therefore, a voice wakeup effect is further improved.

With reference to the second possible implementation of the first aspect, in a third possible implementation of the first aspect, the first-stage separation processing is streaming sound source separation processing, and the first-stage wakeup processing is streaming sound source wakeup processing; and/or the second-stage separation processing is offline sound source separation processing, and the second-stage wakeup processing is offline sound source wakeup processing.

In this implementation, the first-stage scenario is a first-stage streaming scenario, and the second-stage scenario is a second-stage offline scenario. Because the first-stage separation and wakeup solution is designed in a streaming manner, separation performance is usually lost to ensure a high wakeup rate as much as possible, but a high false wakeup rate is also caused. Therefore, when the first wakeup data indicates that pre-wakeup succeeds, offline second-stage separation processing and second-stage wakeup processing are then performed on the first microphone data in the second-stage offline scenario. In this way, better separation performance can be obtained, thereby reducing a false wakeup rate while ensuring a high wakeup rate. In this way, a voice wakeup effect is further improved.

With reference to the second possible implementation or the third possible implementation of the first aspect, in a fourth possible implementation of the first aspect, the first-stage wakeup module includes a wakeup model in a multiple-input single-output form or a multiple-input multiple-output form; and/or the second-stage wakeup module includes a wakeup model in a multiple-input single-output form or a multiple-input multiple-output form.

In this implementation, the first-stage wakeup module and/or the second-stage wakeup module are/is multi-input wakeup modules/a multi-input wakeup module. Compared with a single-input wakeup module in a related technology, this solution can not only reduce a calculation amount, to avoid a problem of a significant increase in a calculation amount and a waste problem that are caused by repeatedly invoking a wakeup model for a plurality of times, but also greatly improve wakeup performance because a correlation between input parameters is better used.

With reference to any one of the second possible implementation to the fourth possible implementation of the first aspect, in a fifth possible implementation of the first aspect, the first-stage separation module and/or the second-stage separation module use/uses a dual-path conformer (dpconformer) network structure.

In this implementation, a conformer-based self-attention network layer modeling technology provides the dual-path conformer network structure. By designing intra-block and inter-block alternate calculation of a conformer layer, modeling can be performed on a long sequence, and a problem, of an increase in a calculation amount, caused by direct use of the conformer can be avoided. In addition, because of a strong modeling capability of a conformer network, a separation effect of a separation module (namely, the first-stage separation module and/or the second-stage separation module) can be significantly improved.

With reference to any one of the second possible implementation to the fifth possible implementation of the first aspect, in a sixth possible implementation of the first aspect, the first-stage separation module and/or the second-stage separation module are/is separation modules/a separation module configured to perform at least one task, and the at least one task includes an independent sound source separation task, or includes the sound source separation task and another task; and the another task includes at least one of a sound source positioning task, a specific person extraction task, a specific direction extraction task, and a specific person determining task.

In this implementation, a multi-task design solution of a sound source separation task and another task is provided. For example, the another task includes at least one of a sound source positioning task, a specific person extraction task, a specific direction extraction task, and a specific person determining task. A sound source separation result may be associated with other information, and provided to a downstream task or a lower-level wakeup module, to improve an output effect of a separation module (namely, the first-stage separation module and/or the second-stage separation module).

With reference to any one of the second possible implementation to the sixth possible implementation of the first aspect, in a seventh possible implementation of the first aspect, the first-stage wakeup module and/or the second-stage wakeup module are/is wakeup modules/a wakeup module configured to perform at least one task, and the at least one task includes an independent wakeup task, or includes the wakeup task and another task; and the another task includes at least one of a sound source positioning task, a specific person extraction task, a specific direction extraction task, and a specific person determining task.

In this implementation, a multi-task design solution of a sound source wakeup task and another task is provided. For example, the another task includes at least one of a sound source positioning task, a specific person extraction task, a specific direction extraction task, and a specific person determining task. A sound source wakeup result may be associated with other information, and provided to a downstream task, to improve an output effect of a wakeup module (namely, the first-stage wakeup module and/or the second-stage wakeup module). For example, the another task is the sound source positioning task. In this way, the wakeup module can provide more accurate orientation information while providing the sound source wakeup result. Compared with a solution, in a related technology, in which fixed beamforming is directly performed in a plurality of space directions, this solution ensures a more accurate orientation estimation effect.

With reference to any one of the first possible implementation to the seventh possible implementation of the first aspect, in an eighth possible implementation of the first aspect, the first-stage separation module includes a first-stage multi-feature fusion model and a first-stage separation model; and the invoking, based on the multi-channel feature data, a first-stage separation module that completes training in advance to output first separation data includes:

inputting the multi-channel feature data into the first-stage multi-feature fusion model to output first single-channel feature data; and inputting the first single-channel feature data into the first-stage separation model to output the first separation data.

In this implementation, a mechanism of fusing the multi-channel feature data is provided, to avoid manual selection of feature data in a related technology. A relationship between feature channels and a contribution of each feature to a final separation effect are automatically learned by using the first-stage multi-feature fusion model, thereby further ensuring a separation effect of the first-stage separation model.

With reference to any one of the second possible implementation to the eighth possible implementation of the first aspect, in a ninth possible implementation of the first aspect, the second-stage separation module includes a second-stage multi-feature fusion model and a second-stage separation model; and the invoking, based on the multi-channel feature data and the first separation data, a second-stage separation module that completes training in advance to output second separation data includes:

inputting the multi-channel feature data and the first separation data into the second-stage multi-feature fusion model to output second single-channel feature data; and inputting the second single-channel feature data into the second-stage separation model to output the second separation data.

In this implementation, a mechanism of fusing the multi-channel feature data is provided, to avoid manual selection of feature data in a related technology. A relationship between feature channels and a contribution of each feature to a final separation effect are automatically learned by using the second-stage multi-feature fusion model, thereby further ensuring a separation effect of the second-stage separation model.

With reference to any one of the first possible implementation to the ninth possible implementation of the first aspect, in a tenth possible implementation of the first aspect, the first-stage wakeup module includes a first wakeup model in a multiple-input single-output form; and the invoking, based on the multi-channel feature data and the first separation data, a first-stage wakeup module that completes training in advance to output the first wakeup data includes:

inputting the multi-channel feature data and the first separation data into the first-stage wakeup model to output the first wakeup data, where the first wakeup data includes a first confidence level, and the first confidence level indicates a probability that the original first microphone data includes a preset wakeup keyword.

In this implementation, the first wakeup model in a multiple-input single-output form is provided. Because the first wakeup model is a model in a multiple-input form, a problem of a significant increase in a calculation amount and a waste problem that are caused by repeatedly invoking the wakeup model for a plurality of times in a related technology are avoided, thereby saving a calculation resource and improving processing efficiency of the first wakeup model. In addition, wakeup performance of the first wakeup model is greatly improved because correlation between input parameters is better used.

With reference to any one of the first possible implementation to the ninth possible implementation of the first aspect, in an eleventh possible implementation of the first aspect, the first-stage wakeup module includes a first wakeup model in a multiple-input multiple-output form and a first post-processing module; and the invoking, based on the multi-channel feature data and the first separation data, a first-stage wakeup module that completes training in advance to output the first wakeup data includes:

inputting the multi-channel feature data and the first separation data into the first wakeup model to output phoneme sequence information respectively corresponding to a plurality of pieces of sound source data; and inputting the phoneme sequence information respectively corresponding to the plurality of pieces of sound source data into the first post-processing module to output the first wakeup data, where the first wakeup data includes second confidence levels respectively corresponding to the plurality of pieces of sound source data, and the second confidence level indicates an acoustic feature similarity between the sound source data and a preset wakeup keyword.

In this implementation, the first wakeup model in a multiple-input multiple-output form is provided. In one aspect, because the first wakeup model is a model in a multiple-input form, a problem of a significant increase in a calculation amount and a waste problem that are caused by repeatedly invoking the wakeup model for a plurality of times in a related technology are avoided, thereby saving a calculation resource and improving processing efficiency of the first wakeup model. In another aspect, because the first wakeup model is a model in a multi-output form, the phoneme sequence information respectively corresponding to the plurality of pieces of sound source data may be simultaneously output, to avoid a case of a low wakeup rate caused by mutual impact between the plurality of pieces of sound source data, and further ensure a subsequent wakeup rate.

With reference to any one of the second possible implementation to the eleventh possible implementation of the first aspect, in a twelfth possible implementation of the first aspect, the second-stage wakeup module includes a second wakeup model in a multiple-input single-output form; and the invoking, based on the multi-channel feature data, the first separation data, and the second separation data, a second-stage wakeup module that completes training in advance to output the second wakeup data includes:

inputting the multi-channel feature data, the first separation data, and the second separation data into the second-stage wakeup model to output the second wakeup data, where the second wakeup data includes a third confidence level, and the third confidence level indicates a probability that the original first microphone data includes the preset wakeup keyword.

In this implementation, the second wakeup model in a multiple-input single-output form is provided. Because the second wakeup model is a model in a multiple-input form, a problem of a significant increase in a calculation amount and a waste problem that are caused by repeatedly invoking the wakeup model for a plurality of times in a related technology are avoided, thereby saving a calculation resource and improving processing efficiency of the second wakeup model. In addition, wakeup performance of the second wakeup model is greatly improved because correlation between input parameters is better used.

With reference to any one of the second possible implementation to the eleventh possible implementation of the first aspect, in a thirteenth possible implementation of the first aspect, the second-stage wakeup module includes a second wakeup model in a multiple-input multiple-output form and a second post-processing module; and the invoking, based on the multi-channel feature data, the first separation data, and the second separation data, a second-stage wakeup module that completes training in advance to output the second wakeup data includes:

inputting the multi-channel feature data, the first separation data, and the second separation data into the second-stage wakeup model to output the phoneme sequence information respectively corresponding to the plurality of pieces of sound source data; and inputting the phoneme sequence information respectively corresponding to the plurality of pieces of sound source data into the second post-processing module to output the second wakeup data, where the second wakeup data includes fourth confidence levels respectively corresponding to the plurality of pieces of sound source data, and the fourth confidence level indicates the acoustic feature similarity between the sound source data and the preset wakeup keyword.

In this implementation, the second wakeup model in a multiple-input multiple-output form is provided. In one aspect, because the second wakeup model is a model in a multiple-input form, a problem of a significant increase in a calculation amount and a waste problem that are caused by repeatedly invoking the wakeup model for a plurality of times in a related technology are avoided, thereby saving a calculation resource and improving processing efficiency of the second wakeup model. In another aspect, because the second wakeup model is a model in a multi-output form, the phoneme sequence information respectively corresponding to the plurality of pieces of sound source data may be simultaneously output, to avoid a case of a low wakeup rate caused by mutual impact between the plurality of pieces of sound source data, and further ensure a subsequent wakeup rate.

According to a second aspect, an embodiment of this application provides a voice wakeup apparatus. The apparatus includes an obtaining module, a first-stage processing module, a second-stage processing module, and a determining module, where the obtaining module is configured to obtain original first microphone data;

the first-stage processing module is configured to perform first-stage processing based on the first microphone data to obtain first wakeup data, where the first-stage processing includes first-stage separation processing and first-stage wakeup processing that are based on a neural network model;

the second-stage processing module is configured to perform second-stage processing based on the first microphone data to obtain second wakeup data when the first wakeup data indicates that pre-wakeup succeeds, where the second-stage processing includes second-stage separation processing and second-stage wakeup processing that are based on the neural network model; and the determining module is configured to determine a wakeup result based on the second wakeup data.

With reference to the second aspect, in a possible implementation of the second aspect, the apparatus further includes a preprocessing module, and the first-stage processing module further includes a first-stage separation module and a first-stage wakeup module, where the preprocessing module is configured to preprocess the first microphone data to obtain multi-channel feature data;

the first-stage separation module is configured to perform first-stage separation processing based on the multi-channel feature data to output first separation data; and the first-stage wakeup module is configured to perform first-stage wakeup processing based on the multi-channel feature data and the first separation data to output the first wakeup data.

With reference to the first possible implementation of the second aspect, in a second possible implementation of the second aspect, the second-stage processing module further includes a second-stage separation module and a second-stage wakeup module, where the second-stage separation module is configured to: when the first wakeup data indicates that pre-wakeup succeeds, perform second-stage separation processing based on the multi-channel feature data and the first separation data to output second separation data; and the second-stage wakeup module is configured to perform second-stage wakeup processing based on the multi-channel feature data, the first separation data, and the second separation data to output the second wakeup data.

With reference to the second possible implementation of the second aspect, in a third possible implementation of the second aspect, the first-stage separation processing is streaming sound source separation processing, and the first-stage wakeup processing is streaming sound source wakeup processing; and/or the second-stage separation processing is offline sound source separation processing, and the second-stage wakeup processing is offline sound source wakeup processing.

With reference to the second possible implementation or the third possible implementation of the second aspect, in a fourth possible implementation of the second aspect, the first-stage wakeup module includes a wakeup model in a multiple-input single-output form or a multiple-input multiple-output form; and/or the second-stage wakeup module includes a wakeup model in a multiple-input single-output form or a multiple-input multiple-output form.

With reference to any one of the second possible implementation to the fourth possible implementation of the second aspect, in a fifth possible implementation of the second aspect, the first-stage separation module and/or the second-stage separation module use/uses a dual-path conformer network structure.

With reference to any one of the second possible implementation to the fifth possible implementation of the second aspect, in a sixth possible implementation of the second aspect, the first-stage separation module and/or the second-stage separation module are/is separation modules/a separation module configured to perform at least one task, and the at least one task includes an independent sound source separation task, or includes the sound source separation task and another task; and the another task includes at least one of a sound source positioning task, a specific person extraction task, a specific direction extraction task, and a specific person determining task.

With reference to any one of the second possible implementation to the sixth possible implementation of the second aspect, in a seventh possible implementation of the second aspect, the first-stage wakeup module and/or the second-stage wakeup module are/is wakeup modules/a wakeup module configured to perform at least one task, and the at least one task includes an independent wakeup task, or includes the wakeup task and another task; and the another task includes at least one of a sound source positioning task, a specific person extraction task, a specific direction extraction task, and a specific person determining task.

With reference to any one of the first possible implementation to the seventh possible implementation of the second aspect, in an eighth possible implementation of the second aspect, the first-stage separation module includes a first-stage multi-feature fusion model and a first-stage separation model, where the first-stage separation module is further configured to:

input the multi-channel feature data into the first-stage multi-feature fusion model to output first single-channel feature data; and input the first single-channel feature data into the first-stage separation model to output the first separation data.

With reference to any one of the second possible implementation to the eighth possible implementation of the second aspect, in a ninth possible implementation of the second aspect, the second-stage separation module includes a second-stage multi-feature fusion model and a second-stage separation model, where the second-stage separation module is further configured to:

input the multi-channel feature data and the first separation data into the second-stage multi-feature fusion model to output second single-channel feature data; and input the second single-channel feature data into the second-stage separation model to output the second separation data.

With reference to any one of the first possible implementation to the ninth possible implementation of the second aspect, in a tenth possible implementation of the second aspect, the first-stage wakeup module includes a first wakeup model in a multiple-input single-output form, where the first-stage wakeup module is further configured to:

input the multi-channel feature data and the first separation data into the first-stage wakeup model to output the first wakeup data, where the first wakeup data includes a first confidence level, and the first confidence level indicates a probability that the original first microphone data includes a preset wakeup keyword.

With reference to any one of the first possible implementation to the ninth possible implementation of the second aspect, in an eleventh possible implementation of the second aspect, the first-stage wakeup module includes a first wakeup model in a multiple-input multiple-output form and a first post-processing module, where the first-stage wakeup module is further configured to:

input the multi-channel feature data and the first separation data into the first wakeup model to output phoneme sequence information respectively corresponding to a plurality of pieces of sound source data; and input the phoneme sequence information respectively corresponding to the plurality of pieces of sound source data into the first post-processing module to output the first wakeup data, where the first wakeup data includes second confidence levels respectively corresponding to the plurality of pieces of sound source data, and the second confidence level indicates an acoustic feature similarity between the sound source data and a preset wakeup keyword.

With reference to any one of the second possible implementation to the eleventh possible implementation of the second aspect, in a twelfth possible implementation of the second aspect, the second-stage wakeup module includes a second wakeup model in a multiple-input single-output form, where the second-stage wakeup module is further configured to:

input the multi-channel feature data, the first separation data, and the second separation data into the second-stage wakeup model to output the second wakeup data, where the second wakeup data includes a third confidence level, and the third confidence level indicates a probability that the original first microphone data includes the preset wakeup keyword.

With reference to any one of the second possible implementation to the eleventh possible implementation of the second aspect, in a thirteenth possible implementation of the second aspect, the second-stage wakeup module includes a second wakeup model in a multiple-input multiple-output form and a second post-processing module, where the second-stage wakeup module is further configured to:

input the multi-channel feature data, the first separation data, and the second separation data into the second-stage wakeup model to output the phoneme sequence information respectively corresponding to the plurality of pieces of sound source data; and input the phoneme sequence information respectively corresponding to the plurality of pieces of sound source data into the second post-processing module to output the second wakeup data, where the second wakeup data includes fourth confidence levels respectively corresponding to the plurality of pieces of sound source data, and the fourth confidence level indicates the acoustic feature similarity between the sound source data and the preset wakeup keyword.

According to a third aspect, an embodiment of this application provides an electronic device. The electronic device includes:

a processor; and a memory, configured to store instructions that can be executed by the processor, where the processor is configured to implement the voice wakeup method provided in any one of the first aspect or the possible implementations of the first aspect when executing the instructions.

According to a fourth aspect, an embodiment of this application provides a non-volatile computer-readable storage medium. The non-volatile computer-readable storage medium stores computer program instructions. When the computer program instructions are executed by a processor, the voice wakeup method provided in any one of the first aspect or the possible implementations of the first aspect is implemented.

According to a fifth aspect, an embodiment of this application provides a computer program product, including computer-readable code or a non-volatile computer-readable storage medium carrying the computer-readable code. When the computer-readable code is run in an electronic device, a processor in the electronic device performs the voice wakeup method provided in any one of the first aspect or the possible implementations of the first aspect.

According to a sixth aspect, an embodiment of this application provides a voice wakeup system. The voice wakeup system is configured to perform the voice wakeup method provided in any one of the first aspect or the possible implementations of the first aspect.

BRIEF DESCRIPTION OF DRAWINGS

The accompanying drawings included in this specification and constituting a part of this specification and this specification jointly show example embodiments, features, and aspects of this application, and are intended to explain principles of this application.

DESCRIPTION OF EMBODIMENTS

Figure 1:
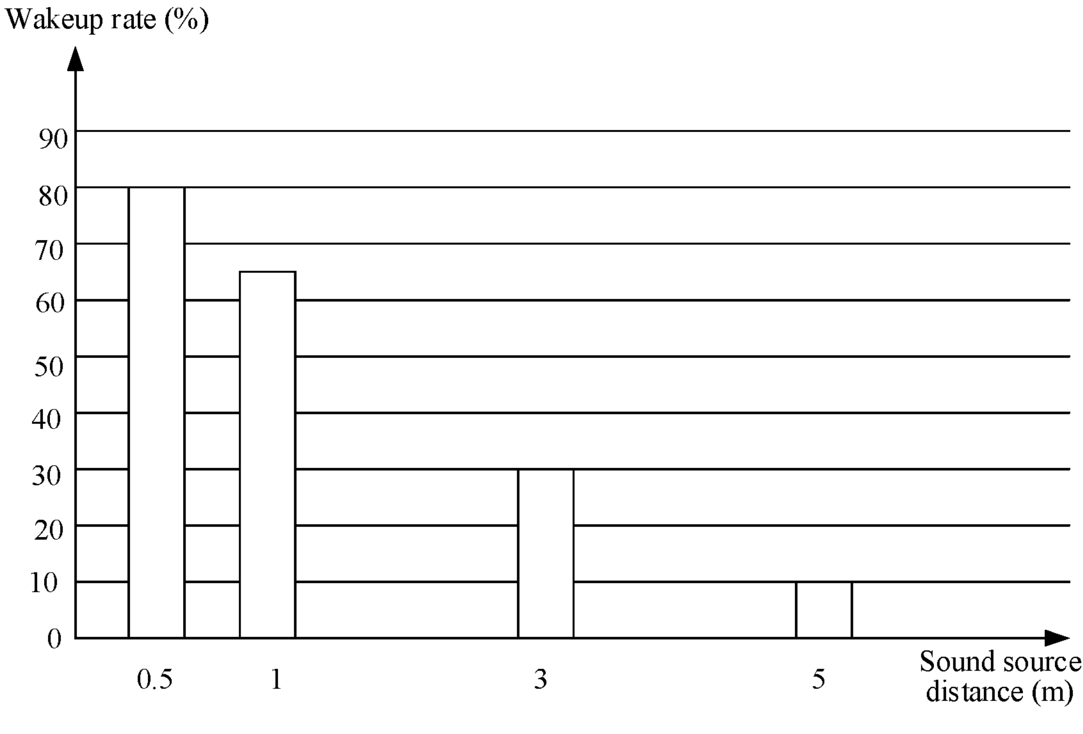
FIG. 1 is a schematic diagram of a correlation relationship between a wakeup rate of an electronic device and a sound source distance in a related technology.

The following describes various example embodiments, features, and aspects of this application in detail with reference to the accompanying drawings. Identical reference numerals in the accompanying drawings indicate elements that have same or similar functions. Although various aspects of embodiments are shown in the accompanying drawings, the accompanying drawings are not necessarily drawn in proportion unless otherwise specified.

A specific term "example" herein means "used as an example, embodiment, or illustration". Any embodiment described as "example" herein is not necessarily explained as being superior or better than other embodiments.

In addition, to better describe this application, numerous specific details are provided in the following specific implementations. A person skilled in the art should understand that, this application can also be implemented without some specific details. In some instances, methods, means, elements, and circuits that are well-known to a person skilled in the art are not described in detail, so that a subject matter of this application is highlighted.

A voice interaction technology is an important technology in an electronic device currently. The electronic device includes a device like a smartphone, a speaker box, a television, a robot, a tablet device, or a vehicle-mounted device. A voice wakeup function is one of key functions of the voice interaction technology. An electronic device in a non-voice interaction state (for example, a sleep state or another state) is activated by using a specific wakeup keyword or command word (for example, "Hey Celia"), and another voice function like voice recognition, voice search, conversation, or voice navigation is enabled. In this way, the voice interaction technology can be available at any time, and a power consumption problem or a problem that user privacy data is monitored can be avoided, where the problem is caused because the electronic device is in a voice interaction state for a long time period.

In an ideal environment (for example, in a quiet environment and a user is close to a to-be-woken-up electronic device), the voice wakeup function meets a use requirement of the user, that is, reaches a wakeup rate of more than 95%. However, an acoustic environment in an actual use scenario is usually complex. When the user is far away from the to-be-woken-up electronic device (where for example, a distance ranges from 3 to 5 meters) and background noise (for example, a television sound, a speaking sound, background music, a reverberation, or an echo) exists, the wakeup rate decreases sharply. As shown in FIG. 1, a wakeup rate of an electronic device decreases as a sound source distance increases. The sound source distance is a distance between a user and the electronic device. In FIG. 1, the wakeup rate is 80% when the sound source distance is 0.5 meter, the wakeup rate is 65% when the sound source distance is 1 meter, the wakeup rate is 30% when the sound source distance is 3 meters, and the wakeup rate is 10% when the sound source distance is 5 meters. An excessively low wakeup rate causes poor voice wakeup effect of the electronic device.

According to some methods provided in the related technology, although the wakeup rate has been improved, when background noise exists, human voice recognition is poor. Especially, in a scenario of multi-sound source interference (for example, interference from another speaker, interference from background music, and echo residual interference in an echo scenario), strong sound source interference, or a far-field echo scenario, the wakeup rate is lower, and a high false wakeup situation is generated.

However, in embodiments of this application, a two-stage separation and wakeup solution is designed. In a first-stage streaming scenario, pre-wakeup determining is performed by using a first-stage separation and wakeup solution, to ensure a high wakeup rate as much as possible, but a high false wakeup rate is caused. Therefore, offline wakeup determining is performed in a second-stage offline scenario after pre-wakeup succeeds, to reduce the false wakeup rate while ensuring the high wakeup rate. Therefore, better voice wakeup effect is obtained.

First, some terms in embodiments of this application are described.

1. Offline sound source wakeup processing refers to performing sound source wakeup processing on complete audio content after obtaining the audio content. The offline sound source wakeup processing includes offline separation processing and offline wakeup processing.

2. Streaming sound source wakeup processing (also referred to as online sound source wakeup processing) refers to obtaining an audio segment in real time or at a preset time interval, and performing sound source wakeup processing on the audio segment. The streaming sound source wakeup processing includes streaming separation processing and streaming wakeup processing.

The audio segment is a quantity of consecutive pieces of sample data collected in real time or at the preset time interval. For example, the preset time interval is 16 milliseconds. This is not limited in embodiments of this application.

3. Multi-sound source separation technology refers to a technology that separates a plurality of pieces of sound source data from a received single-microphone or multi-microphone voice signal. The plurality of pieces of sound source data include sound source data of a target object and sound source data of an interfering sound source. The multi-sound source separation technology is used to separate the sound source data of the target object from the sound source data of the interfering sound source, to better perform wakeup determining.

4. A wakeup technology is also referred to as a keyword spotting (KWS) technology, and is used to determine whether to-be-tested sound source data includes a preset wakeup keyword. The wakeup keyword may be set by default or user-defined. For example, the fixed wakeup keyword that is set by default is "Hey Celia", and a user cannot change the wakeup keyword. A wakeup solution design usually depends on specific training sample data. For another example, a user manually sets a personalized wakeup keyword. Regardless of a personalized wakeup keyword set by the user, a high wakeup rate is expected, and frequent model self-learning is not expected to be performed on an electronic device side. Optionally, a modeling manner of the wakeup technology includes but is not limited to the following two possible implementations: In a first implementation, a wakeup module is established by using a whole word. For example, a fixed wakeup keyword is an output target of the wakeup module; in a second implementation, a wakeup module for phoneme recognition is established based on a phoneme representation in general voice recognition. For example, a corresponding personalized decoding image is automatically constructed when a fixed wakeup keyword is supported or a user-defined wakeup keyword is supported, and finally, a wakeup intention of the user is determined based on output of the wakeup module and the decoding image.

In the foregoing first possible implementation, namely, a solution in which the fixed wakeup keyword is used for modeling, in a multi-sound source interference scenario, a single channel of output data is expected for the wakeup module, and the output data indicates whether to perform wakeup or whether the output data is the fixed wakeup keyword. However, in the foregoing second possible implementation, namely, a solution in which a phoneme is used for modeling, in a multi-sound source interference scenario, output of wakeup modules of a plurality of pieces of sound source data is meaningful, and decoding needs to be separately performed based on the decoding image, to finally determine whether the wakeup keyword is the user-defined wakeup keyword. Therefore, in the multi-sound source interference scenario, in the solution in which the fixed wakeup keyword is used for modeling, the wakeup module is a model in a multiple-input single-output form; in the solution in which the phoneme is used for modeling, the wakeup module is a model in a multiple-input multiple-output form, and a plurality of pieces of output data correspond to a phoneme posterior probability sequence of the plurality of pieces of sound source data.

Figure 2:
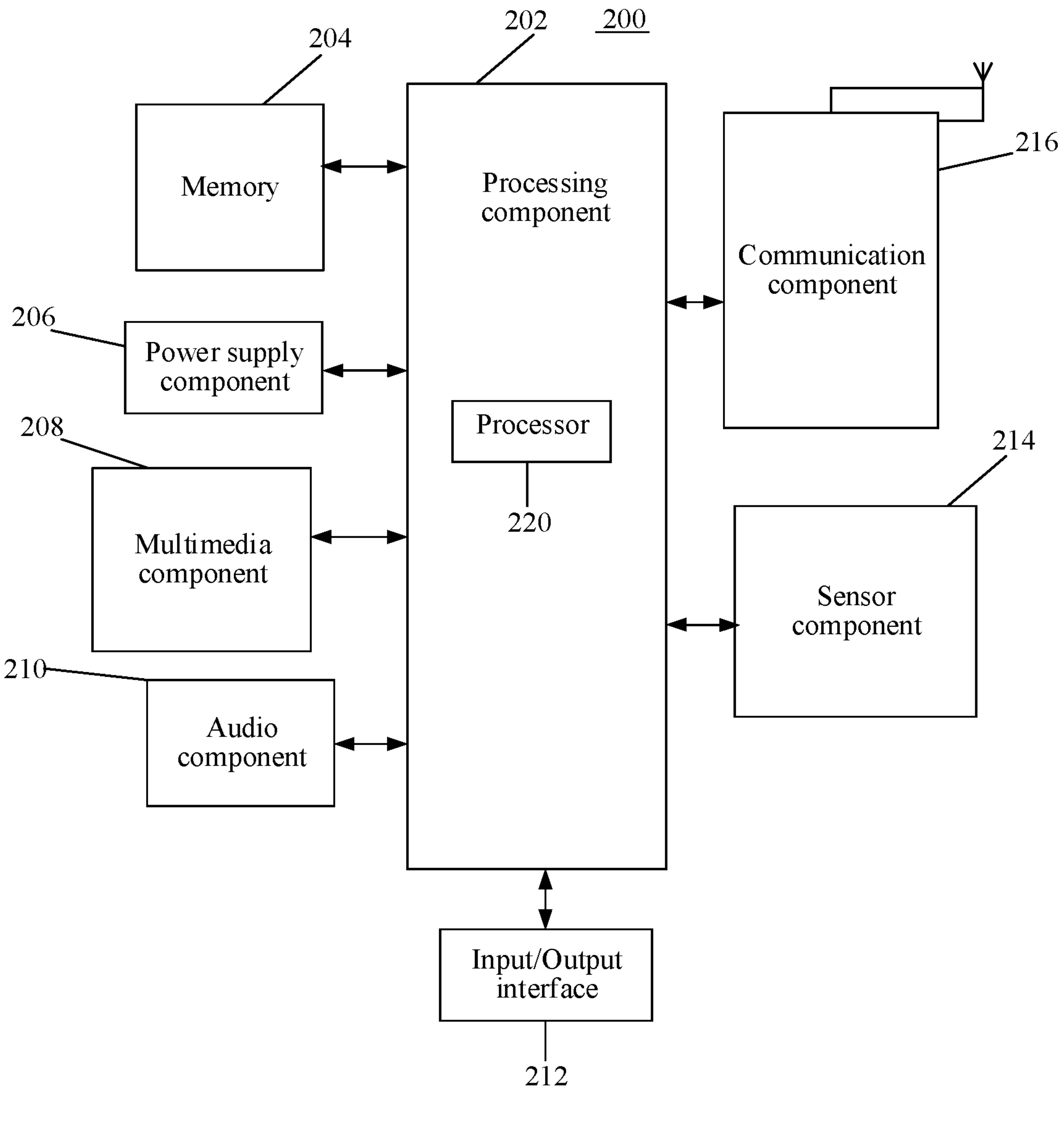
FIG. 2 is a schematic diagram of a structure of an electronic device according to an example embodiment of this application.

FIG. 2 is a schematic diagram of a structure of an electronic device according to an example embodiment of this application.

The electronic device may be a terminal. The terminal includes a mobile terminal or a fixed terminal. For example, the electronic device may be a mobile phone, a speaker box, a television, a robot, a tablet device, a vehicle-mounted device, a headset, smart glasses, a smartwatch, a laptop portable computer, or a desktop computer. A server may be a server, a server cluster including several servers, or a cloud computing service center.

Refer to FIG. 2. The electronic device 200 may include one or more of the following components: a processing component 202, a memory 204, a power supply component 206, a multimedia component 208, an audio component 210, an input/output (I/O) interface 212, a sensor component 214, and a communication component 216.

The processing component 202 usually controls an overall operation of the electronic device 200, for example, an operation associated with display, a phone call, data communication, a camera operation, and a recording operation. The processing component 202 may include one or more processors 220 to execute instructions, to complete all or some steps of a voice wakeup method provided in embodiments of this application. In addition, the processing component 202 may include one or more modules, to facilitate interaction between the processing component 202 and another component. For example, the processing component 202 may include a multimedia module, to facilitate interaction between the multimedia component 208 and the processing component 202.

The memory 204 is configured to store various types of data to support the operation on the electronic device 200. Examples of the data include instructions that are of any application program or method and that are used for the operation on the electronic device 200, contact data, personal address book data, a message, a picture, multimedia content, and the like. The memory 204 may be implemented by any type of volatile or non-volatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or an optical disc.

The power supply component 206 supplies power to various components of the electronic device 200. The power supply component 206 may include a power supply management system, one or more power supplies, and another component associated with power generation, power management, and power distribution for the electronic device 200.

The multimedia component 208 includes a screen that provides an output interface and that is between the electronic device 200 and a user. In some embodiments, the screen may include a liquid crystal display (LCD) and a touch panel (TP). If the screen includes the touch panel, the screen may be implemented as a touchscreen to receive an input signal from the user. The touch panel includes one or more touch sensors to sense touch, slide, and a gesture on the touch panel. The touch sensor may not only sense a boundary of a touch or slide operation, but also detect duration and pressure that are related to the touch or slide operation. In some embodiments, the multimedia component 208 includes a front-facing camera and/or a rear-facing camera. When the electronic device 200 is in an operating mode, for example, a shooting mode or a multimedia content mode, the front-facing camera and/or the rear-facing camera may receive external multimedia data. Each front-facing camera and each rear-facing camera may be a fixed optical lens system or have a focal length and an optical zoom capability. Optionally, the electronic device 200 collects video information by using a camera (the front-facing camera and/or the rear-facing camera).

The audio component 210 is configured to output and/or input an audio signal. For example, the audio component 210 includes a microphone (MIC). When the electronic device 200 is in an operating mode, for example, a calling mode, a recording mode, or a voice recognition mode, the microphone is configured to receive an external audio signal. The received audio signal may be further stored in the memory 204 or sent by using the communication component 216. Optionally, the electronic device 200 collects original first microphone data by using the microphone. In some embodiments, the audio component 210 further includes a speaker, configured to output an audio signal.

The I/O interface 212 is an interface provided between the processing component 202 and a peripheral interface module. The peripheral interface module may be a keyboard, a click wheel, a button, or the like. The buttons may include but are not limited to: a home button, a volume button, a start button, and a lock button.

The sensor component 214 includes one or more sensors, configured to provide status evaluation in various aspects for the electronic device 200. For example, the sensor component 214 may detect an on/off state of the electronic device 200 and relative positioning of a component. For example, the component is a display and a keypad of the electronic device 200. The sensor component 214 may further detect a position change of the electronic device 200 or a component of the electronic device 200, whether there is a contact between the user and the electronic device 200, an orientation or acceleration/deceleration of the electronic device 200, and a temperature change of the electronic device 200. The sensor component 214 may include a proximity sensor, configured to detect existence of a nearby object when there is no physical contact. The sensor component 214 may further include an optical sensor, for example, a CMOS or CCD image sensor, configured to be used in an imaging application. In some embodiments, the sensor component 214 may further include an acceleration sensor, a gyroscope sensor, a magnetic sensor, a pressure sensor, or a temperature sensor.

The communication component 216 is configured to facilitate wired or wireless communication between the electronic device 200 and another device. The electronic device 200 may access a wireless network based on a communication standard, for example, Wi-Fi, 2G or 3G, or a combination thereof. In an example embodiment, the communication component 216 receives a broadcast signal or broadcast-related information from an external broadcast management system by using a broadcast channel. In an example embodiment, the communication component 216 further includes a near field communication (NFC) module, to facilitate short-range communication. For example, the NFC module may be implemented based on a radio frequency identification (RFID) technology, an infrared data association (IrDA) technology, an ultra-wideband (UWB) technology, a Bluetooth (BT) technology, and another technology.

In an example embodiment, the electronic device 200 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements, and is configured to perform the voice wakeup method provided in embodiments of this application.

In an example embodiment, a non-volatile computer-readable storage medium is further provided, for example, the memory 204 including computer program instructions. The computer program instructions may be executed by the processor 220 of the electronic device 200 to complete the voice wakeup method provided in embodiments of this application.

The following describes the voice wakeup method provided in embodiments of this application by using several example embodiments.

Figure 3:
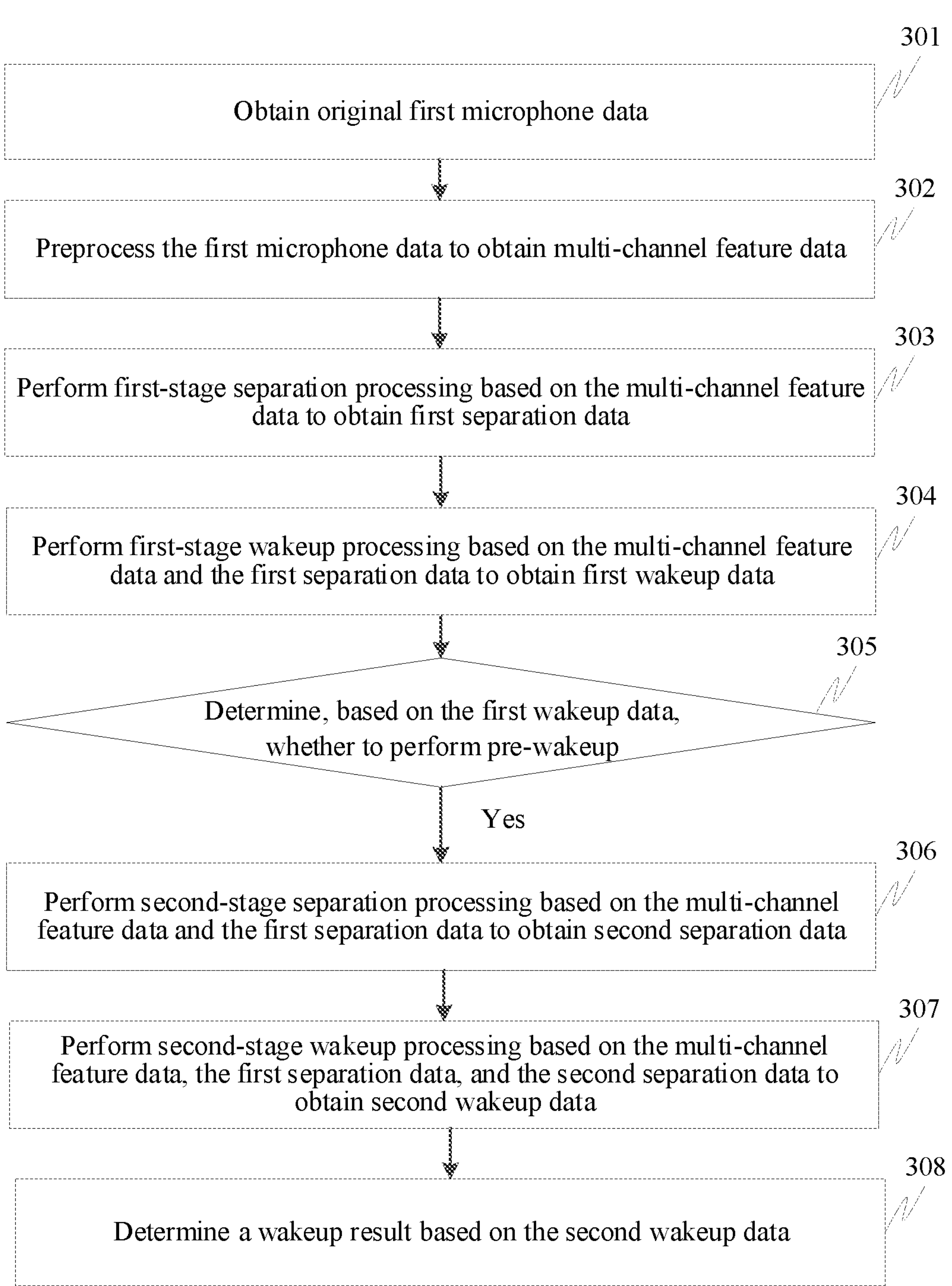
FIG. 3 is a flowchart of a voice wakeup method according to an example embodiment of this application.

FIG. 3 is a flowchart of a voice wakeup method according to an example embodiment of this application. In this embodiment, an example in which the method is applied to the electronic device shown in FIG. 2 is used for description. The method includes the following several steps.

Step 301: Obtain original first microphone data.

The electronic device obtains a microphone output signal by using a single microphone or a plurality of microphones, and uses the microphone output signal as the original first microphone data.

Optionally, the first microphone data includes sound source data of a target object and sound source data of an interfering sound source. The interfering sound source includes at least one of a speaking sound of an object other than the target object, background music, and environmental noise.

Step 302: Preprocess the first microphone data to obtain multi-channel feature data.

To process an acoustic echo problem, a reverberation problem, a signal amplitude problem, or the like that may exist in a real acoustic scenario, the electronic device preprocesses the first microphone data to obtain the multi-channel feature data. Optionally, the preprocessing includes at least one of acoustic echo cancellation (AEC), de-reverberation, voice activity detection (VAD), automatic gain control (AGC), and beam filtering.

Optionally, a multi-channel feature is a multi-group multi-channel feature. The multi-channel feature data includes at least one of multi-channel time domain signal data, multi-channel spectrum data, phase difference (Inter Phase Difference, IPD) data between multi-group of channels, multi-direction feature data, and multi-beam feature data.

Step 303: Perform first-stage separation processing based on the multi-channel feature data to obtain first separation data.

The first-stage separation processing may also be referred to as first-stage neural network separation processing. The first-stage separation processing is separation processing based on a neural network model. To be specific, the first-stage separation processing includes invoking the neural network model to perform sound source separation processing.

Optionally, the electronic device invokes, based on the multi-channel feature data, a first-stage separation module that completes training in advance to output the first separation data. The first-stage separation module is configured to perform first-stage separation processing. The first-stage separation processing is streaming sound source separation processing. Optionally, the first-stage separation module uses a dpconformer network structure.

That the electronic device invokes, based on the multi-channel feature data, a first-stage separation module that completes training in advance to output the first separation data includes but is not limited to the following two possible implementations.

In a possible implementation, the first-stage separation module includes a first-stage separation model. The electronic device splices the multi-channel feature, and inputs spliced multi-channel feature data into the first-stage separation model to output the first separation data.

In another possible implementation, the first-stage separation module includes a first-stage multi-feature fusion model and a first-stage separation model. The electronic device inputs the multi-channel feature data into the first-stage multi-feature fusion model to output first single-channel feature data, and inputs the first single-channel feature data into the first-stage separation model to output the first separation data. For ease of description, only the second possible implementation is used as an example below. This is not limited in this embodiment of this application.

Optionally, the first-stage multi-feature fusion model is a conformer feature fusion model.

The first-stage separation model uses a streaming network structure. Optionally, the first-stage separation model uses a dpconformer network structure.

The first-stage separation model is the neural network model. To be specific, the first-stage separation model is a model obtained through training by using a neural network. Optionally, the first-stage separation model uses any one of the following network structures: a deep neural network (DNN), a long short-term memory (LSTM) network, a convolutional neural network (CNN), a fully convolutional time-domain audio separation network (Cony-TasNet), and a DPRNN. It should be noted that the first-stage separation model may alternatively use another network structure suitable for a streaming scenario. This is not limited in this embodiment of this application.

A separation task design of the first-stage separation module may be a single-task design of a streaming sound source separation task, or may be a multi-task design of the streaming sound source separation task and another task. Optionally, the another task includes orientation estimation tasks respectively corresponding to a plurality of sound sources and/or sound source object recognition tasks respectively corresponding to the plurality of sound sources.

In a possible implementation, the first-stage separation module is configured to perform blind separation on a plurality of pieces of sound source data. The first separation data includes a plurality of pieces of separated sound source data.

In another possible implementation, the first-stage separation module is configured to extract the sound source data of the target object from a plurality of pieces of sound source data. The first separation data includes the extracted sound source data of the target object.

In another possible implementation, the first-stage separation module is configured to extract the sound source data of the target object from a plurality of pieces of sound source data based on video information. The first separation data includes the extracted sound source data of the target object. For example, the video information includes visual data of the target object.

In another possible implementation, the first-stage separation module is configured to extract at least one piece of sound source data in a target direction from a plurality of pieces of sound source data. The first separation data includes the at least one piece of sound source data in the target direction.

It should be noted that, for related details of several possible implementations of the separation task design, refer to related descriptions in the following embodiments. Details are not described herein first.

Optionally, for a blind separation task in which the plurality of pieces of sound source data need to be separated, a cost function in the first-stage separation module is a function designed based on a permutation invariant training (PIT) criterion.

Optionally, in a training process of the cost function, the electronic device sorts a plurality of pieces of sample sound source data based on a sequence of start moments of voice segments, and calculates a loss value of the cost function based on the plurality of pieces of sorted sample sound source data. The cost function is trained based on the calculated loss value.

Optionally, after the plurality of pieces of sound source data are obtained through separation by using the first-stage separation module, the plurality of pieces of sound source data are directly input to a next-stage processing model, namely, a first-stage wakeup module.

Optionally, in a multi-microphone scenario, after the plurality of pieces of sound source data are obtained through separation by using the first-stage separation module, statistical information of the plurality of pieces of sound source data is calculated, the statistical information is input into a beamforming model to output beamforming data, and the beamforming data is input into the next-stage processing model, namely, the first-stage wakeup module.

Step 304: Perform first-stage wakeup processing based on the multi-channel feature data and the first separation data to obtain first wakeup data.

Optionally, the electronic device invokes, based on the multi-channel feature data and the first separation data, a first-stage wakeup module that completes training in advance to output the first wakeup data. The first-stage wakeup module is configured to perform first-stage wakeup processing. The first-stage wakeup processing is streaming sound source wakeup processing.

It should be noted that, for descriptions of the multi-channel feature data and the first separation data, refer to related descriptions in the foregoing steps. Details are not described herein again.

Optionally, the electronic device inputs the multi-channel feature data and the first separation data into the first-stage wakeup module to output the first wakeup data.

Optionally, a wakeup solution is a multiple-input single-output streaming wakeup solution (MISO-KWS). To be specific, the first-stage wakeup module is modeled by using a fixed wakeup keyword. The first-stage wakeup module is a wakeup model in a multiple-input single-output form. An input parameter includes the multi-channel feature data and the first separation data. An output parameter includes a first confidence level. The first confidence level indicates a probability that the original first microphone data includes a preset wakeup keyword.

Optionally, the first confidence level is a multi-dimensional vector. A value of each dimension in the multi-dimensional vector is a probability value between 0 and 1.

Optionally, a wakeup solution is a multiple-input multiple-output streaming wakeup solution (MIMO-KWS). To be specific, the first-stage wakeup module is modeled by using a phoneme. The first-stage wakeup module includes a wakeup model in a multiple-input multiple-output form and a first post-processing module (for example, a decoder). An input parameter (namely, an input parameter of the wakeup model) of the first-stage wakeup module includes the multi-channel feature data and the first separation data. An output parameter of the wakeup model includes phoneme sequence information respectively corresponding to the plurality of pieces of sound source data. The phoneme sequence information corresponding to the sound source data indicates probability distribution of a plurality of phonemes in the sound source data, in other words, the phoneme sequence information includes probability values respectively corresponding to the plurality of phonemes. The output parameter (namely, an output parameter of the first post-processing module) of the first-stage wakeup module includes second confidence levels respectively corresponding to the plurality of pieces of sound source data. The second confidence level indicates an acoustic feature similarity between the sound source data and a preset wakeup keyword.

The preset wakeup keyword is a fixed wakeup keyword set by default, or a user-defined wakeup keyword. This is not limited in this embodiment of this application.

The first-stage wakeup module uses a streaming network structure. Optionally, the first-stage wakeup module uses a streaming dpconformer network structure.

Optionally, the first-stage wakeup module uses any one of the following network structures: a DNN, an LSTM, and a CNN. It should be noted that the first-stage wakeup module may alternatively use another network structure suitable for a streaming scenario. For a network structure of the first-stage wakeup module, refer to the network structure of the first-stage separation module. This is not limited in this embodiment of this application.

A wakeup task design of the first-stage wakeup module may be a single-task design of a wakeup task, or may be a multi-task design of the wakeup task and another task. Optionally, the another task includes an orientation estimation task and/or a sound source object recognition task.

Optionally, the first wakeup data includes the first confidence level. The first confidence level indicates the probability that the original first microphone data includes the preset wakeup keyword. Optionally, the first wakeup data includes the second confidence levels respectively corresponding to the plurality of pieces of sound source data. The second confidence level indicates the acoustic feature similarity between the sound source data and the preset wakeup keyword.

Optionally, the first wakeup data further includes orientation information corresponding to a wakeup event and/or object information of a wakeup object. The object information indicates an object identity of the sound source data.

Step 305: Determine, based on the first wakeup data, whether to perform pre-wakeup.

The electronic device sets a first threshold of the first-stage wakeup module. The first threshold is a threshold for allowing the electronic device to be pre-woken up successfully.

In a possible implementation, the first wakeup data includes the first confidence level. The first confidence level indicates the probability that the original first microphone data includes the preset wakeup keyword. When the first confidence level in the first wakeup data is greater than the first threshold, it is determined that pre-wakeup succeeds, in other words, first-stage streaming wakeup succeeds, buffered multi-channel feature data and first separation data are input into a second-stage separation module, and step 306 is performed. When the first confidence level is less than or equal to the first threshold, it is determined that pre-wakeup fails, in other words, first-stage streaming wakeup fails, and the process ends.

In another possible implementation, the first wakeup data includes the second confidence levels respectively corresponding to the plurality of pieces of sound source data. The second confidence level indicates the acoustic feature similarity between the sound source data and the preset wakeup keyword. When any second confidence level in the first wakeup data is greater than the first threshold, it is determined that pre-wakeup succeeds, in other words, first-stage streaming wakeup succeeds, buffered multi-channel feature data and first separation data are input into a second-stage separation module, and step 306 is performed. When each second confidence level in the first wakeup data is less than or equal to the first threshold, it is determined that pre-wakeup fails, in other words, first-stage streaming wakeup fails, and the process ends.

Step 306: Perform second-stage separation processing based on the multi-channel feature data and the first separation data to obtain second separation data.

The second-stage separation processing may also be referred to as second-stage neural network separation processing. The second-stage separation processing is separation processing based on the neural network model. To be specific, the second-stage separation processing includes invoking the neural network model to perform sound source separation processing.

Optionally, the electronic device invokes, based on the multi-channel feature data and the first separation data, a second-stage separation module that completes training in advance to output the second separation data. The second-stage separation module is configured to perform second-stage separation processing. The second-stage separation processing is offline sound source separation processing.

Optionally, the first wakeup data further includes orientation information corresponding to a wakeup keyword. The electronic device invokes, based on the multi-channel feature data, the first separation data, and the orientation information corresponding to the wakeup keyword, the second-stage separation module to output the second separation data.

It should be noted that, for descriptions of the first separation data, the multi-channel feature data, and the first wakeup data, refer to related descriptions in the foregoing steps. Details are not described herein again. For ease of description, the following uses an example in which the electronic device invokes, based on the multi-channel feature data and the first separation data, a second-stage separation module that completes training in advance to output the second separation data.

Optionally, the second-stage separation module uses a dpconformer network structure.

That the electronic device invokes, based on the multi-channel feature data and the first separation data, a second-stage separation module that completes training in advance to output the second separation data includes but is not limited to the following two possible implementations.

In a possible implementation, the second-stage separation module includes a second-stage separation model. The electronic device splices the multi-channel feature and the first separation data, and inputs spliced data into the second-stage separation model to output the second separation data.

In another possible implementation, the second-stage separation module includes a second-stage multi-feature fusion model and a second-stage separation model. The electronic device inputs the multi-channel feature data and the first separation data into the second-stage multi-feature fusion model to output second single-channel feature data, and inputs the second single-channel feature data into the second-stage separation model to output the second separation data. For ease of description, only the second possible implementation is used as an example below. This is not limited in this embodiment of this application.

Optionally, the second-stage multi-feature fusion model is a conformer feature fusion model.

The second-stage separation model is the neural network model. To be specific, the second-stage separation model is a model obtained through training by using the neural network. Optionally, the second-stage separation model uses a dpconformer network structure. Alternatively, the second-stage separation model uses any one of the following network structures: a deep neural network (DNN), a long short-term memory (LSTM) network, a convolutional neural network (CNN), a fully convolutional time-domain audio separation network (Conv-TasNet), and a recurrent neural network (RNN). It should be noted that the second-stage separation model may alternatively use another network structure suitable for an offline scenario. This is not limited in this embodiment of this application.

A separation task design of the second-stage separation module may be a single-task design of an offline sound source separation task, or may be a multi-task design of the offline sound source separation task and another task. Optionally, the another task includes orientation estimation tasks respectively corresponding to a plurality of sound sources and/or sound source object recognition tasks respectively corresponding to the plurality of sound sources.

In a possible implementation, the second-stage separation module is configured to perform blind separation on the plurality of pieces of sound source data. The second separation data includes the plurality of pieces of separated sound source data.

In another possible implementation, the second-stage separation module is configured to extract the sound source data of the target object from the plurality of pieces of sound source data. The second separation data includes the extracted sound source data of the target object.

In another possible implementation, the second-stage separation module is configured to extract the sound source data of the target object from the plurality of pieces of sound source data based on video information. The second separation data includes the extracted sound source data of the target object.

In another possible implementation, the second-stage separation module is configured to extract at least one piece of sound source data in a target direction from the plurality of pieces of sound source data. The second separation data includes the at least one piece of sound source data in the target direction.

It should be noted that, for fusion of multi-channel features, selection of the network structure, the separation task design, use of the cost function, and use of a separation result, refer to related descriptions of the first-stage separation processing. Details are not described herein again.

Step 307: Perform second-stage wakeup processing based on the multi-channel feature data, the first separation data, and the second separation data to obtain second wakeup data.

Optionally, the electronic device invokes, based on the multi-channel feature data, the first separation data, and the second separation data, a second-stage wakeup module that completes training in advance to output the second wakeup data. The second-stage wakeup module is configured to perform second-stage wakeup processing. The second-stage wakeup processing is offline sound source wakeup processing.

Optionally, the first wakeup data further includes orientation information corresponding to a wakeup keyword. The electronic device invokes, based on the multi-channel feature data, the first separation data, the second separation data, and the orientation information corresponding to the wakeup keyword, the second-stage wakeup module to output the second wakeup data.

It should be noted that, for descriptions of the multi-channel feature data, the first separation data, and the second separation data, refer to related descriptions in the foregoing steps. Details are not described herein again.

Optionally, the electronic device inputs the multi-channel feature data, the first separation data, and the second separation data into the second-stage wakeup module to output the second wakeup data.

Optionally, the second-stage wakeup module is modeled by using a fixed wakeup keyword. The second-stage wakeup module is a wakeup model in a multiple-input single-output form, that is, a wakeup solution is a multiple-input single-output streaming wakeup solution (MISO-KWS). Alternatively, the second-stage wakeup module is modeled by using a phoneme. The second-stage wakeup module includes a wakeup model in a multiple-input multiple-output form and a second post-processing module (for example, a decoder), that is, a wakeup solution is a multiple-input multiple-output streaming wakeup solution (MIMO-KWS).

Optionally, the second-stage wakeup module uses a dpconformer network structure. Alternatively, the second-stage wakeup module uses any one of the following network structures: a DNN, an LSTM, and a CNN. It should be noted that the second-stage wakeup module may alternatively use another network structure suitable for an offline scenario. For a network structure of the second-stage wakeup module, refer to the network structure of the second-stage separation module. This is not limited in this embodiment of this application.

A wakeup task design of the second-stage wakeup module may be a single-task design of a wakeup task, or may be a multi-task design of the wakeup task and another task. Optionally, the another task includes an orientation estimation task and/or a sound source object recognition task.

Optionally, the second wakeup data includes a third confidence level. The third confidence level indicates a probability that the original first microphone data includes a preset wakeup keyword.

Optionally, the second wakeup data includes fourth confidence levels respectively corresponding to the plurality of pieces of sound source data. The fourth confidence level of the sound source data indicates an acoustic feature similarity between the sound source data and the preset wakeup keyword. For ease of description, the following uses only an example in which the second wakeup data includes the third confidence level, and the third confidence level indicates the probability that the original first microphone data includes the preset wakeup keyword.

Optionally, the second wakeup data further includes orientation information corresponding to a wakeup event and/or object information of a wakeup object.

Step 308: Determine a wakeup result based on the second wakeup data.

The electronic device determines the wakeup result based on the second wakeup data. The wakeup result includes either a wakeup success or a wakeup failure.

Optionally, the electronic device sets a second threshold of the second-stage wakeup module. The second threshold is a threshold for allowing the electronic device to be woken up successfully. For example, the second threshold is greater than the first threshold.

In a possible implementation, the second wakeup data includes the third confidence level. The third confidence level indicates the probability that the original first microphone data includes the preset wakeup keyword. When the third confidence level in the second wakeup data is greater than the second threshold, the electronic device determines that the wakeup result is the wakeup success. When the third confidence level is less than or equal to the second threshold, the electronic device determines that the wakeup result is the wakeup failure, and the process ends.

In another possible implementation, the second wakeup data includes the fourth confidence levels respectively corresponding to the plurality of pieces of sound source data. The fourth confidence level of the sound source data indicates the acoustic feature similarity between the sound source data and the preset wakeup keyword. When any fourth confidence level in the second wakeup data is greater than the second threshold, the electronic device determines that the wakeup result is the wakeup success. When each fourth confidence level in the second wakeup data is less than or equal to the second threshold, the electronic device determines that the wakeup result is the wakeup failure, and the process ends.

Optionally, when the second wakeup data indicates that wakeup succeeds, the electronic device outputs a wakeup success identifier, or outputs the wakeup success identifier and other information. The wakeup success identifier indicates that wakeup succeeds. The other information includes the orientation information corresponding to the wakeup event and the object information of the wakeup object.

It should be noted that, a false wakeup situation is reduced while a wakeup rate is ensured, two stages of wakeup processing modules are designed in this embodiment of this application. After first-stage wakeup succeeds, a more complex second-stage wakeup module is invoked to perform offline wakeup determining on data obtained after first-stage wakeup succeeds. To better support a two-stage test like the wakeup solution, the separation module is also designed at two stages. A first-stage separation solution is streaming and needs to be running continuously. Therefore, the first-stage separation module needs to be designed with causal streaming. A streaming design usually causes a loss of separation performance. Therefore, after first-stage wakeup succeeds, a second-stage separation solution may be performed on output data. Because the second-stage wakeup solution is an offline scenario, an offline design solution may be used for a second wakeup solution, and data that has been output at the first stage may also be used in the second-stage separation solution. Finally, better separation performance is obtained, and a two-stage wakeup effect is better supported.

Figure 4:
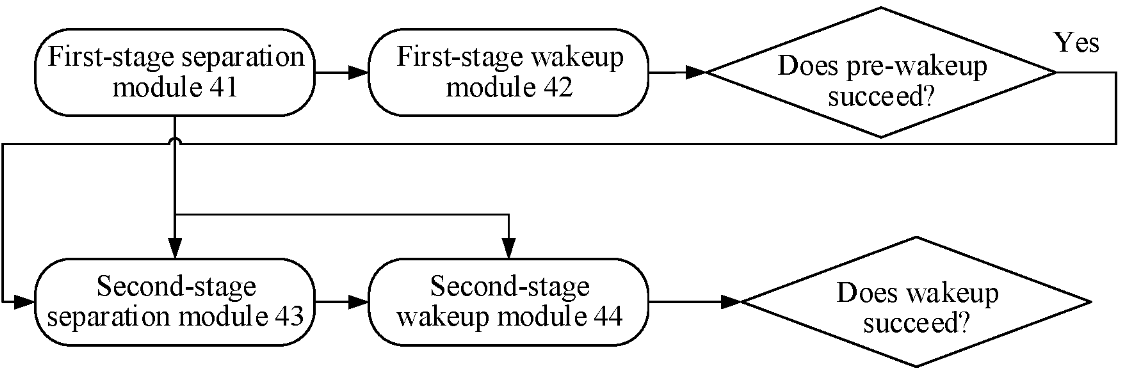
FIG. 4 is a schematic diagram of a principle of a voice wakeup method according to an example embodiment of this application.

In an example, as shown in FIG. 4, an electronic device includes a first-stage separation module 41 (including a first-stage separation model), a first-stage wakeup module 42, a second-stage separation module 43 (including a second-stage separation model), and a second-stage wakeup module 44. The electronic device inputs original first microphone data to a preprocessing module for preprocessing (for example, acoustic echo cancellation, de-reverberation, and beam filtering processing) to obtain multi-channel feature data, inputs the multi-channel feature data into the first-stage separation module 41 for first-stage separation processing to obtain first separation data, and inputs the multi-channel feature data and the first separation data into the first-stage wakeup module 42 for first-stage wakeup processing to obtain first wakeup data. The electronic device determines, based on the first wakeup data, whether pre-wakeup succeeds. If it is determined that pre-wakeup succeeds, the multi-channel feature data and the first separation data are input into the second-stage separation module 43 for second-stage separation processing to obtain second separation data, and the multi-channel feature data, the first separation data, and the second separation data are input into the second-stage wakeup module 44 for second-stage wakeup processing to obtain second wakeup data. The electronic device determines, based on the second wakeup data, whether wakeup succeeds.

The voice wakeup method provided in embodiments of this application is optimized and designed mainly from two perspectives: a multi-sound source separation technology and a wakeup technology, to greatly resolve the foregoing technical problem. The following separately describes the multi-sound source separation technology and the wakeup technology that are used in embodiments of this application.

Figure 5:
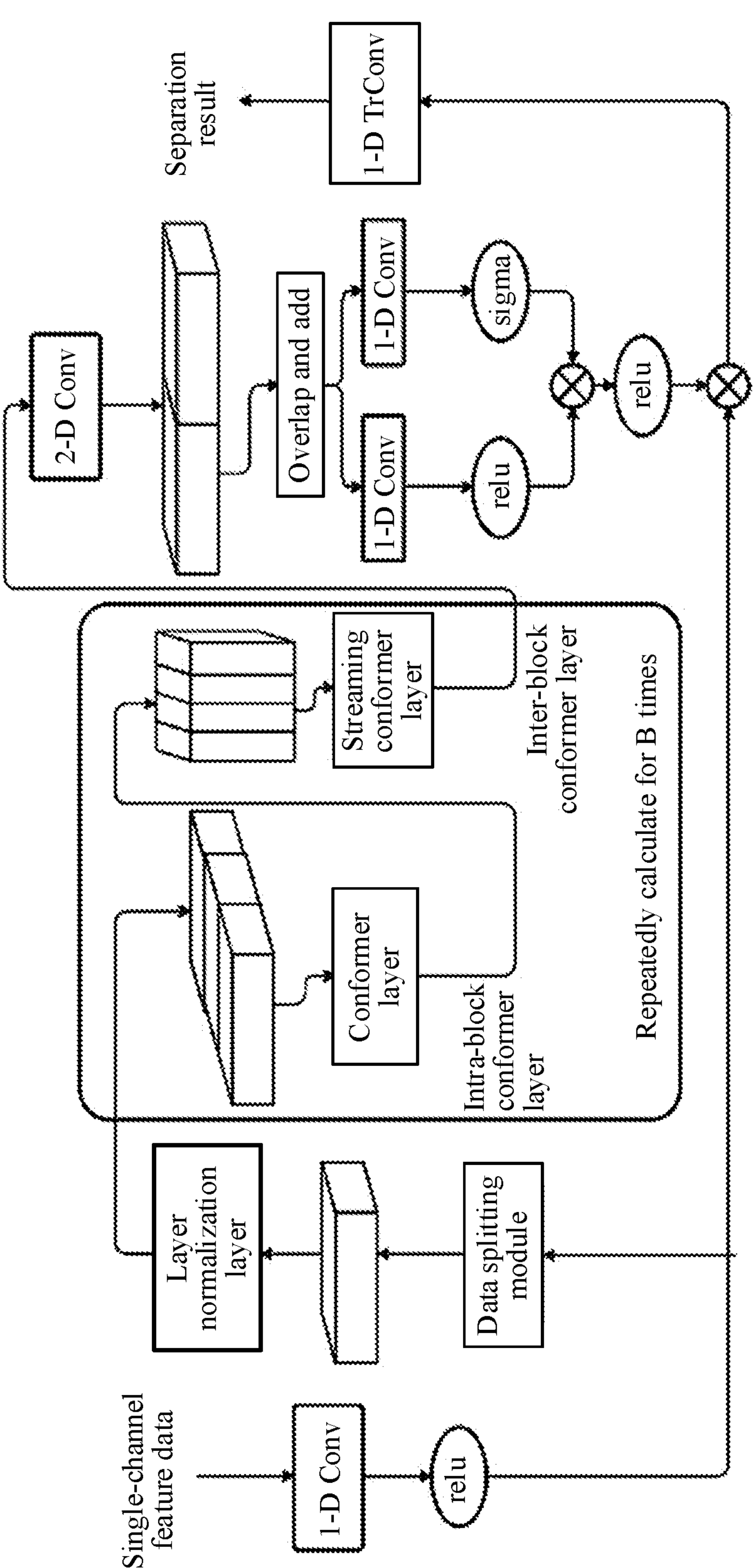
FIG. 5 is a schematic diagram of a dpconformer network structure according to an example embodiment of this application.

Before the multi-sound source separation technology and the wakeup technology are described, a dpconformer network structure is described first. A schematic diagram of the dpconformer network structure is shown in FIG. 5. A dpconformer network includes a coding layer, a separation layer, and a decoding layer.

1. Coding layer: The dpconformer network receives single-channel feature data, and the data is input into a one-dimensional convolution (1-D Cony) layer to obtain intermediate feature data. For example, the intermediate feature data is a two-dimensional matrix.

Optionally, a one-dimensional convolution operation is performed on the input single-channel feature data, and the input single-channel feature data is transformed into hidden space of input time domain data by using the following formula: X=RELU(x*W), where x is single-channel feature data in time domain, W is a weight coefficient corresponding to coding transformation, and the one-dimensional convolution operation is performed on x by using W based on a fixed convolution kernel size and a fixed convolution step, to finally obtain encoded intermediate feature data that satisfies $X \in R^{N*I}$, where N is a dimension of coding, I is a total quantity of frames in time domain, and the intermediate feature data X is an N*I-dimensional two-dimensional matrix.

2. The separation layer includes a data splitting module, an intra-block conformer layer, and an inter-block conformer layer.

(1) Data Splitting Module

An input parameter of the data splitting module is intermediate feature data. An output parameter is a three-dimensional tensor. To be specific, the data splitting module is configured to represent the intermediate feature data as the three-dimensional tensor based on a data frame division and segmentation manner, and the three-dimensional tensor corresponds to an intra-block feature, an inter-block feature, and a feature dimension.

Optionally, an N*I-dimensional two-dimensional matrix is equally split into an N*K*P-dimensional three-dimensional tensor based on blocks, where N is a feature dimension, K is a quantity of blocks, P is a length of the block, and P/2 blocks overlap.

(3) Intra-Block Conformer Layer

An input parameter of the intra-block conformer layer is a three-dimensional tensor output by the data splitting module. An output parameter is a first intermediate parameter.

Optionally, the conformer layer includes at least one of a linear layer, a multi-head self-attention (MHSA) layer, and a convolution layer.

Optionally, intra-block conformer calculation is performed on K blocks whose lengths are P by using the following formula:

$$z_b^{intra} = IntraConformer_b\left[z_{b-1}^{inter}\right] = \left[\text{Conformer}\left(z_{b-1}^{inter}[:, :, i], i = 1, \ldots, P\right)\right],$$

where b is a $b^{th}$ dpconformer submodule in which an intra-block conformer is currently located. B dpconformer submodules are included in total. Each dpconformer submodule includes one intra-block conformer layer and one inter-block conformer layer. B is a positive integer.

It should be noted that, in a streaming scenario and an offline scenario, calculation manners of the intra-block conformer layer are the same.

(4) Inter-Block Conformer Layer

An input parameter of the inter-block conformer layer is the first intermediate parameter output by the intra-block conformer layer. An output parameter is a second intermediate parameter.

Optionally, in the offline scenario, in each same dimension of an inter-block P, inter-block conformer calculation is performed by using the following formula:

$$z_b^{inter} = InterConformer_b\left[z_b^{intra}\right] = \left[\text{Conformer}\left(z_b^{intra}[:, k, :], k = 1, \ldots, K\right)\right].$$

The inter-block conformer layer calculates attention on all features of an entire audio in the offline scenario. In the streaming scenario, to control a delay, a mask mechanism is used to calculate only attention of a current block and a previous moment to ensure causality.

Optionally, in the streaming scenario, a block corresponding to a current moment is t, and inter-block conformer calculation of the current block t has an association relationship with only a block corresponding to a historical moment and the current block t, and is irrelevant to a block t+1. Therefore, inter-block conformer calculation is performed by using the following formula:

$$z_b^{inter}(t) = InterConformer_b\left[z_b^{intra}(t)\right] = \left[\text{Conformer}\left(z_b^{intra}[:, k, :], k = 1, \ldots, t\right)\right].$$

Calculation is performed on B intra-block conformer layers and inter-block conformer layers, in other words, the intra-block conformer layer and the inter-block conformer layer are repeatedly calculated for B times.

Then, the three-dimensional N*K*P tensor input into a 2-D Cony layer is converted into C N*I two-dimensional matrices, and correspondingly, a mask matrix M of C sound sources is obtained, where M is a preset quantity of sound sources to be separated.

3. Decoding Layer

A separation result, namely, a plurality of pieces of separated sound source data, is finally obtained by using a one-dimensional convolution layer based on a mask matrix M of each sound source and a hidden space representation of the sound source.

Figure 6:
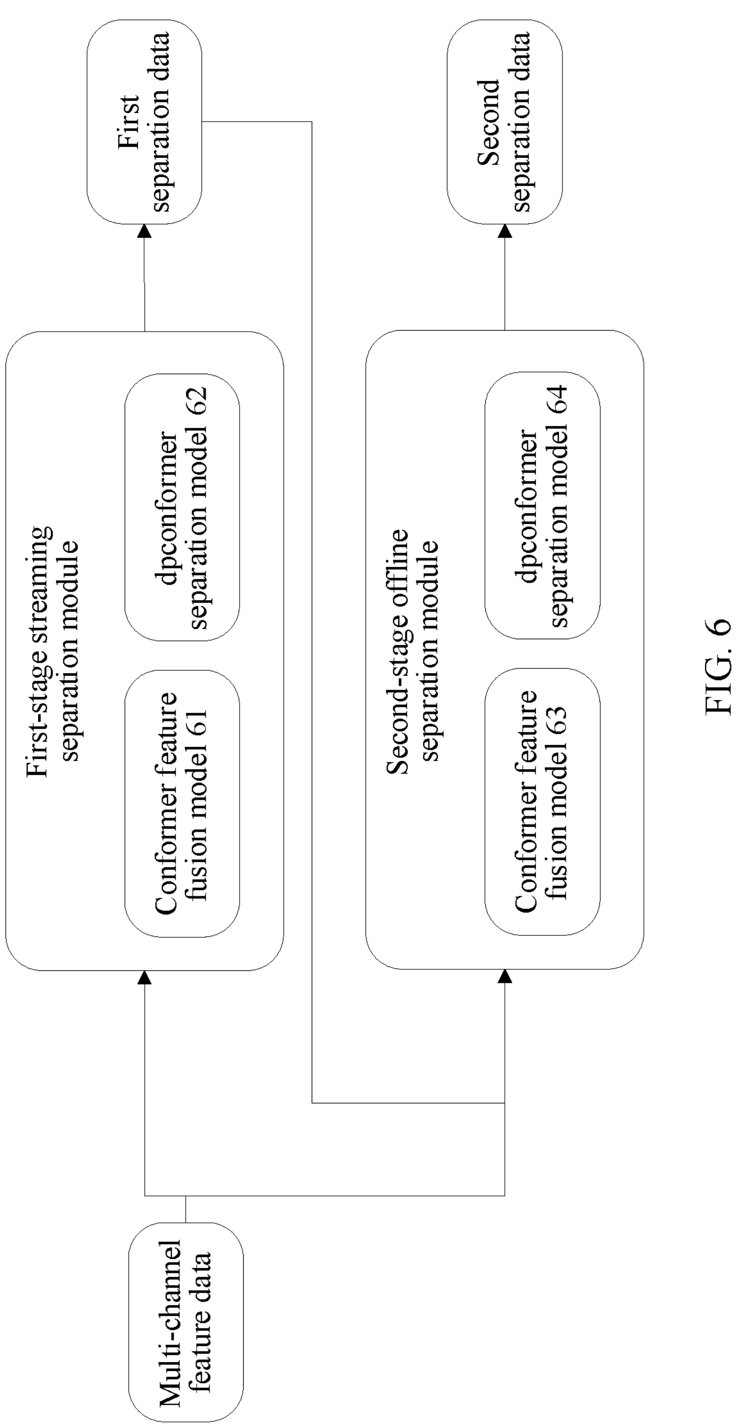
FIG. 6 is a schematic diagram of a principle of a two-stage separation solution according to an example embodiment of this application.

A multi-sound source separation solution provided in embodiments of this application is a two-stage separation solution. That both a multi-feature fusion model and a separation module in the two-stage separation solution use the dpconformer network structure provided in FIG. 5 is used as an example. The two-stage separation solution is shown in FIG. 6.

A first-stage streaming separation module includes a conformer feature fusion model 61 and a dpconformer separation model 62. A second-stage offline separation module includes a conformer feature fusion model 63 and a dpconformer separation model 64. The first-stage streaming separation module may be the foregoing first-stage separation module 41. The second-stage offline separation module may be the foregoing second-stage offline separation module 43.

An electronic device inputs multi-channel feature data into the conformer feature fusion model 61 to output single-channel feature data, and inputs the single-channel feature data into the dpconformer separation model 62 to output first separation data. When pre-wakeup succeeds, the multi-channel feature data and the first separation data are input into the conformer feature fusion model 63 to output the single-channel feature data, and the single-channel feature data is input into the dpconformer separation model 64 to output second separation data.

It should be noted that, for ease of description, only a first-stage separation solution in the two-stage separation solution is used as an example. For a second-stage separation solution, refer to the first-stage separation solution. Details are not described again.

Figure 7:
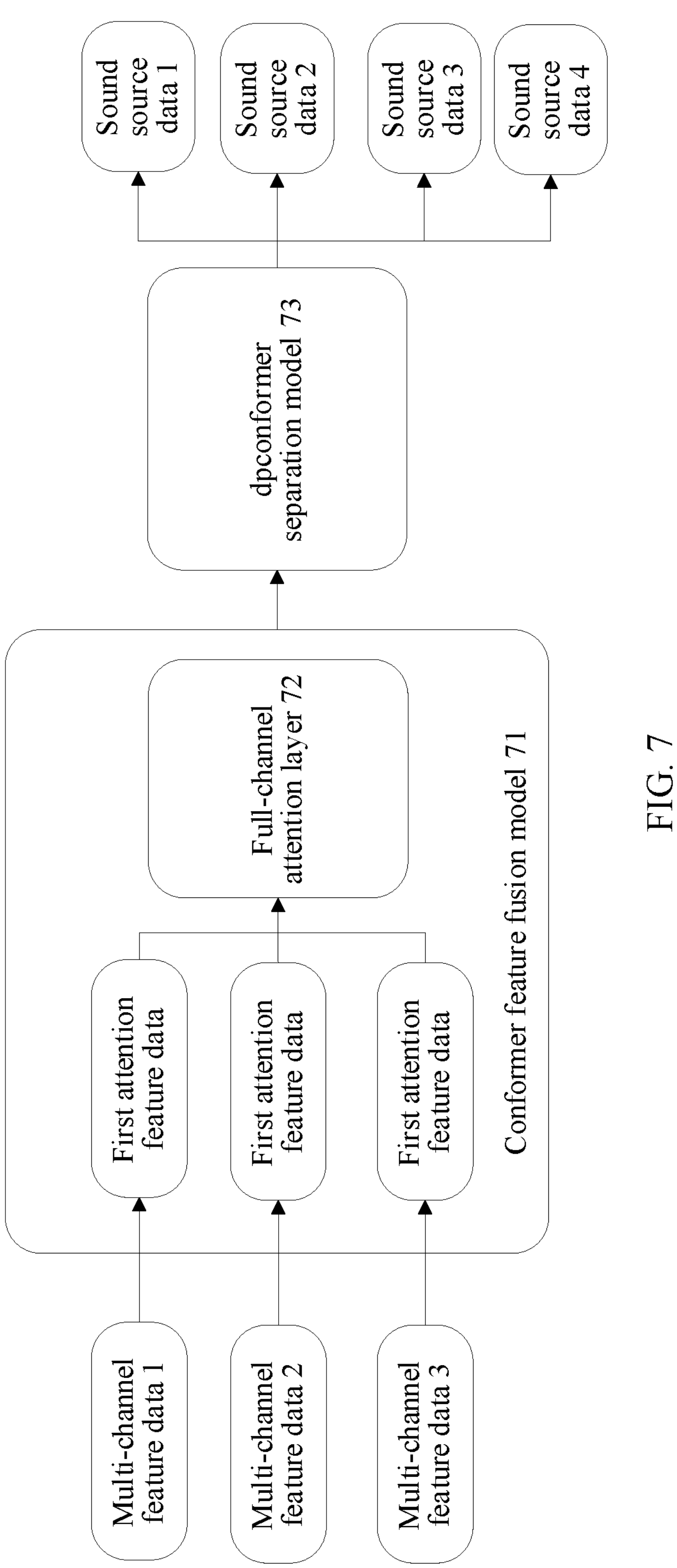
FIG. 7 to FIG. 14 are schematic diagrams of principles of several possible implementations of a first-stage separation solution according to example embodiments of this application.

In a possible implementation, the first-stage separation solution includes a blind separation technology. The first-stage separation solution includes but is not limited to the following several aspects, as shown in FIG. 7.

(1) A feature input part includes multi-channel feature data. In a multi-microphone scenario, the multi-channel feature data includes multi-group multi-channel feature data. Optionally, the multi-channel feature data includes at least one group of multi-channel feature data of original time domain data of a plurality of microphones, corresponding multi-channel transform-domain data, multi-group IPD data, output data of a plurality of fixed beams in preset directions, and directional feature data in each preset direction. For example, the feature input part includes three groups of multi-channel feature data: multi-channel feature data 1, multi-channel feature data 2, and multi-channel feature data 3. A quantity of groups of multi-channel feature data is not limited in embodiments of this application.

(2) A conformer feature fusion model 71 is configured to fuse the multi-group multi-channel feature data into single-channel feature data. First, intra-group inter-channel first attention feature data is calculated for each group of multi-channel feature data based on a conformer layer. Then, inter-channel first attention feature data in each group is uniformly input into another conformer layer, namely, a full-channel attention layer 72, to obtain second attention feature data of the group, and then the obtained data is inputted into a pooling layer or a projection layer to obtain a single-channel intermediate feature representation, namely, the single-channel feature data.

(3) dpconformer separation model 73: The single-channel feature data obtained after the multi-group multi-channel feature data are fused is input into the dpconformer separation model to output M pieces of estimated sound source data, where M is a positive integer. For example, the M pieces of estimated sound source data include sound source data 1, sound source data 2, sound source data 3, and sound source data 4. This is not limited in embodiments of this application.

(4) Design of a cost function: When the cost function is trained, output of a plurality of pieces of sound source data and corresponding annotations of the plurality of pieces of sound source data have a permutation confusion problem. Therefore, a permutation invariant training (PIT) criterion needs to be used. To be specific, all possible annotation sequences corresponding to the plurality of pieces of sound source data are determined, loss values respectively corresponding to a plurality of annotation sequences are calculated based on the plurality of annotation sequences and an output parameter of the cost function, and gradient calculation is performed based on an annotation sequence with a smallest loss value. In addition to training the cost function by using the foregoing method, a fixed sorting order may be set by using prior information of the plurality of sound source data, to avoid a problem that loss value calculation complexity is high due to an increase in a quantity of pieces of sound source data. The prior information of the sound source data includes a start moment of the sound source data. The plurality of pieces of sound source data are sequentially sorted in ascending order of the start moments.

Figure 8:
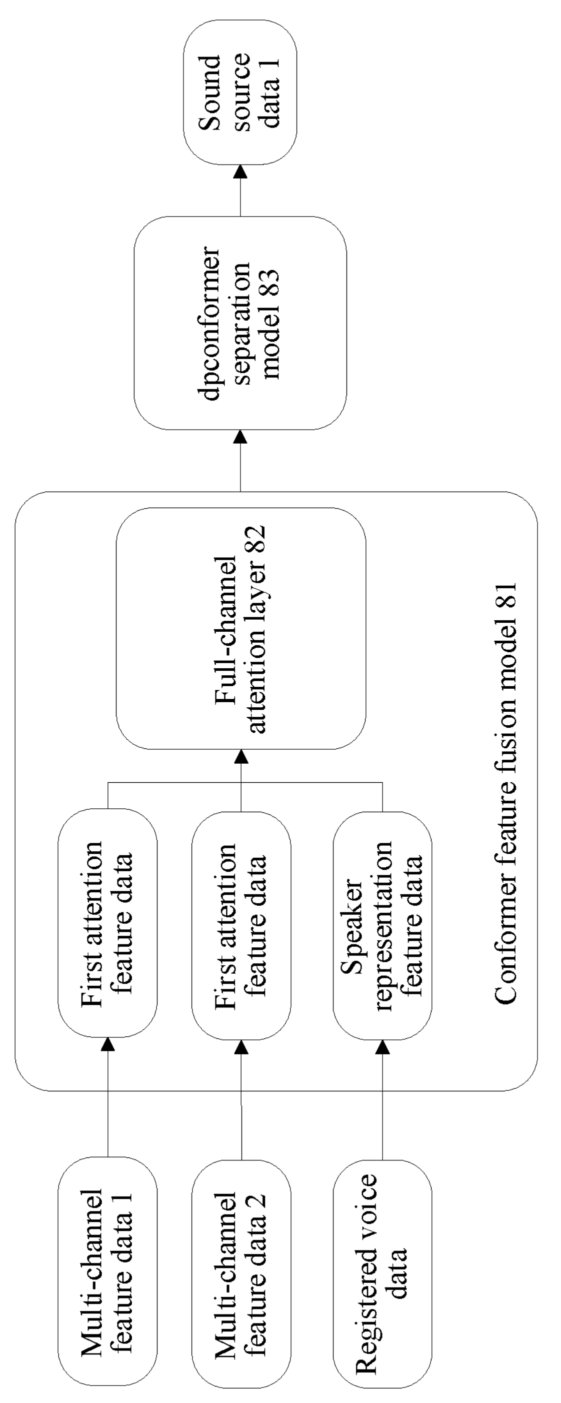

In another possible implementation, the first-stage separation solution includes a specific person extraction technology. The specific person extraction technology is another main technical solution in a multi-sound source interference scenario. The first-stage separation solution includes but is not limited to the following several aspects, as shown in FIG. 8.

(1) A feature input part includes multi-channel feature data and registered voice data. Different from the first-stage separation solution provided in FIG. 7, in this solution, in a specific person extraction scenario, a target object needs to be registered, and registered voice data of the target object is used as additional feature data for input. For example, the feature input part includes multi-channel feature data 1, multi-channel feature data 2, and the registered voice data. A quantity of groups of multi-channel feature data is not limited in embodiments of this application.

(2) A conformer feature fusion model 81 is configured to fuse multi-group multi-channel feature data and the registered voice data into single-channel feature data. First, intra-group inter-channel first attention feature data is calculated for each group of multi-channel feature data based on a conformer layer. Then, inter-channel first attention feature data in each group and speaker representation feature data of the target object are uniformly input into a full-channel attention layer 82. The full-channel attention layer 82 is configured to: calculate a correlation between the speaker representation feature data of the target object and other multi-channel feature data, and fuse the data to output a single-channel feature.

Optionally, the registered voice data of the target object is input into a speaker representation model to output an embedding representation, namely, the speaker representation feature data, of the target object. The speaker representation model is obtained through pre-training. The speaker representation model is obtained by using a standard speaker recognition training method.

Optionally, the speaker representation feature data of the target object is pre-stored in an electronic device in a form of a vector.

(3) dpconformer separation model 83: The single-channel feature data is input into the dpconformer separation model 83 to output sound source data of the target object. In other words, an output parameter of the dpconformer separation model 83 is a single-output parameter, and an expected output parameter is the sound source data of the target object. For example, the sound source data of the target object is sound source data 1.

(4) For a design of a cost function, refer to descriptions of the foregoing cost function. Details are not described herein again.

Figure 9:
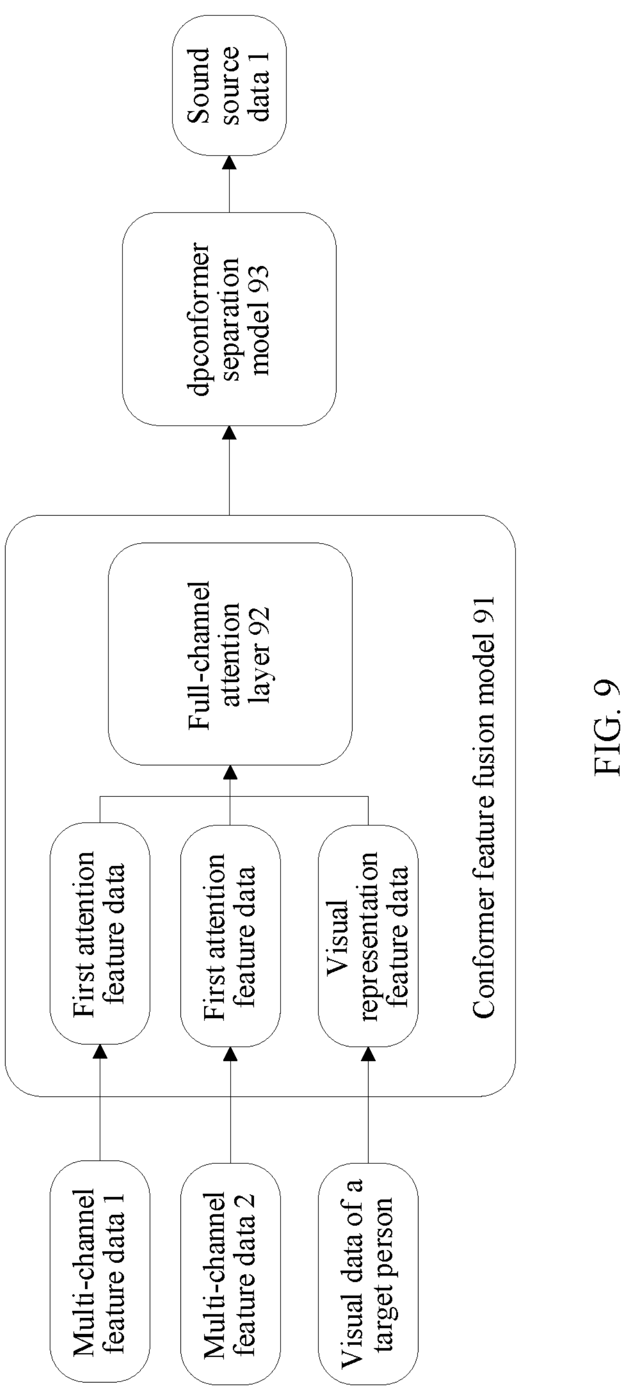

In another possible implementation, the first-stage separation solution includes a specific person extraction technology assisted by visual data. The first-stage separation solution includes but is not limited to the following several aspects, as shown in FIG. 9.

(1) A feature input part includes multi-channel feature data and visual data of a target person. In some specific scenarios, for example, scenarios in which cameras are assembled on electronic devices such as a television, a mobile phone, a robot, and a vehicle-mounted device. The electronic devices may obtain visual data of a target object, that is, the visual data of the target person, by using the cameras. In the scenarios, the visual data of the target person may be used to assist in performing a specific person extraction task. For example, the feature input part includes multi-channel feature data 1, multi-channel feature data 2, and the visual data of the target person. A quantity of groups of multi-channel feature data is not limited in embodiments of this application.

(2) A conformer feature fusion model 91 is configured to fuse multi-group multi-channel feature data and the visual data into single-channel feature data. First, intra-group inter-channel first attention feature data is calculated for each group of multi-channel feature data based on a conformer layer. Then, inter-channel first attention feature data in each group and visual representation feature data of the target object are uniformly input into a full-channel attention layer 92. The full-channel attention layer 92 is configured to: calculate a correlation between the visual representation feature data of the target object and other multi-channel feature data, and fuse the data to output a single-channel feature.

Optionally, the electronic device invokes, based on the visual data of the target person, a visual classification model that has been pre-trained to output a vector representation, namely, the visual representation feature data, of the target object. For example, the visual classification model includes a lip-reading recognition model. The visual data of the target person includes visual data of a speech activity. This is not limited in embodiments of this application.

(3) dpconformer separation model 93: The single-channel feature data is input into the dpconformer separation model 93 to output sound source data of the target object. In other words, an output parameter of the dpconformer separation model 93 is a single-output parameter, and an expected output parameter is the sound source data of the target object. For example, the sound source data of the target object is sound source data 1.

(4) For a design of a cost function, refer to descriptions of the foregoing cost function. Details are not described herein again.

Figure 10:
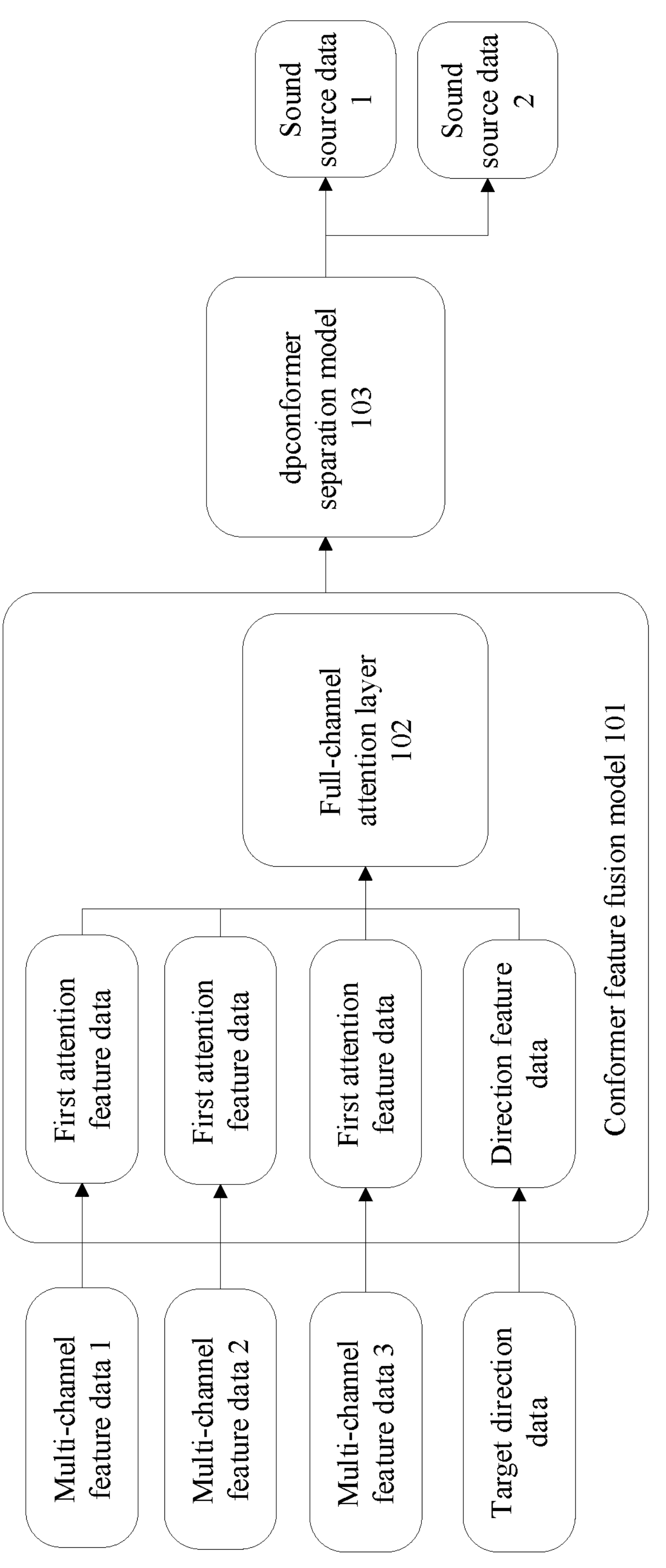

In another possible implementation, the first-stage separation solution includes a specific direction extraction technology. The specific direction extraction technology is a technology for extracting sound source data in a preset target direction in a multi-sound source interference scenario. The first-stage separation solution includes but is not limited to the following several aspects, as shown in FIG. 10.

(1) A feature input part includes multi-channel feature data and target direction data. For details, refer to the specific person extraction technology provided in FIG. 8. In the scenario, the target direction data is used as additional feature data for input. For example, the feature input part includes multi-channel feature data 1, multi-channel feature data 2, multi-channel feature data 3, and the target direction data. A quantity of groups of multi-channel feature data is not limited in embodiments of this application.

(2) A conformer feature fusion model 101 is configured to fuse multi-group multi-channel feature data and the target direction data into single-channel feature data. First, intra-group inter-channel first attention feature data is calculated for each group of multi-channel feature data based on a conformer layer. Then, inter-channel first attention feature data in each group and direction feature data of the target direction data are uniformly input into a full-channel attention layer 102. The full-channel attention layer 102 is configured to: calculate a correlation between the direction feature data of the target direction data and other multi-channel feature data, and fuse the data to output a single-channel feature.

Optionally, the direction feature data of the target direction data is calculated based on the target direction data and microphone location information of a microphone array.

Optionally, the direction feature data of the target direction data is pre-stored in an electronic device.

(3) dpconformer separation model 103: The single-channel feature data is input into the dpconformer separation model 103 to output at least one piece of sound source data in a target direction. In other words, an output parameter of the dpconformer separation model 103 is a single-output parameter or multiple-output parameter, and an expected output parameter is the at least one piece of sound source data in the target direction. For example, the at least one piece of sound source data in the target direction includes sound source data 1 and sound source data 2.

(4) For a design of a cost function, refer to descriptions of the foregoing cost function. Details are not described herein again.

It should be noted that the several possible implementations of the foregoing first-stage separation solution may be implemented in combination with pairs, or any three of the possible implementations may be implemented in combination, or all of the possible implementations may be implemented in combination. This is not limited in embodiments of this application.

Figure 11:
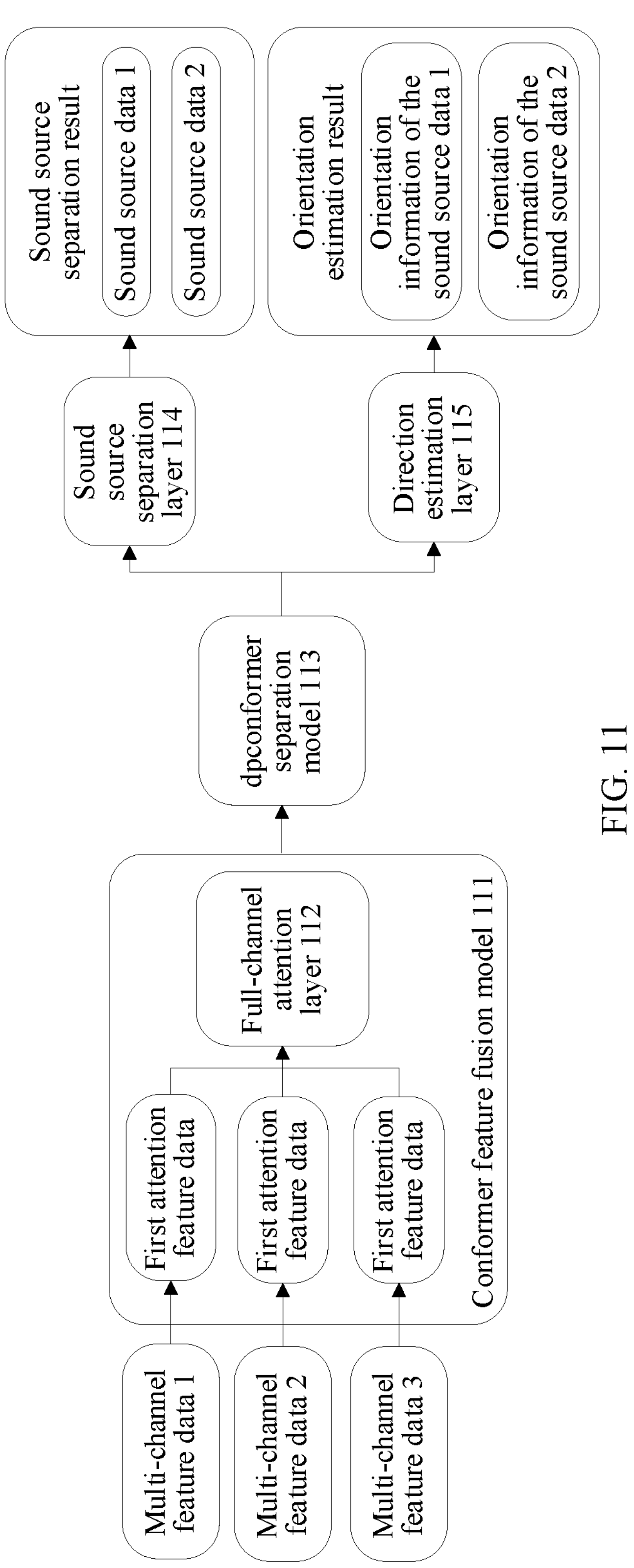

In another possible implementation, the first-stage separation solution includes a technology for performing multi-task design on blind separation and multi-sound source positioning. The first-stage separation solution includes but is not limited to the following several aspects, as shown in FIG. 11.

(1) A feature input part includes multi-channel feature data.

(2) A conformer feature fusion model 111 (including a full-channel attention layer 112) is configured to fuse multi-group multi-channel feature data into single-channel feature data.

(3) dpconformer separation model 113, sound source separation layer 114, and direction estimation layer 115: The single-channel feature data is input into the dpconformer separation model 113 to output an intermediate parameter, the intermediate parameter is input into the sound source separation layer 114 to output a sound source separation result, the intermediate parameter is input into the direction estimation layer 115 to output an orientation estimation result, the sound source separation result includes m pieces of separated sound source data, and the orientation estimation result includes orientation information respectively corresponding to the m pieces of sound source data. For example, an output parameter includes sound source data 1, sound source data 2, orientation information of the sound source data 1, and orientation information of the sound source data 2.

The sound source separation layer 114 and the direction estimation layer 115 may be disposed outside the dpconformer separation model 113 as independent modules. To be specific, the sound source separation layer 114 and the direction estimation layer 115 are disposed at an output end of the dpconformer separation model 113. For example, an $i^{th}$ piece of orientation information output by the direction estimation layer 115 is orientation information of an $i^{th}$ piece of sound source data separated by the sound source separation layer 114, where i is a positive integer.

Optionally, the orientation information is an orientation label in a form of a one-hot vector. For example, in a multi-sound source positioning technology, a horizontal orientation is 360 degrees, and an example in which a resolution gamma=10 degrees is used. The horizontal orientation is equally divided into 360/gamma=36 parts, that is, an output dimension is 36 dimensions, and the direction information is a 36-dimensional one-hot vector.

(4) Design of a Cost Function

Optionally, a PIT criterion is used for cost functions of both a separation task and a direction estimation task.

It should be noted that, for descriptions of the foregoing several aspects, refer to related descriptions in the foregoing embodiments. Details are not described herein again.

Figure 12:
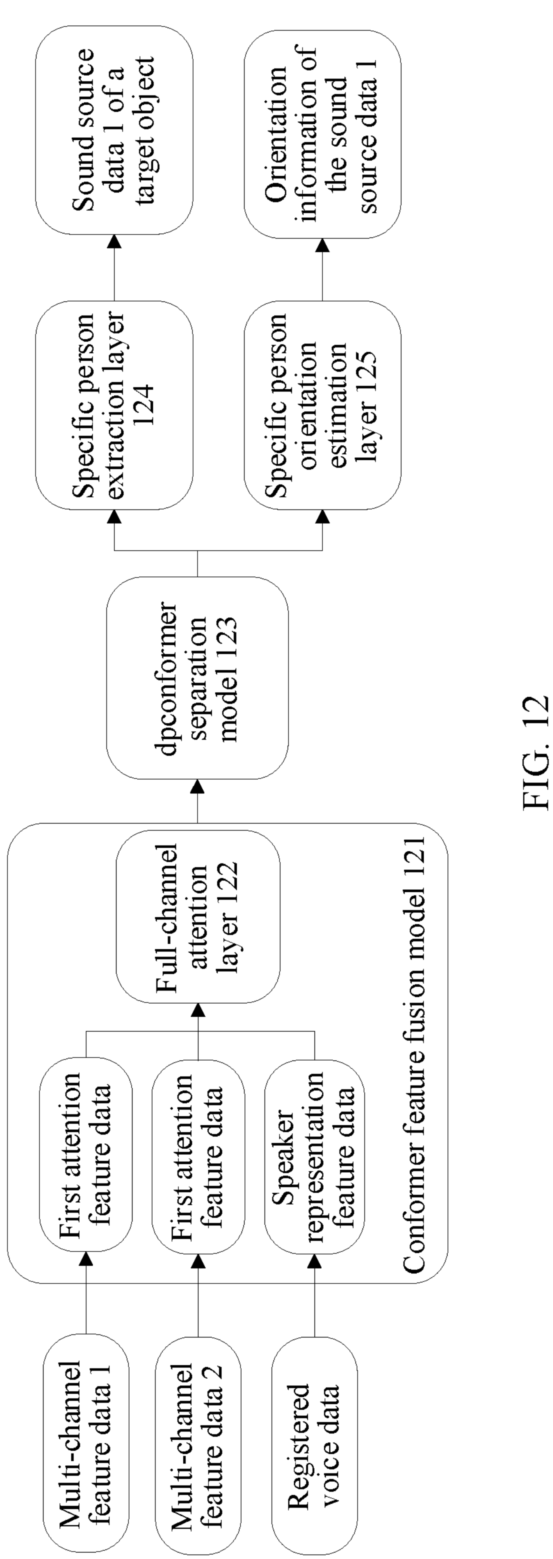

In another possible implementation, the first-stage separation solution includes a technology for performing multi-task design on specific person extraction and specific person orientation estimation. The first-stage separation solution includes but is not limited to the following several aspects, as shown in FIG. 12.

(1) A feature input part includes multi-channel feature data and registered voice data.

(2) A conformer feature fusion model 121 (including a full-channel attention layer 122) is configured to fuse multi-group multi-channel feature data and the registered voice data into single-channel feature data.

(3) dpconformer separation model 123, specific person extraction layer 124, and specific person orientation estimation layer 125: The single-channel feature data is input into the dpconformer separation model 123 to output an intermediate parameter, the intermediate parameter is input into the specific person extraction layer 124 to output sound source data of a target object, and the intermediate parameter is input into the specific person orientation estimation layer 125 to output orientation information of the sound source data of the target object. For example, an output parameter includes sound source data 1 of the target object and orientation information of the sound source data 1. Optionally, the orientation information is an orientation label in a form of a one-hot vector.

After the registered voice data of the target object is given, the orientation label in the form of the one-hot vector is designed by using speaker representation feature data and other multi-channel feature data based on a dpconformer network structure, and a cross-entropy (CE) cost function is used for training. The technology for performing multi-task design on specific person extraction and specific person orientation estimation is to share the multi-channel feature data, the registered voice data, the conformer feature fusion model 121, and the dpconformer separation model 123 in two tasks. The specific person extraction layer 124 and the specific person orientation estimation layer 125 are disposed at an output end of the dpconformer separation model 123. Multi-task training is performed through weighting by using cost functions of a separation task and an orientation estimation task.

(4) Design of the Cost Function

It should be noted that, for descriptions of the foregoing several aspects, refer to related descriptions in the foregoing embodiments. Details are not described herein again.

Figure 13:
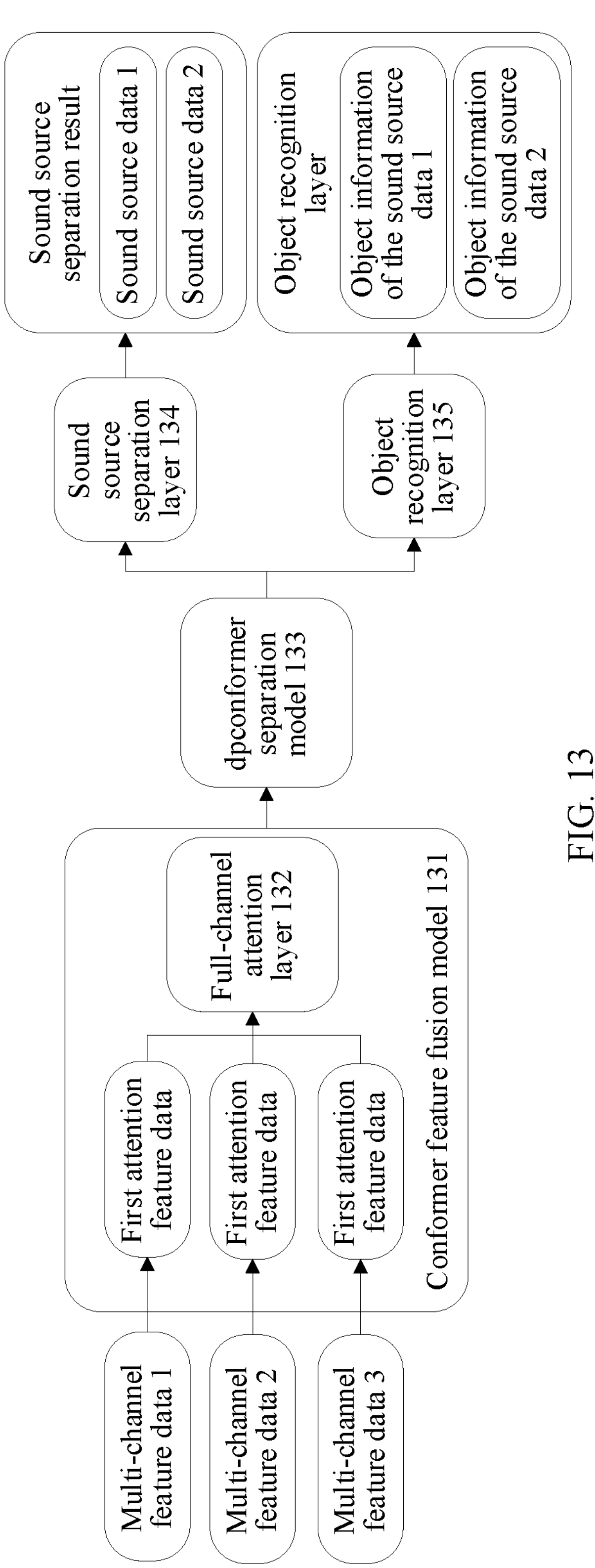

In another possible implementation, the first-stage separation solution includes a technology for performing multi-task design on blind separation and multi-speaker recognition. The technology for performing multi-task design on blind separation and multi-speaker recognition is to separate a plurality of pieces of sound source data from microphone data, and identify object information respectively corresponding to the plurality of pieces of sound source data. The object information indicates an object identity of the sound source data. Optionally, an electronic device stores a correspondence between the plurality of pieces of sample sound source data and a plurality of pieces of object information. The first-stage separation solution includes but is not limited to the following several aspects, as shown in FIG. 13.

(1) A feature input part includes multi-channel feature data.

(2) A conformer feature fusion model 131 (including a full-channel attention layer 132) is configured to fuse multi-group multi-channel feature data into single-channel feature data.

(3) dpconformer separation model 133, sound source separation layer 134, and object recognition layer 135: The single-channel feature data is input into the dpconformer separation model 133 to output an intermediate parameter, the intermediate parameter is input into the sound source separation layer 134 to output a sound source separation result, the intermediate parameter is input into the object recognition layer 135 to output an object identification result, the sound source separation result includes m pieces of separated sound source data, and the object identification result includes object information respectively corresponding to the m pieces of sound source data. For example, an output parameter includes sound source data 1, sound source data 2, object information of the sound source data 1, and object information of the sound source data 2.

A separation task and an object recognition task share the multi-channel feature data, the conformer feature fusion model 131, and the dpconformer separation model 133. The sound source separation layer 134 and the object recognition layer 135 are disposed at an output end of the dpconformer separation model 133. The sound source separation layer 134 separates the plurality of pieces of sound source data. After completing frame-level feature calculation, the object recognition layer 135 performs segment-level feature fusion to obtain a segment-level multi-object representation. Each segment of object representation outputs an object identity of the segment representation. Corresponding object information is a one-hot vector indicating the object identity. Optionally, a quantity of dimensions of the one-hot vector is a quantity of objects, a location corresponding to one piece of sound source data in a one-hot vector corresponding to the sound source data is 1, indicating a speaking order of an object of the sound source data in a plurality of objects, and another location is 0.

An $i^{th}$ piece of object information output by the object recognition layer 135 is object information of an $i^{th}$ piece of sound source data separated by the sound source separation layer 134, where i is a positive integer.

(4) Design of a Cost Function

Optionally, a PIT criterion is used for cost functions of both the separation task and the object identification task.

It should be noted that, for descriptions of the foregoing several aspects, refer to related descriptions in the foregoing embodiments. Details are not described herein again.

Figure 14:
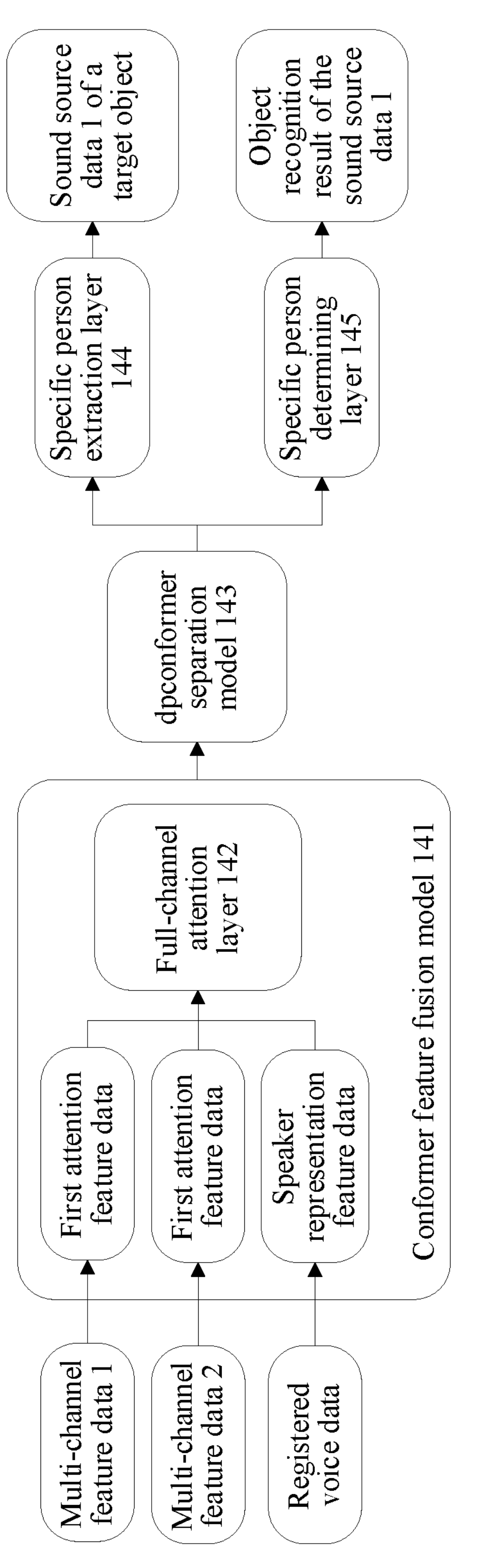

In another possible implementation, the first-stage separation solution includes a technology for performing multi-task design on specific person extraction and specific person determining. A specific person extraction task is to extract sound source data of a target object from microphone data by using registered voice data of the target object. However, for the independent specific person extraction task, the microphone data may not include the sound source data of the target object, but the specific person extraction task still outputs sound source data. Therefore, a specific person determining task needs to be set to determine the extracted sound source data. The specific person determining task is to determine whether the extracted sound source data is the same as the registered voice data of the target object, or determine whether an object corresponding to the extracted sound source data includes the target object. The technology for performing multi-task design on specific person extraction and specific person determining is to determine an object recognition result of the sound source data while extracting the sound source data of the target object. Similarly, the task is designed offline. The first-stage separation solution includes but is not limited to the following several aspects, as shown in FIG. 14.

(1) A feature input part includes multi-channel feature data and registered voice data.

(2) A conformer feature fusion model 141 (including a full-channel attention layer 142) is configured to fuse multi-group multi-channel feature data and registered voice data into single-channel feature data.

(3) dpconformer separation model 143, specific person extraction layer 144, and specific person determining layer 145: The single-channel feature data is input into the dpconformer separation model 143 to output an intermediate parameter, the intermediate parameter is input into the specific person extraction layer 144 to output the sound source data of the target object, the intermediate parameter is input into the specific person determining layer 145 to output the object recognition result of the sound source data, and the object recognition result indicates an acoustic feature similarity between the output sound source data and the registered voice data. Optionally, the object recognition result includes a probability that the object corresponding to the output sound source data is the target object. For example, an output parameter includes sound source data 1 of the target object and an object recognition result of the sound source data 1.

The specific person extraction task and the specific person determining task share the multi-channel feature data, the conformer feature fusion model 141, and the dpconformer separation model 143. The specific person extraction layer 144 and the specific person determining layer 145 are disposed at an output end of the dpconformer separation model 143.

(4) Design of a Cost Function

It should be noted that, for descriptions of the foregoing several aspects, refer to related descriptions in the foregoing embodiments. Details are not described herein again.

Figure 15:
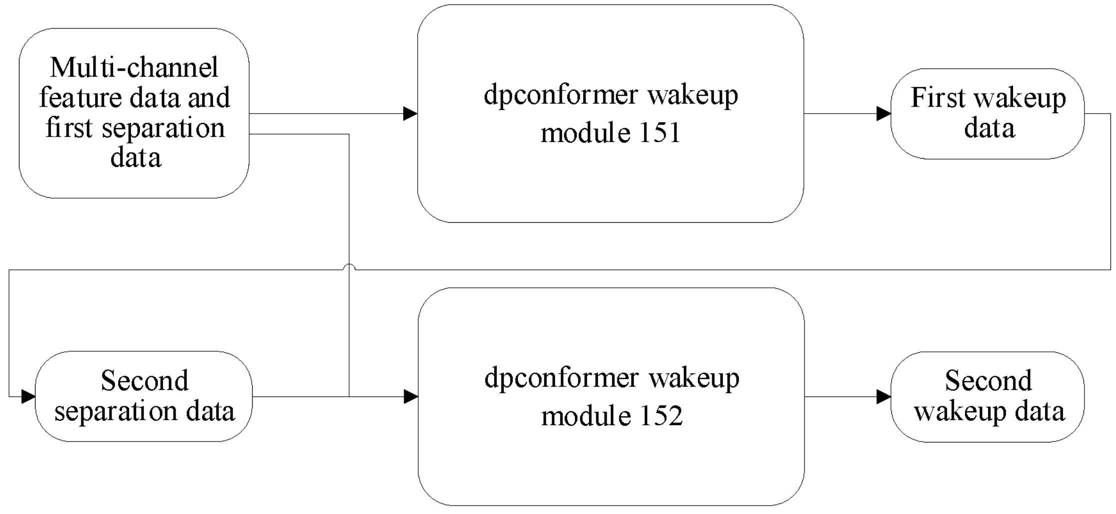
FIG. 15 is a schematic diagram of a principle of a two-stage wakeup solution according to an example embodiment of this application.

The wakeup solution in embodiments of this application is a two-stage wakeup solution. Both a first-stage wakeup module and a second-stage wakeup module in the two-stage wakeup solution are in a multi-input wakeup model structure. For example, the wakeup model structure is any one of the following network structures: a DNN, an LSTM, a CNN, a transformer, and a conformer. It should be noted that the wakeup model structure may alternatively use another network structure. For ease of description, only an example in which both the first-stage wakeup module and the second-stage wakeup module in the two-stage wakeup solution use the dpconformer network structure provided in FIG. 5 is used. The two-stage wakeup solution is shown in FIG. 15.

An electronic device inputs multi-channel feature data and first separation data into a dpconformer wakeup module 151 to output first wakeup data; when the first wakeup data indicates that pre-wakeup succeeds, inputs the multi-channel feature data, the first separation data, and second separation data into a dpconformer wakeup module 152 to output second wakeup data; and determines a wakeup result based on the second wakeup data.

It should be noted that, for ease of description, only a first-stage wakeup solution in the two-stage wakeup solution is used as an example. For a second-stage wakeup solution, refer to the first-stage wakeup solution. Details are not described again.

Figure 16:
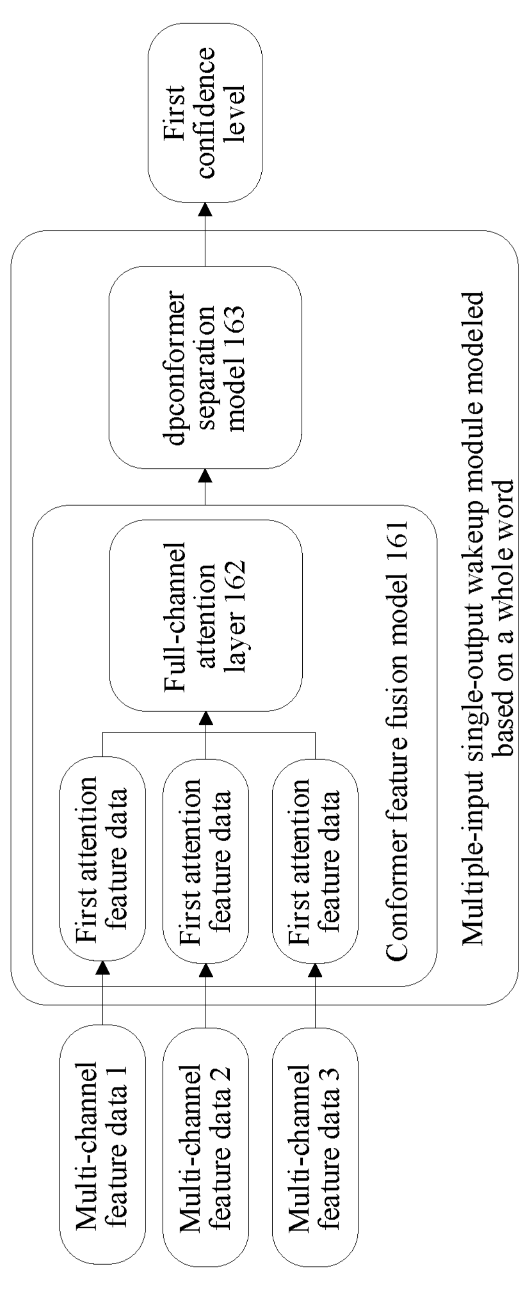
FIG. 16 to FIG. 19 are schematic diagrams of principles of several possible implementations of a first-stage wakeup solution according to example embodiments of this application.

In a possible implementation, the first-stage wakeup solution provided in embodiments of this application includes a multiple-input single-output wakeup technology for whole-word modeling. A first-stage wakeup module is a multiple-input single-output wakeup module modeled based on a whole word. As shown in FIG. 16, the first-stage wakeup solution includes but is not limited to the following several aspects.

(1) A feature input part includes multi-group multi-channel feature data. The multi-group multi-channel feature data includes multi-channel feature data obtained by preprocessing first microphone data and first separation data obtained by performing first-stage separation processing.

(2) A conformer feature fusion model 161 (including a full-channel attention layer 162) is configured to fuse the multi-group multi-channel feature data into single-channel feature data.

(3) dpconformer separation model 163: The single-channel feature data is input into the dpconformer separation model 163 to output a first confidence level, the first confidence level indicates a probability that the original first microphone data includes a preset wakeup keyword, and the preset wakeup keyword is a fixed wakeup keyword set by default.

For example, the preset wakeup keyword includes N wakeup keywords. The first confidence level output by the dpconformer separation model 163 is an (N+1)-dimensional vector. N dimensions of the (N+1)-dimensional vector respectively correspond to the N wakeup keywords. The other dimension corresponds to a category that does not belong to the N wakeup keywords. A value of each dimension in the (N+1)-dimensional vector is a probability value between 0 and 1. The probability value indicates a wakeup probability of a wakeup keyword at a corresponding location.

(4) Design of a Cost Function

It should be noted that, for descriptions of the foregoing several aspects, refer to related descriptions in the first-stage separation solution. Details are not described herein again.

In this embodiment, an output parameter of the dpconformer separation model 163 is a single-output parameter. A quantity of modeling units is a quantity of wakeup keywords plus one. An additional unit is a garbage unit. The garbage unit is configured to output a probability value of a word other than the wakeup keyword. The output parameter of the dpconformer separation model 163 is the first confidence level.

Optionally, two preset wakeup keywords are a preset wakeup keyword 1 and a preset wakeup keyword 2. A probability value of each modeling unit is one of a first value, a second value, and a third value. When the probability value is the first value, it indicates that sound source data does not include the preset wakeup keyword. When the probability value is the second value, it indicates that sound source data includes the preset wakeup keyword 1. When the probability value is the third value, it indicates that sound source data includes the preset wakeup keyword 2. For example, the preset wakeup keyword 1 is "Hey Celia", the preset wakeup keyword 2 is "Hello Celia", the first value is 0, the second value is 1, and the third value is 2. This is not limited in this embodiment of this application.

The first-stage wakeup module performs calculation in real time. For multi-group multi-channel feature data that is currently input, the first-stage wakeup module determines, in real time, whether the data includes a fixed wakeup keyword. When the output first confidence level is greater than a first threshold, it is determined that pre-wakeup succeeds. For the first-stage wakeup module, an electronic device determines that pre-wakeup succeeds, and in this case, complete wakeup keyword information has been received. A current moment is determined as a wakeup moment, to provide time point reference information for a second-stage separation module and a second-stage wakeup module, and start a second-stage offline separation module.

Figure 17:
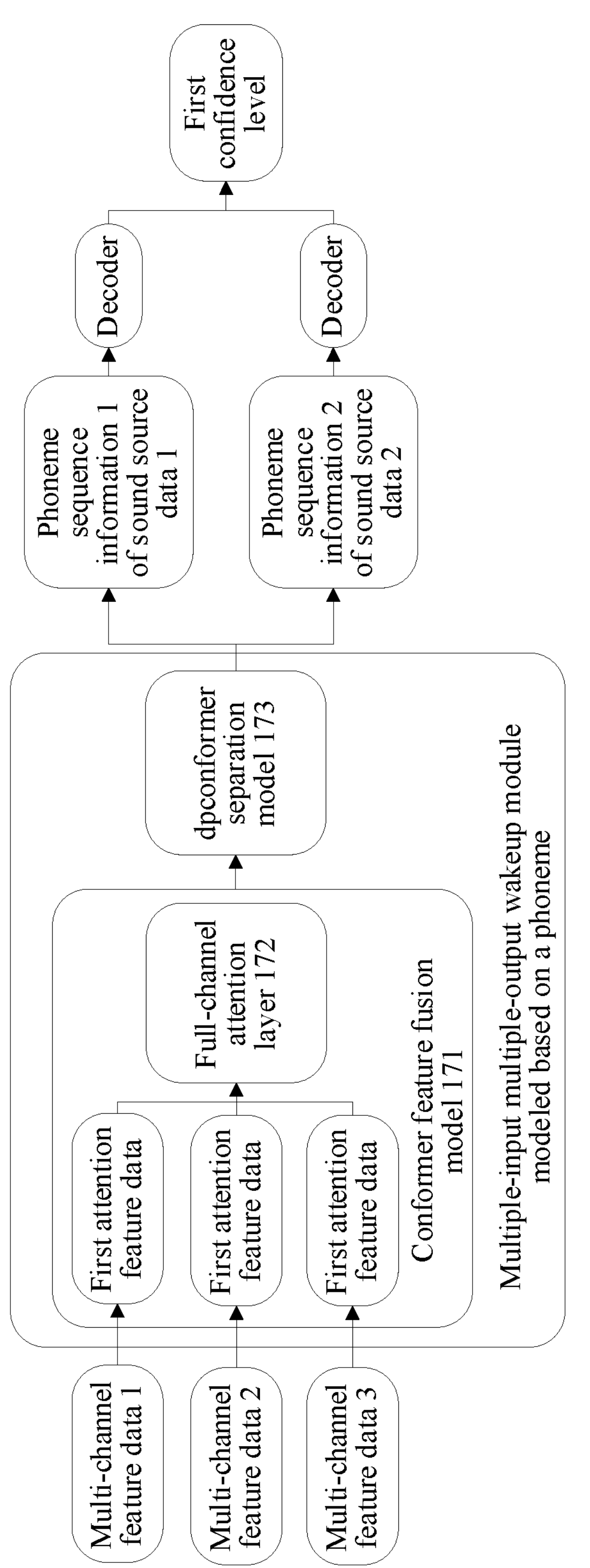

In another possible implementation, the wakeup solution provided in embodiments of this application includes a multiple-input multiple-output wakeup technology for phoneme modeling. A first-stage wakeup module is a multiple-input multiple-output wakeup module modeled based on a phoneme. As shown in FIG. 17, the wakeup solution includes but is not limited to the following several aspects.

(1) A feature input part includes multi-group multi-channel feature data. The multi-group multi-channel feature data includes multi-channel feature data obtained by preprocessing first microphone data and first separation data obtained by performing first-stage separation processing.

(2) A conformer feature fusion model 171 (including a full-channel attention layer 172) is configured to fuse the multi-group multi-channel feature data into single-channel feature data.

(3) dpconformer separation model 173: The single-channel feature data is input into the dpconformer separation model 173 to output a phoneme set, and the phoneme set includes phoneme sequence information respectively corresponding to a plurality of pieces of sound source data. Optionally, the phoneme sequence information is a posterior probability of a phoneme sequence. The posterior probability of the phoneme sequence is a product of posterior probability values of all phonemes corresponding to the sound source data. For example, an output parameter of the dpconformer separation model 173 includes phoneme sequence information 1 of sound source data 1 and phoneme sequence information 2 of sound source data 2.

(4) Design of a Cost Function

It should be noted that, for descriptions of the foregoing several aspects, refer to related descriptions in the first-stage separation solution. Details are not described herein again.

For the multiple-input multiple-output wakeup module modeled based on the phoneme, the output parameter of the dpconformer separation model 173 is the phoneme sequence information respectively corresponding to the plurality of pieces of sound source data. A plurality of pieces of phoneme sequence information are separately input into a decoder to finally output second confidence levels respectively corresponding to the plurality of pieces of phoneme sequence information.

The phoneme sequence information corresponding to the sound source data indicates probability distribution of a plurality of phonemes in the sound source data, in other words, the phoneme sequence information includes probability values respectively corresponding to the plurality of phonemes. For each piece of the plurality of pieces of phoneme sequence information, the decoder is invoked once to obtain a second confidence level corresponding to the phoneme sequence information. The second confidence level indicates an acoustic feature similarity between the sound source data and a preset wakeup keyword. The decoder cannot participate in model calculation. When a model cannot determine which separated sound source data is the preset wakeup keyword, the model needs to obtain, through calculation, the phoneme sequence information respectively corresponding to the plurality of pieces of sound source data.

In this embodiment, a modeling unit is a phoneme. The phoneme is a representation form of a basic voice unit. For example, for a wakeup keyword "Hey Celia", a corresponding phoneme sequence may be "x i ao y i x i ao y i", and each phoneme is represented by a space. In a multi-sound source interference scenario, a phoneme sequence 1 corresponding to sound source data 1 is "x i ao y i x i ao y i". However, voice content corresponding to sound source data 2 may be "What's the weather like", and a corresponding phoneme sequence 2 is "t i an q i z en m o y ang". The output parameter of the dpconformer separation model 173 includes two pieces of phoneme sequence information, namely, a probability value of the phoneme sequence 1 "x i ao y i x i ao y i" corresponding to the sound source data 1 and a probability value of the phoneme sequence 2 "t i an q i z en m o y ang" corresponding to the sound source data 2.

For the first-stage wakeup module, an example in which the output parameter includes two pieces of phoneme sequence information is used. One piece of phoneme sequence information may be probability distribution of each phoneme corresponding to the sound source data 1, and the other piece of phoneme sequence information may be probability distribution of each phoneme corresponding to the sound source data 2. For example, if a size of the phoneme set is 100, the two pieces of phoneme sequence information each are a 100-dimensional vector, a value of the vector is greater than or equal to 0 and less than or equal to 1, and a sum of all values of 100 dimensions is 1. For example, the two pieces of phoneme sequence information each are a 100-dimensional vector, a probability value corresponding to an "x" location in the first piece of phoneme sequence information is the highest, and a probability value corresponding to a "t" location in the second piece of phoneme sequence information is the highest.

After the two pieces of phoneme sequence information are determined, output probabilities of the phoneme sequence "x i ao y i x i ao y i" of the preset wakeup keyword in the phoneme sequence are separately calculated, and geometric averaging is performed, to obtain second confidence levels respectively corresponding to the two pieces of phoneme sequence information. When any second confidence level is greater than a first threshold, it is determined that pre-wakeup succeeds.

Figure 18:
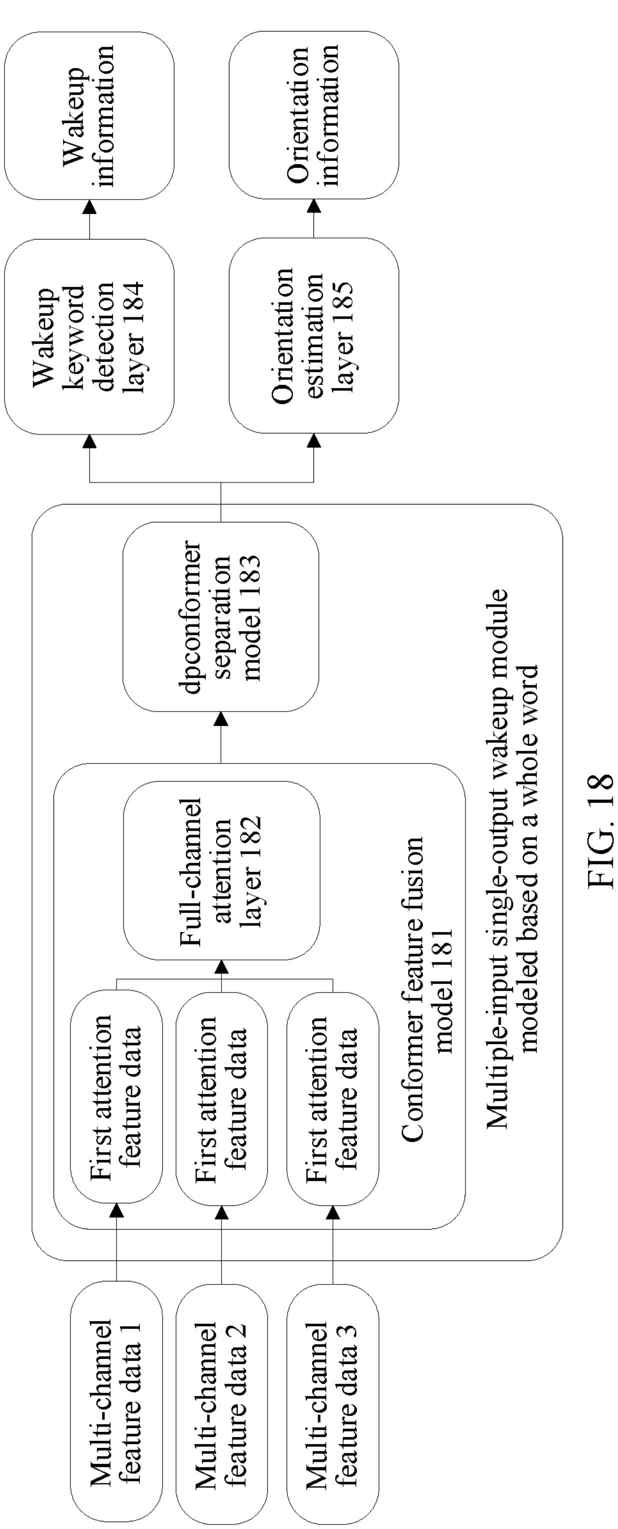

In another possible implementation, the wakeup solution provided in embodiments of this application includes a multiple-input single-output technology for performing multi-task design on wakeup for whole-word modeling and direction estimation. A first-stage wakeup module is a multiple-input single-output wakeup module modeled based on a whole word. As shown in FIG. 18, the wakeup solution includes but is not limited to the following several aspects.

(1) A feature input part includes multi-group multi-channel feature data. The multi-group multi-channel feature data includes multi-channel feature data obtained by preprocessing first microphone data and first separation data obtained by performing first-stage separation processing.

(2) A conformer feature fusion model 181 (including a full-channel attention layer 182) is configured to fuse the multi-group multi-channel feature data into single-channel feature data.

(3) dpconformer separation model 183, wakeup keyword detection layer 184, and orientation estimation layer 185: The single-channel feature data is input into the dpconformer separation model 183 to output an intermediate parameter, the intermediate parameter is input into the wakeup keyword detection layer 184 to output wakeup information, the intermediate parameter is input into the orientation estimation layer 185 to output orientation information of a wakeup event, and the wakeup information includes first confidence levels respectively corresponding to a plurality of pieces of separated sound source data. For example, the orientation information is in a form of a one-hot vector.

For a wakeup task, a model is used to calculate a probability of each wakeup event and a probability of each garbage word. However, a direction estimation task outputs only the orientation information corresponding to the wakeup event. Therefore, the orientation information is an output parameter of the direction estimation task corresponding to a wakeup success.

The wakeup keyword detection layer 184 and the orientation estimation layer 185 may be additional network modules, are disposed at an output end of the dpconformer separation model 183, for example, one layer of a DNN or an LSTM, and then correspond a linear layer and a Softmax layer of a dimension. For a wakeup task, an output parameter (namely, wakeup information) of the wakeup keyword detection layer 184 is a detection probability of a wakeup keyword. For an orientation estimation task, an output parameter (namely, orientation information) of the orientation estimation layer 185 is probability distribution of an orientation estimation vector.

(4) Design of a Cost Function

It should be noted that, for descriptions of the foregoing several aspects, refer to related descriptions in the first-stage separation solution. Details are not described herein again.

Figure 19:
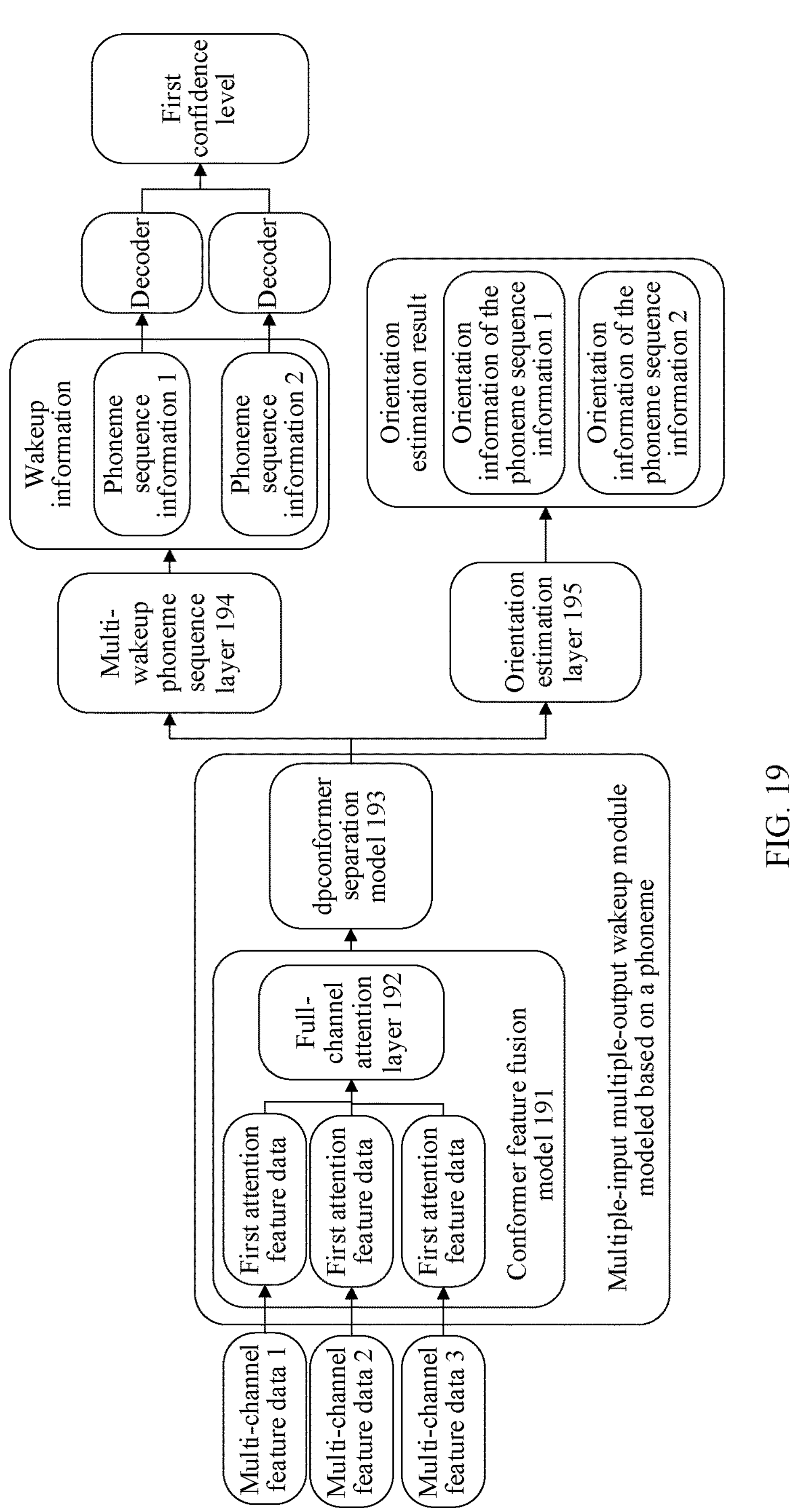

In another possible implementation, the wakeup solution provided in embodiments of this application includes a multiple-input multiple-output technology for performing multi-task design on wakeup for phoneme modeling and direction estimation. A first-stage wakeup module is a multiple-input multiple-output wakeup module modeled based on a phoneme. As shown in FIG. 19, the wakeup solution includes but is not limited to the following several aspects.

(1) A feature input part includes multi-group multi-channel feature data. The multi-group multi-channel feature data includes multi-channel feature data obtained by preprocessing first microphone data and first separation data obtained by performing first-stage separation processing.

(2) A conformer feature fusion model 191 (including a full-channel attention layer 192) is configured to fuse the multi-group multi-channel feature data into single-channel feature data.

(3) dpconformer separation model 193, multi-wakeup phoneme sequence layer 194, and orientation estimation layer 195: The single-channel feature data is input into the dpconformer separation model 193 to output an intermediate parameter, the intermediate parameter is input into the multi-wakeup phoneme sequence layer 194 to output wakeup information, the intermediate parameter is input into the orientation estimation layer 195 to output an orientation estimation result, the wakeup information includes phoneme sequence information respectively corresponding to a plurality of pieces of sound source data, and the orientation estimation result includes orientation information respectively corresponding to a plurality of pieces of phoneme sequence information. Optionally, the phoneme sequence information is a posterior probability of a phoneme sequence. The posterior probability of the phoneme sequence is a product of posterior probability values of all phonemes corresponding to the sound source data. For example, an output parameter includes phoneme sequence information 1 of sound source data 1, phoneme sequence information 2 of sound source data 2, orientation information of the phoneme sequence information 1, and orientation information of the phoneme sequence information 2.

The multi-wakeup phoneme sequence layer 194 and the orientation estimation layer 195 may be additional network modules, and are disposed at an output end of the dpconformer separation model 193.

(4) Design of a Cost Function

It should be noted that, for descriptions of the foregoing several aspects, refer to related descriptions in the first-stage separation solution. Details are not described herein again.

A wakeup task and a direction estimation task share the feature input part, the conformer feature fusion model 191, and the dpconformer separation model 193. An output parameter of the wakeup task includes the phoneme sequence information respectively corresponding to the plurality of pieces of sound source data. An output parameter of the orientation estimation task includes the orientation information respectively corresponding to the plurality of pieces of phoneme sequence information. Finally, each piece of phoneme sequence information obtains a wakeup result, namely, a first confidence level, by using a decoder.

It should be noted that the several possible implementations of the foregoing first-stage wakeup solution may be implemented in combination with pairs, or any three of the possible implementations may be implemented in combination, or all of the possible implementations may be implemented in combination. This is not limited in embodiments of this application.

The following describes the voice wakeup method provided in embodiments of this application by using several examples.

In an example, an electronic device is a single-microphone device, and the voice wakeup method is a single-channel two-stage separation and two-stage wakeup method. The method may be used in a near-field wakeup scenario of the electronic device. When a user uses a wakeup function of the electronic device in a noisy environment, a false wakeup rate is reduced while a high wakeup rate of the wakeup function is ensured.

Figure 20:
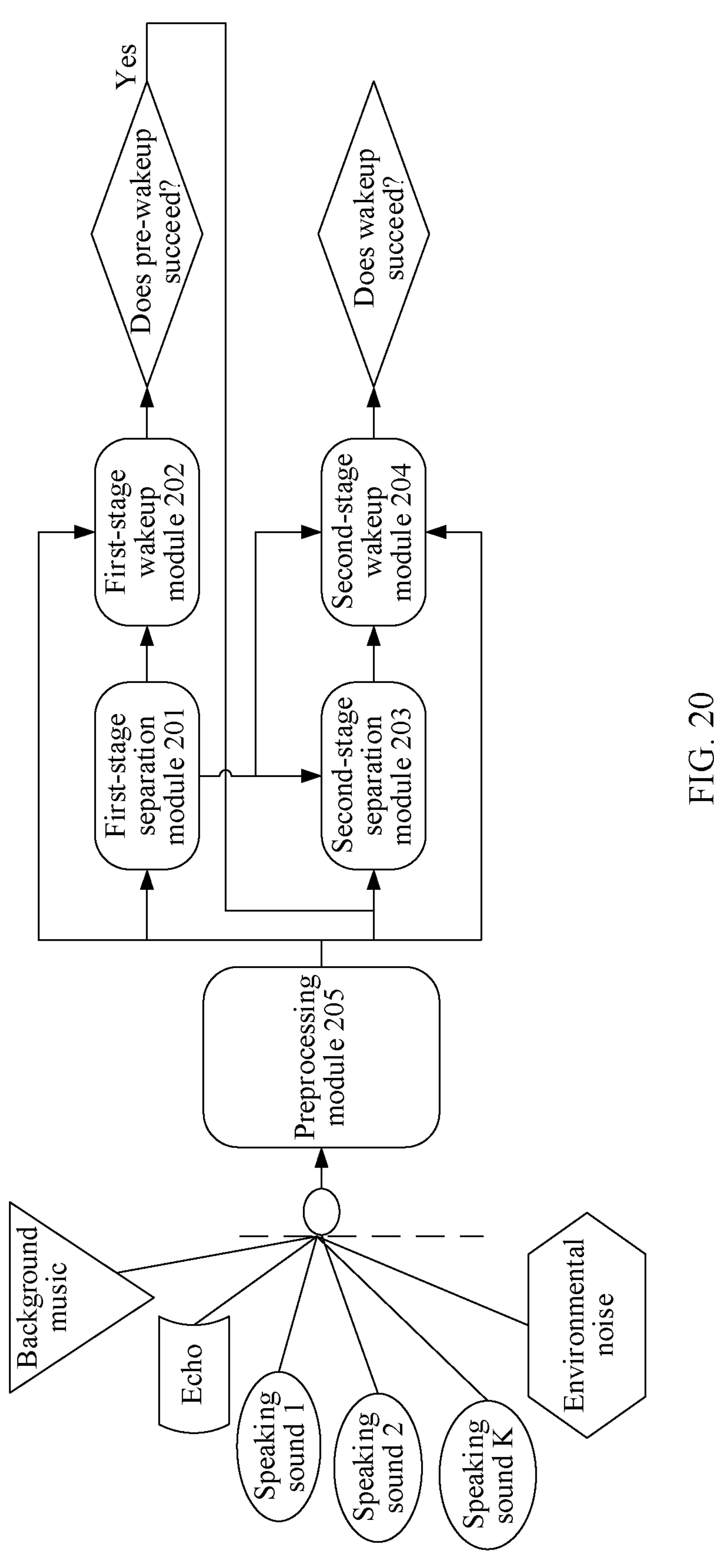
FIG. 20 to FIG. 23 each are a schematic diagram of a principle of a voice wakeup method in a single-microphone scenario according to an example embodiment of this application.

As shown in FIG. 20, the electronic device includes a first-stage separation module 201, a first-stage wakeup module 202, a second-stage separation module 203, and a second-stage wakeup module 204. The electronic device collects original first microphone data (for example, background music, an echo, a speaking sound 1, a speaking sound 2, a speaking sound K, and an environmental noise) by using a single microphone; inputs the first microphone data into a preprocessing module 205 for preprocessing, to obtain multi-channel feature data; inputs the multi-channel feature data into the first-stage separation module 201 for first-stage separation processing to obtain first separation data; and inputs the multi-channel feature data and the first separation data into the first-stage wakeup module 202 for first-stage wakeup processing to obtain first wakeup data. The electronic device determines, based on the first wakeup data, whether pre-wakeup succeeds. If it is determined that pre-wakeup succeeds, the multi-channel feature data and the first separation data are input into the second-stage separation module 203 for second-stage separation processing to obtain second separation data, and the multi-channel feature data, the first separation data, and the second separation data are input into the second-stage wakeup module 204 for second-stage wakeup processing to obtain second wakeup data. The electronic device determines, based on the second wakeup data, whether wakeup succeeds.

Based on the voice wakeup method provided in FIG. 20, some steps may be alternatively replaced and implemented as the following possible implementations.

Optionally, the preprocessing module includes an acoustic echo cancellation module. An output parameter of the acoustic echo cancellation module is used as the multi-channel feature data, and input into a subsequent separation module and wakeup module.

Optionally, the preprocessing module includes an acoustic echo cancellation module and a de-reverberation module. An output parameter of the acoustic echo cancellation module is input into the de-reverberation module. An output parameter of the de-reverberation module is used as the multi-channel feature data, and input into a subsequent separation module and wakeup module.

Optionally, the first-stage wakeup module and the second-stage wakeup module each are the foregoing multiple-input single-output wakeup module modeled based on a whole word. Optionally, the first-stage wakeup module and the second-stage wakeup module each are the foregoing multiple-input multiple-output wakeup module modeled based on a phoneme.

Figure 21:
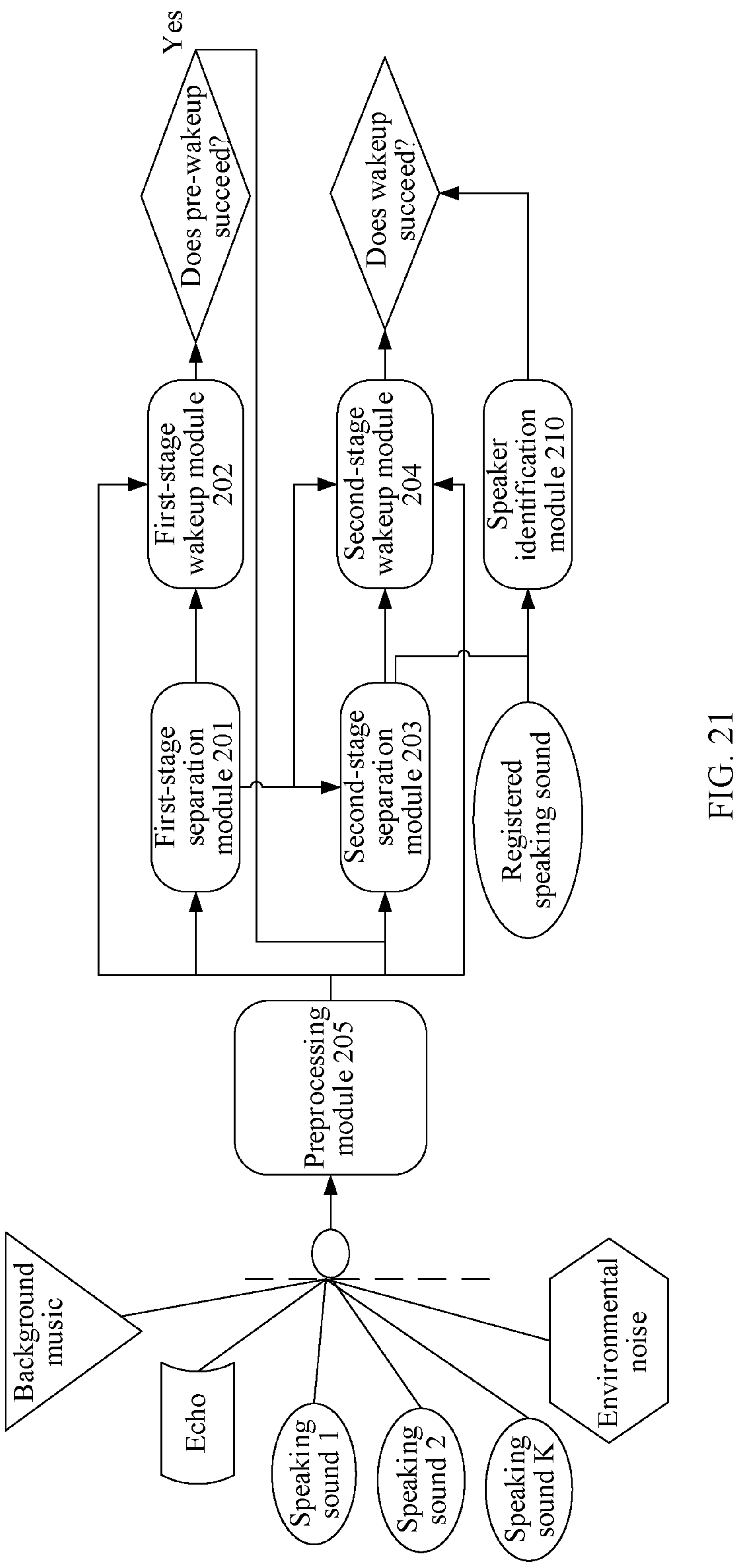

Optionally, when the scenario needs to support a wakeup requirement of a specific person, the two stage wakeup modules need to support a specific person determining function. In a possible implementation, based on the example provided in FIG. 20, as shown in FIG. 21, a plurality of pieces of sound source data and registered voice data (namely, a registered speaking sound) of a target object that are output by the second-stage separation module 203 are input into a speaker identification module (SID) 210, configured to determine whether the plurality of pieces of separated sound source data include the registered voice data. The speaker identification module 210 is used as an independent network module, and is different from the second-stage wakeup module 204. If the second wakeup data output by the second-stage wakeup module 204 indicates that wakeup succeeds, and the speaker identification module 210 determines that the plurality of pieces of separated sound source data include the registered voice data, it is determined that wakeup succeeds; otherwise, wakeup fails.

Figure 22:
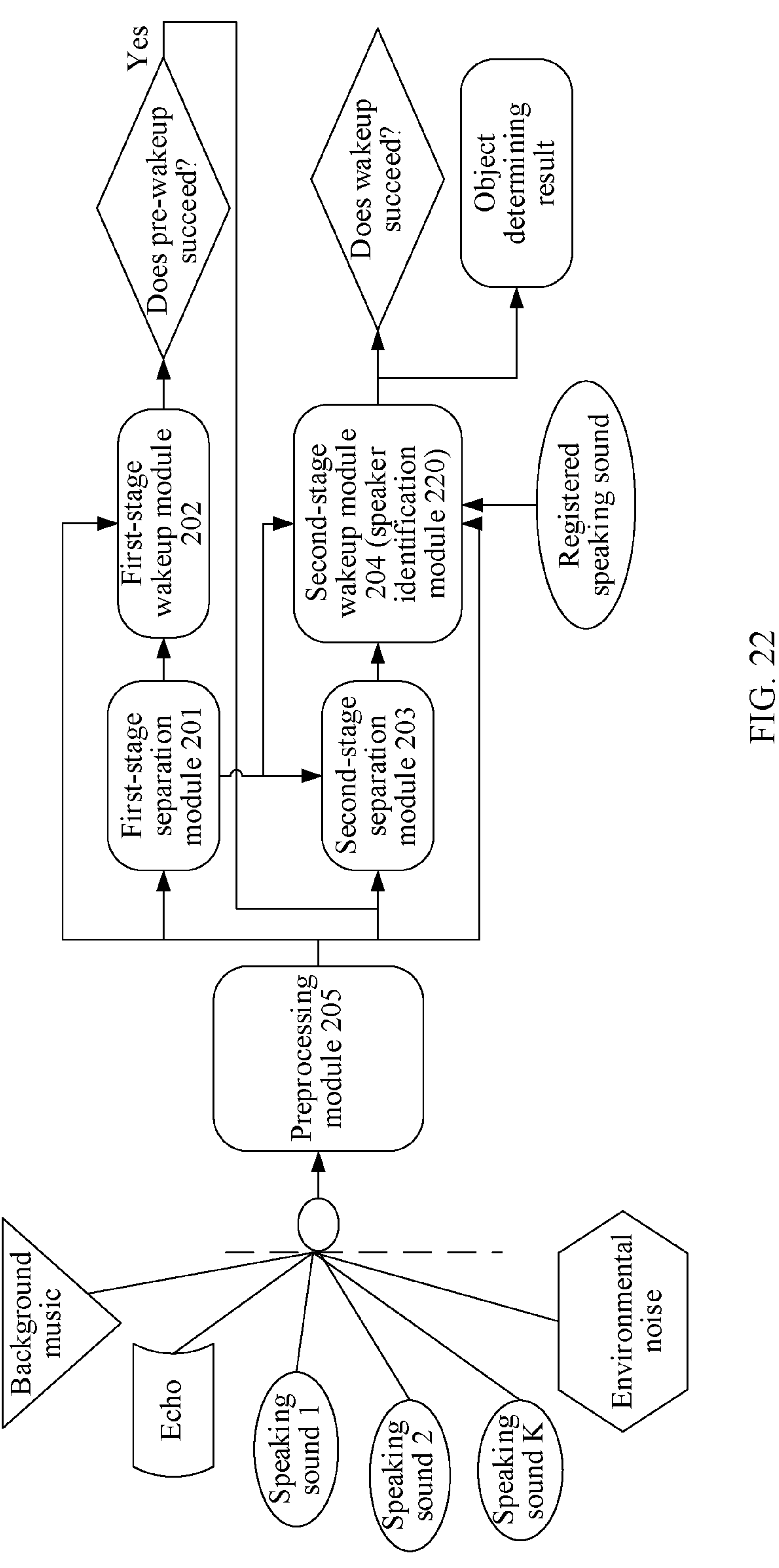

In another possible implementation, based on the example provided in FIG. 20, as shown in FIG. 22, a speaker identification module 210 is integrated into the second-stage wakeup module 204. A plurality of pieces of sound source data output by the first-stage separation module 201 and a plurality of pieces of sound source data and registered voice data (namely, a registered speaking sound) of a target object that are output by the second-stage separation module 203 are input into the second-stage wakeup module 204 (including the speaker identification module 210) to output the second wakeup data and an object determining result. When the second wakeup data indicates that wakeup succeeds and the object determining result indicates that the output sound source data includes sound source data of the target object, it is determined that wakeup succeeds; otherwise, wakeup fails.

Optionally, the object determining result indicates whether the output sound source data includes the sound source data of the target object. That is, the object determining result indicates whether a current wakeup event is caused by the target object. For example, the object determining result includes one of a first identifier and a second identifier. The first identifier indicates that the output sound source data includes the sound source data of the target object. The second identifier indicates that the output sound source data does not include the sound source data of the target object. When the second wakeup data indicates that wakeup succeeds and the object determining result is the first identifier, it is determined that wakeup succeeds; otherwise, wakeup fails.

Figure 23:
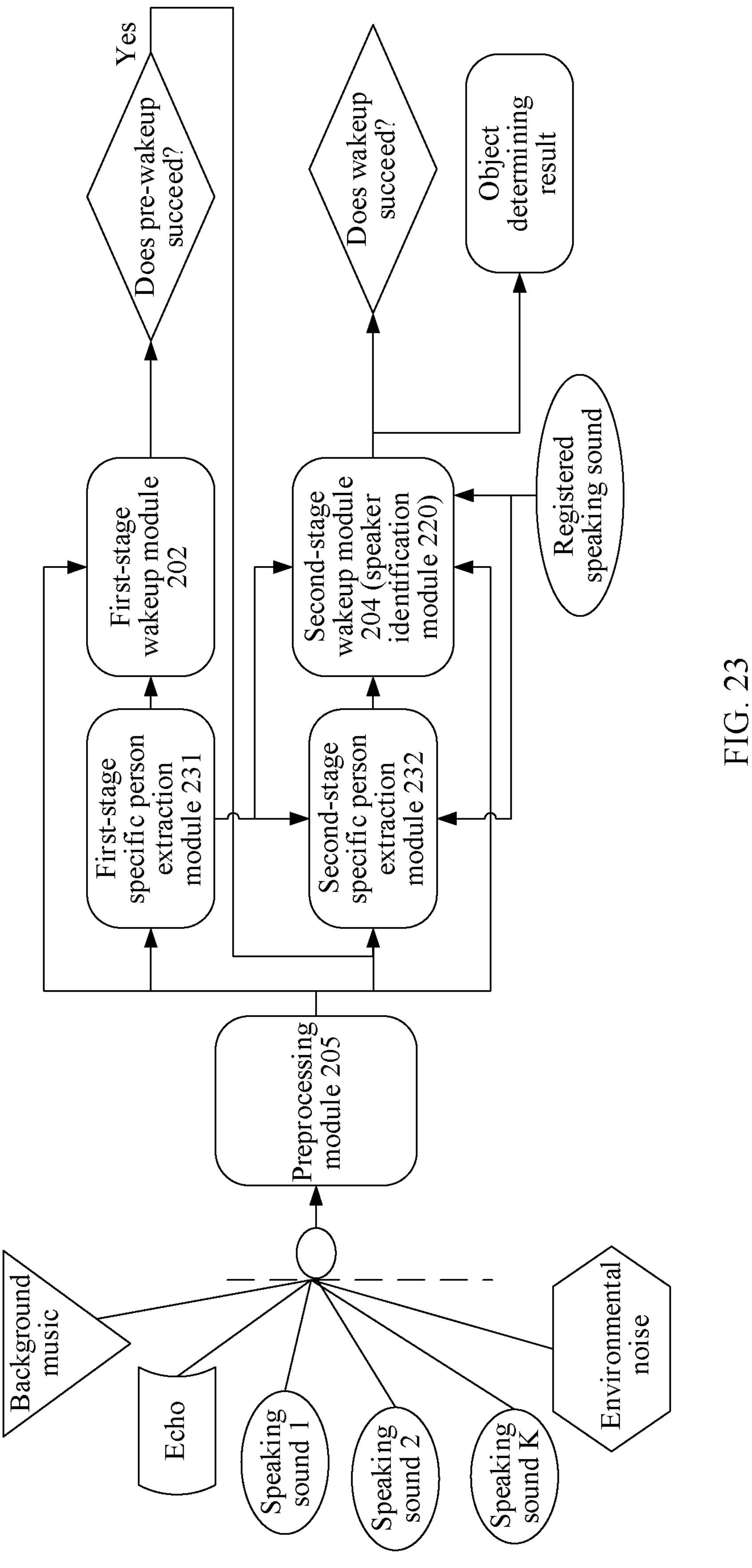

In another possible implementation, based on the example provided in FIG. 22, as shown in FIG. 23, the first-stage separation module 201 is replaced and implemented as a first-stage specific person extraction module 231, and the second-stage separation module 203 is replaced and implemented as a second-stage specific person extraction module 232. The multi-channel feature data and registered voice data are input into the first-stage specific person extraction module 231 to output first sound source data of a target object. The multi-channel feature data and the first sound source data of the target object are input into the first-stage wakeup module 202 to output the first wakeup data. When the first wakeup data indicates that pre-wakeup succeeds, the multi-channel feature data, the first sound source data of the target object, and the registered voice data (namely, a registered speaking sound) of the target object are input into the second-stage specific person extraction module 232 to output second sound source data of the target object. The multi-channel feature data, the first sound source data and the second sound source data of the target object, and the registered voice data of the target object are input into the second-stage wakeup module 204 (including a speaker identification module 210) to output the second wakeup data and an object determining result. When the second wakeup data indicates that wakeup succeeds and the object determining result indicates that the output sound source data includes sound source data of the target object, it is determined that wakeup succeeds; otherwise, wakeup fails.

It should be noted that, in the scenario, a specific person extraction technology, a specific person extraction technology assisted by visual data, a specific direction extraction technology, a technology for performing multi-task design on blind separation and multi-sound source positioning, a technology for performing multi-task design on specific person extraction and specific person orientation estimation, a technology for performing multi-task design on blind separation and multi-speaker recognition, a technology for performing multi-task design on wakeup and direction estimation, and the like may be further supported. For implementation details of each step, refer to related descriptions in the foregoing embodiment. Details are not described herein again.

In another example, an electronic device is a multi-microphone device, and the voice wakeup method is a multi-channel two-stage separation and two-stage wakeup method. The method may be used in the multi-microphone electronic device. The electronic device is configured to respond to a preset wakeup keyword.

Figure 24:
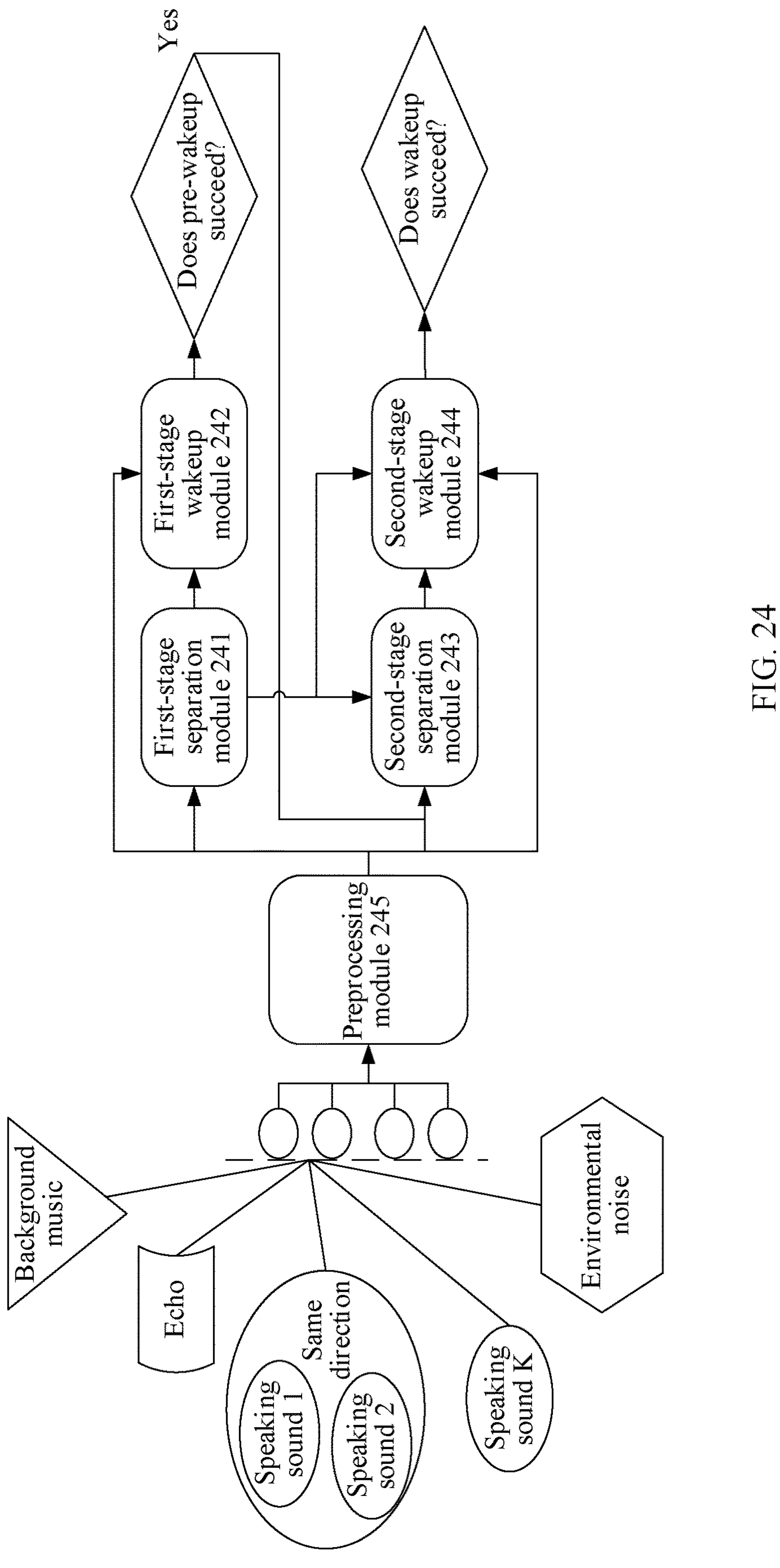
FIG. 24 to FIG. 28 each are a schematic diagram of a principle of a voice wakeup method in a multi-microphone scenario according to an example embodiment of this application.

As shown in FIG. 24, the electronic device includes a first-stage separation module 241, a first-stage wakeup module 242, a second-stage separation module 243, and a second-stage wakeup module 244. The electronic device collects original first microphone data (for example, background music, an echo, a speaking sound 1 and a speaking sound 2 that are in a same direction, a speaking sound K, and an environmental noise) by using a plurality of microphones; inputs the first microphone data into a preprocessing module 245 for preprocessing to obtain multi-channel feature data; inputs the multi-channel feature data into the first-stage separation module 241 for first-stage separation processing to obtain first separation data; and inputs the multi-channel feature data and the first separation data into the first-stage wakeup module 242 for first-stage wakeup processing to obtain first wakeup data. The electronic device determines, based on the first wakeup data, whether pre-wakeup succeeds. If it is determined that pre-wakeup succeeds, the multi-channel feature data and the first separation data are input into the second-stage separation module 243 for second-stage separation processing to obtain second separation data, and the multi-channel feature data, the first separation data, and the second separation data are input into the second-stage wakeup module 244 for second-stage wakeup processing to obtain second wakeup data. The electronic device determines, based on the second wakeup data, whether wakeup succeeds.

Based on the voice wakeup method provided in FIG. 24, some steps may be alternatively replaced and implemented as the following possible implementations.

Optionally, the preprocessing module includes an acoustic echo cancellation module. Optionally, the preprocessing module includes an acoustic echo cancellation module and a de-reverberation module.

Optionally, the preprocessing module includes an acoustic echo cancellation module, a de-reverberation module, and a beam filtering module. After echo cancellation and de-reverberation processing are performed on the original first microphone data, beam filtering is performed in a plurality of directions to obtain multi-group multi-channel feature data such as output parameters of the beam filtering in a plurality of channels, multi-microphone data obtained after de-reverberation, and an IPD of a scenario, and the multi-group multi-channel feature data are input into a subsequent separation module and wakeup module.

Optionally, the first-stage wakeup module and the second-stage wakeup module each are the foregoing multiple-input single-output wakeup module modeled based on a whole word. Optionally, the first-stage wakeup module and the second-stage wakeup module each are the foregoing multiple-input multiple-output wakeup module modeled based on a phoneme.

Optionally, in a multi-task scenario of separation, wakeup, and positioning, a multi-task design may be performed on a separation task and a positioning task, and a multi-task design may also be performed on a wakeup task and the positioning task. Optionally, the separation task is performed by a direction feature extractor. The direction feature extractor may be integrated into the separation module or the wakeup module, to finally output a plurality of pieces of separated sound source data and orientation information respectively corresponding to the plurality of pieces of sound source data. For related descriptions, refer to related descriptions of the multi-task design including the positioning task in the foregoing embodiment. Details are not described herein again.

In a requirement scenario of the multi-task design, the following several possible multi-task design manners are included but not limited to.

1. Multi-Task Design of First-Stage Streaming Separation and Orientation Estimation An output parameter of a first-stage separation module includes a plurality of pieces of sound source data obtained through streaming separation and orientation information respectively corresponding to the plurality of pieces of sound source data. The output parameter of the first-stage separation module may be provided to a first-stage wakeup module, a second-stage separation module, and a second-stage wakeup module. The plurality of pieces of sound source data output by the first-stage separation module may be further provided to an acoustic event detection module, to determine whether each piece of current sound source data includes a specific acoustic event; or provided to a speaker identification module simultaneously, to determine identity information corresponding to each piece of current sound source data. A plurality of pieces of orientation information output by the first-stage separation module may be provided to a system interaction control module, to display, in real time, orientations respectively corresponding to the plurality of pieces of sound source data.

2. Multi-task design of first-stage streaming wakeup, speaker recognition, and orientation estimation An output parameter of a first-stage wakeup module includes a plurality of pieces of sound source data obtained through streaming separation, orientation information respectively corresponding to the plurality of pieces of sound source data, an object determining result, which may be used to determine whether a current wakeup event is caused by a target object, and orientation information corresponding to a wakeup moment. A plurality of pieces of orientation information output by the first-stage wakeup module may be provided to a back-end system, to determine a main orientation of the target object, for example, provided to a beamforming module, to enhance sound source data in the orientation in real time and perform voice recognition on the enhanced sound source data.

3. Multi-task design of second-stage offline separation, speaker recognition, and orientation estimation. In an offline scenario, results of speaker recognition and orientation estimation are more accurate. An output parameter of a second-stage separation module includes a plurality of pieces of sound source data obtained through offline separation, orientation information respectively corresponding to the plurality of pieces of sound source data, and an object determining result. The output parameter of the second-stage separation module may be used for system debugging to determine quality of a separation result.

4. Multi-task design of second-stage offline wakeup, speaker recognition, and orientation estimation: An effect of offline wakeup is better than that of real-time streaming wakeup. An output parameter of a second-stage wakeup module includes a plurality of pieces of sound source data obtained through offline separation, orientation information respectively corresponding to the plurality of pieces of sound source data, and an object determining result. The orientation information may be used as supplementary information of a wakeup event, to perform a subsequent wakeup direction enhancement task and perform voice recognition.

Figure 25:
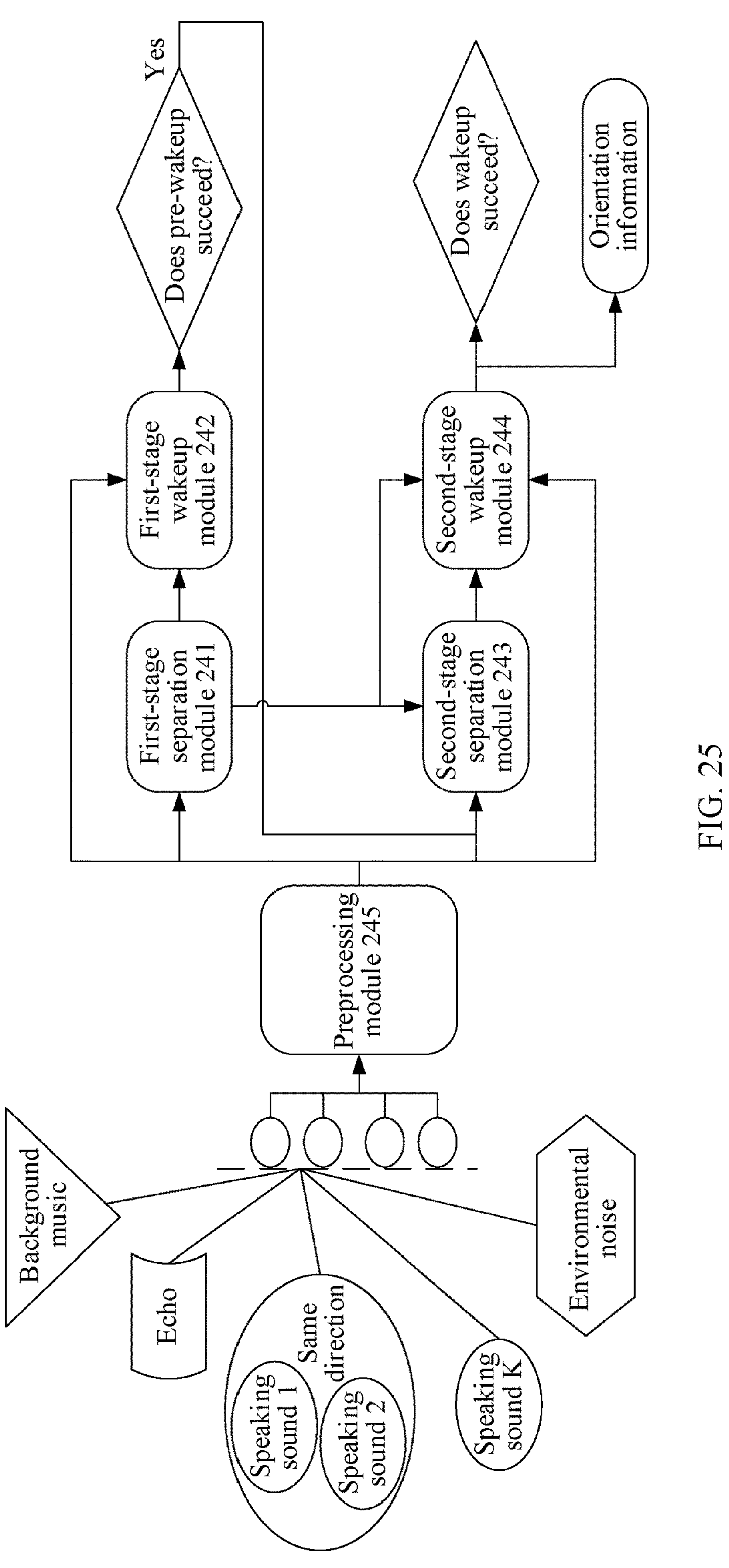

In a possible implementation, based on the example provided in FIG. 24, a schematic diagram of a multi-task design of second-stage offline wakeup and wakeup orientation estimation is shown in FIG. 25. The second-stage wakeup module 244 may use a wakeup model in a multiple-input multiple-output form or a multiple-input single-output form to finally output a plurality of pieces of separated sound source data and orientation information respectively corresponding to the plurality of pieces of sound source data.

Figure 26:
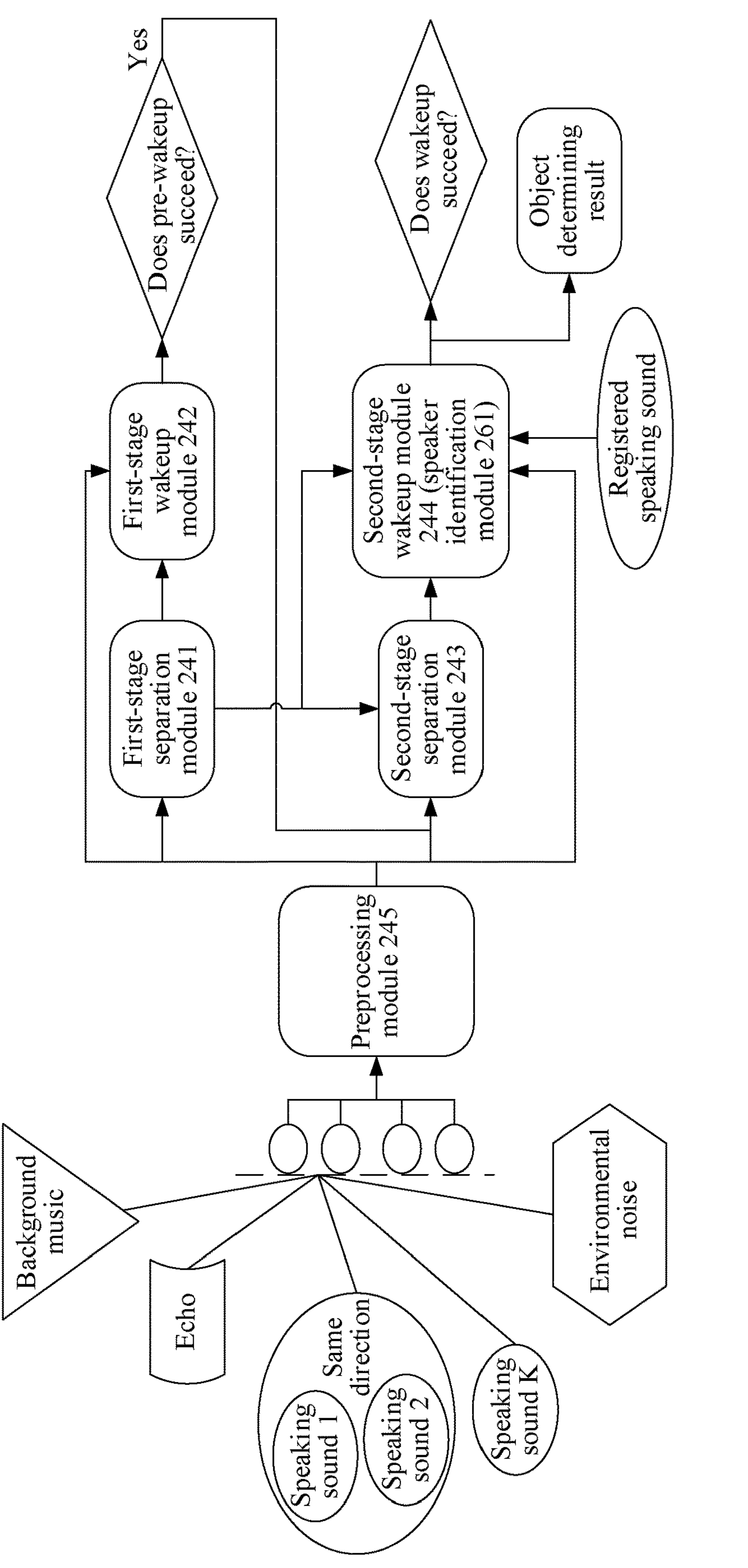

In another possible implementation, based on the example provided in FIG. 24, a schematic diagram of a multi-task design of second-stage offline wakeup and speaker determining is shown in FIG. 26. A speaker identification module 261 is integrated into the second-stage wakeup module 244. A plurality of pieces of sound source data output by the first-stage separation module 241 and a plurality of pieces of sound source data and registered voice data (namely, a registered speaking sound) of a target object that are output by the second-stage separation module 243 are input into the second-stage wakeup module 244 (including the speaker identification module 261) to output second wakeup data and an object determining result. When the second wakeup data indicates that wakeup succeeds and the object determining result indicates that the output sound source data includes sound source data of the target object, it is determined that wakeup succeeds; otherwise, wakeup fails.

Optionally, the scenario further supports combination of neural network-based separation and a conventional beam technology. In addition to inputting the first separation data into the first-stage wakeup module and inputting the first separation data and the second separation data into the second-stage wakeup module for use, the first separation data and the second separation data may also be input into an adaptive beamforming module, for example, a minimum variance distortionless response (MVDR) beam filter, to calculate a noise interference covariance matrix, to obtain a better spatial interference suppression effect. An output parameter obtained after beam filtering is performed on the plurality of pieces of sound source data may be used as new sound source data, and is input, as additional feature data, into the first-stage wakeup module and/or the second-stage wakeup module, to enhance a wakeup effect.

Figure 27:
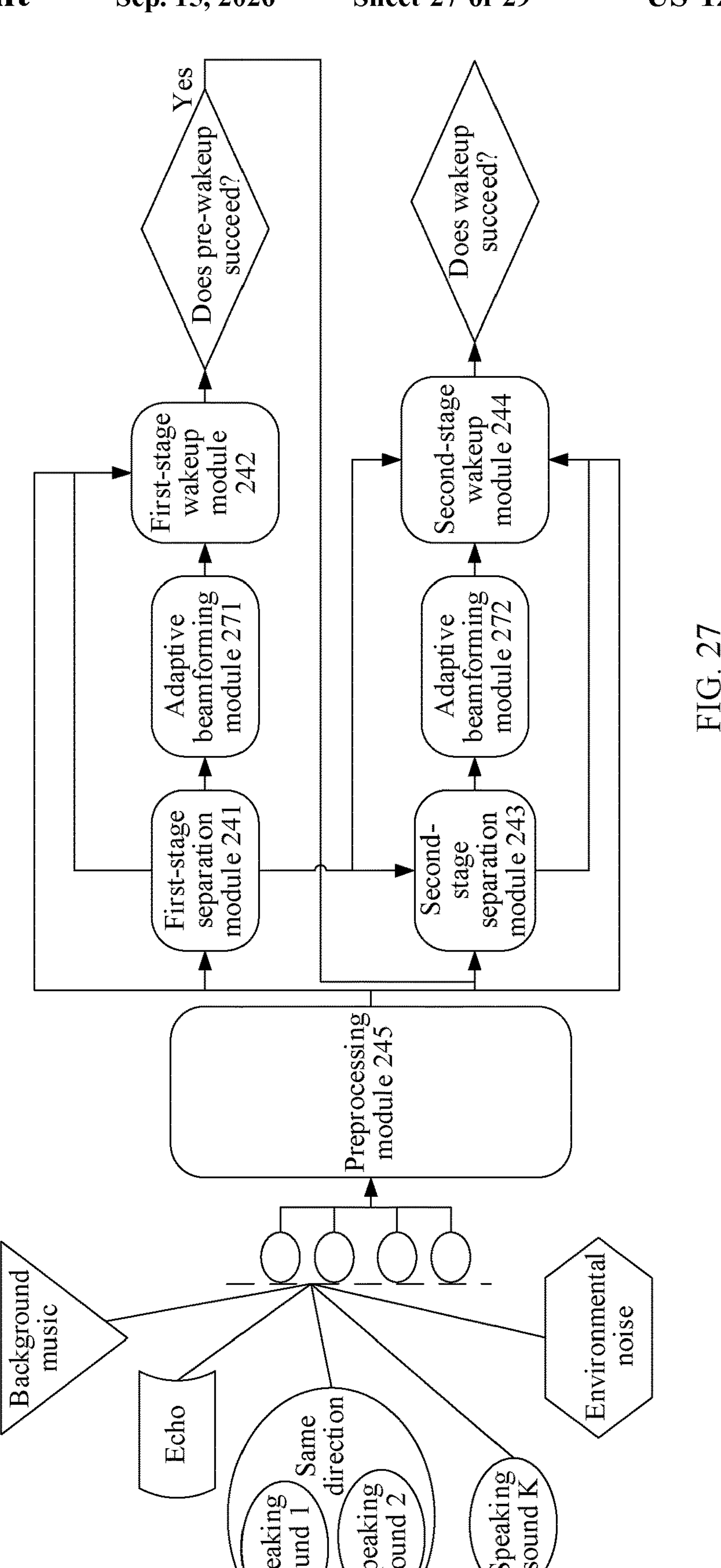

In a possible implementation, based on the example provided in FIG. 24, as shown in FIG. 27, the first separation data is input into an adaptive beamforming module 271 to output first filtering data. The multi-channel feature data, the first separation data, and the first filtering data are input into the first-stage wakeup module 242 to output the first wakeup data. When the first wakeup data indicates that pre-wakeup succeeds, the multi-channel feature data and the first separation data are input into the second-stage separation module 243 to output the second separation data. The second separation data is input into an adaptive beamforming module 272 to output second filtering data. The multi-channel feature data, the first separation data, the second separation data, and the second filtering data are input into the second-stage wakeup module 244 to output the second wakeup data. Whether wakeup succeeds is determined based on the second wakeup data.

Optionally, the scenario further supports a multi-sound-source wakeup solution of a full neural network. The preprocessing module is not used. The original first microphone data and the multi-channel feature data obtained through calculation are input into a subsequent separation module and wakeup module. Optionally, because the first-stage separation module and the second-stage separation module need to be considered in an echo scenario, a reference signal of an echo needs to be received, to process an echo problem. In this implementation, the voice wakeup method may run in a chip disposed with dedicated neural network acceleration such as a GPU or a tensor processing unit (TPU), to obtain a better algorithm acceleration effect.

Figure 28:
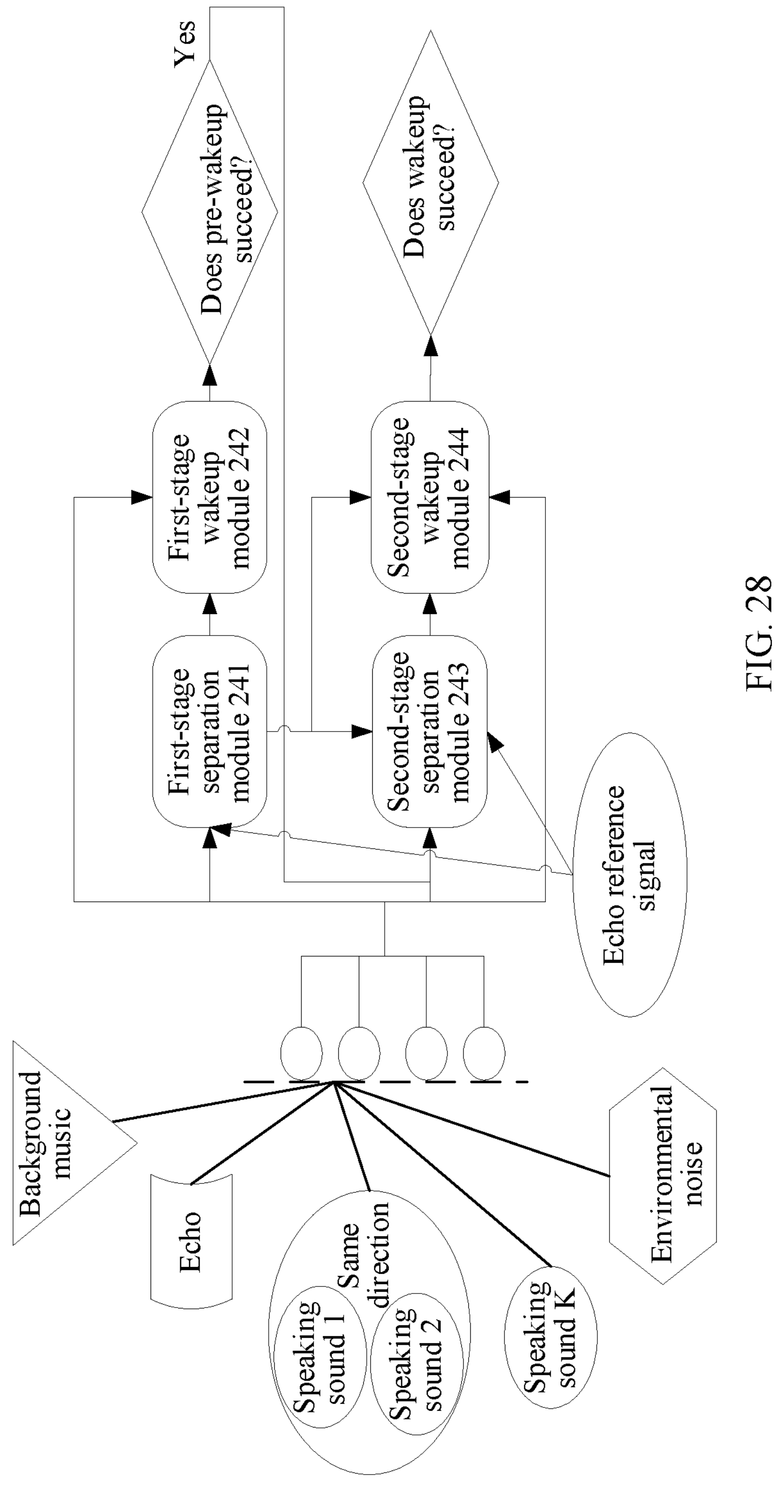

In a possible implementation, based on the example provided in FIG. 24, as shown in FIG. 28, the preprocessing module 245 is not used, the original first microphone data, the calculated multi-channel feature data, and echo reference data are input into the first-stage separation module 241 to output the first separation data. The first microphone data, the multi-channel feature data, and the first separation data are input into the first-stage wakeup module 242 to output the first wakeup data. When the first wakeup data indicates that pre-wakeup succeeds, the first microphone data, the multi-channel feature data, the first separation data, and an echo reference signal are input into the second-stage separation module 242 to output the second separation data. The first microphone data, the multi-channel feature data, the first separation data, and the second separation data are input into the second-stage wakeup module 244 to output the second wakeup data. Whether wakeup succeeds is determined based on the second wakeup data.

It should be noted that, in the scenario, a specific person extraction technology, a specific person extraction technology assisted by visual data, a specific direction extraction technology, a technology for performing multi-task design on blind separation and multi-sound source positioning, a technology for performing multi-task design on specific person extraction and specific person orientation estimation, a technology for performing multi-task design on blind separation and multi-speaker recognition, a technology for performing multi-task design on wakeup and direction estimation, and the like may be further supported. For implementation details of each step, refer to related descriptions in the foregoing embodiment. Details are not described herein again.

In conclusion, according to the voice wakeup method provided in embodiments of this application, in one aspect, a conformer-based self-attention network layer modeling technology provides a dual-path conformer network structure. By designing intra-block and inter-block alternate calculation of a conformer layer, modeling can be performed on a long sequence, and a problem, of an increase in a calculation amount, caused by direct use of a conformer can be avoided. In addition, because of a strong modeling capability of a conformer network, a separation effect can be significantly improved.

In another aspect, a mechanism of fusing multi-group multi-channel feature data of the conformer is provided. For multi-group multi-channel features, intra-group first attention feature data is first calculated, and then inter-group second attention feature data is calculated, so that a model can better learn a contribution of each feature to a final separation effect, thereby further ensuring a subsequent separation effect.

In another aspect, a two-stage separation solution, namely, a solution including a streaming separation process for first-stage wakeup and an offline separation process for second-stage wakeup is provided. Because a second-stage separation module may additionally use first separation data output by a first-stage separation module as an input parameter, a separation effect is further enhanced.

In another aspect, a wakeup module in a multiple-input form is provided. Compared with a single-input wakeup module in a related technology, this solution can not only reduce a calculation amount, to avoid a problem of a significant increase in a calculation amount and a waste problem that are caused by repeatedly invoking a wakeup model for a plurality of times, but also greatly improve wakeup performance because a correlation between input parameters is better used.

In another aspect, a multi-task design solution of a sound source wakeup task and another task is provided. For example, the another task includes at least one of a sound source positioning task, a specific person extraction task, a specific direction extraction task, and a specific person determining task. A sound source wakeup result may be associated with other information, and provided to a downstream task, to improve an output effect of a wakeup module (namely, a first-stage wakeup module and/or a second-stage wakeup module). For example, the another task is the sound source positioning task, and output wakeup data includes a plurality of pieces of sound source data and orientation information respectively corresponding to the plurality of pieces of sound source data. In this way, the wakeup module can provide more accurate orientation information while providing a sound source wakeup result. Compared with a solution, in a related technology, in which fixed beamforming is directly performed in a plurality of space directions, this solution ensures a more accurate orientation estimation effect. For another example, the another task is the specific person extraction task, and output wakeup data includes sound source data of a target object, so that the electronic device responds to wakeup of only a specific person (namely, the target object), to further reduce a false wakeup rate. For another example, the another task is the specific direction extraction task, and output wakeup data includes at least one piece of sound source data in a target direction, so that the electronic device responds to wakeup only in a specific direction (namely, the target direction), to further reduce a false wakeup rate. For another example, an example in which the voice wakeup method provided in embodiments of this application is performed by a robot is used. The another task is the specific person extraction task and the sound source positioning task. Output wakeup data includes sound source data of a target object and orientation information of the sound source data of the target object, so that the robot responds to wakeup of only a specific person (namely, the target object), and determines an orientation of the specific person when being woken up. In this way, the robot can adjust the orientation of the robot to face the specific person, to ensure that instructions sent by the specific person are better received subsequently.

Figure 29:
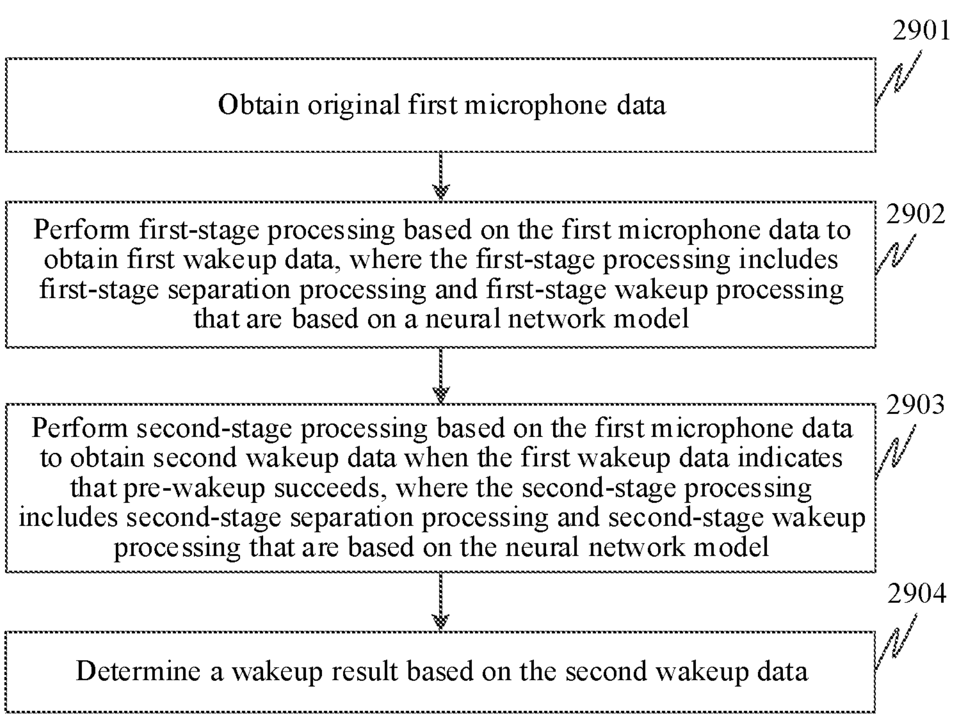
FIG. 29 is a flowchart of a voice wakeup method according to another example embodiment of this application.

FIG. 29 is a flowchart of a voice wakeup method according to another example embodiment of this application. In this embodiment, an example in which the method is applied to the electronic device shown in FIG. 2 is used for description. The method includes the following several steps.

Step 2901: Obtain original first microphone data.

Step 2902: Perform first-stage processing based on the first microphone data to obtain first wakeup data, where the first-stage processing includes first-stage separation processing and first-stage wakeup processing that are based on a neural network model.

Step 2903: Perform second-stage processing based on the first microphone data to obtain second wakeup data when the first wakeup data indicates that pre-wakeup succeeds, where the second-stage processing includes second-stage separation processing and second-stage wakeup processing that are based on the neural network model.

Step 2904: Determine a wakeup result based on the second wakeup data.

It should be noted that, for related descriptions of each step in this embodiment, refer to related descriptions in the foregoing method embodiments. Details are not described herein again.

The following is an apparatus embodiment of this application. The apparatus may be configured to perform the method embodiment of this application. For details not disclosed in the apparatus embodiment of this application, refer to the method embodiments of this application.

Figure 30:
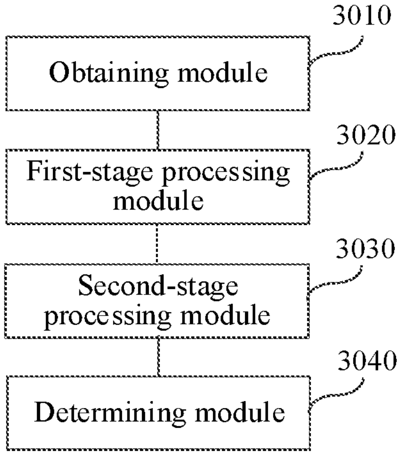
FIG. 30 is a block diagram of a voice wakeup apparatus according to an example embodiment of this application.

FIG. 30 is a block diagram of a voice wakeup apparatus according to an example embodiment of this application. The apparatus may be implemented as one or more chips by using software, hardware, or a combination thereof, may be implemented as a voice wakeup system, or may be implemented as all or a part of the electronic device provided in FIG. 2. The apparatus may include an obtaining module 3010, a first-stage processing module 3020, a second-stage processing module 3030, and a determining module 3040, where the obtaining module 3010 is configured to obtain original first microphone data;

the first-stage processing module 3020 is configured to perform first-stage processing based on the first microphone data to obtain first wakeup data, where the first-stage processing includes first-stage separation processing and first-stage wakeup processing that are based on a neural network model;

the second-stage processing module 3030 is configured to perform second-stage processing based on the first microphone data to obtain second wakeup data when the first wakeup data indicates that pre-wakeup succeeds, where the second-stage processing includes second-stage separation processing and second-stage wakeup processing that are based on the neural network model; and the determining module 3040 is configured to determine a wakeup result based on the second wakeup data.

In a possible implementation, the apparatus further includes a preprocessing module, and the first-stage processing module 3020 further includes a first-stage separation module and a first-stage wakeup module, where the preprocessing module is configured to preprocess the first microphone data to obtain multi-channel feature data;

the first-stage separation module is configured to perform first-stage separation processing based on the multi-channel feature data to output first separation data; and the first-stage wakeup module is configured to perform first-stage wakeup processing based on the multi-channel feature data and the first separation data to output the first wakeup data.

In another possible implementation, the second-stage processing module 3030 further includes a second-stage separation module and a second-stage wakeup module, where the second-stage separation module is configured to: when the first wakeup data indicates that pre-wakeup succeeds, perform second-stage separation processing based on the multi-channel feature data and the first separation data to output second separation data; and the second-stage wakeup module is configured to perform second-stage wakeup processing based on the multi-channel feature data, the first separation data, and the second separation data to output the second wakeup data.

In another possible implementation, the first-stage separation processing is streaming sound source separation processing, and the first-stage wakeup processing is streaming sound source wakeup processing; and/or the second-stage separation processing is offline sound source separation processing, and the second-stage wakeup processing is offline sound source wakeup processing.

In another possible implementation, the first-stage wakeup module includes a wakeup model in a multiple-input single-output form or a multiple-input multiple-output form; and/or the second-stage wakeup module includes a wakeup model in a multiple-input single-output form or a multiple-input multiple-output form.

In another possible implementation, the first-stage separation module and/or the second-stage separation module use/uses a dual-path conformer network structure.

In another possible implementation, the first-stage separation module and/or the second-stage separation module are/is separation modules/a separation module configured to perform at least one task, and the at least one task includes an independent sound source separation task, or includes the sound source separation task and another task; and the another task includes at least one of a sound source positioning task, a specific person extraction task, a specific direction extraction task, and a specific person determining task.

In another possible implementation, the first-stage wakeup module and/or the second-stage wakeup module are/is wakeup modules/a wakeup module configured to perform at least one task, and the at least one task includes an independent wakeup task, or includes the wakeup task and another task; and the another task includes at least one of a sound source positioning task, a specific person extraction task, a specific direction extraction task, and a specific person determining task.

In another possible implementation, the first-stage separation module includes a first-stage multi-feature fusion model and a first-stage separation model, and the first-stage separation module is further configured to:

input the multi-channel feature data into the first-stage multi-feature fusion model to output first single-channel feature data; and input the first single-channel feature data into the first-stage separation model to output the first separation data.

In another possible implementation, the second-stage separation module includes a second-stage multi-feature fusion model and a second-stage separation model, and the second-stage separation module is further configured to:

input the multi-channel feature data and the first separation data into the second-stage multi-feature fusion model to output second single-channel feature data; and input the second single-channel feature data into the second-stage separation model to output the second separation data.

In another possible implementation, the first-stage wakeup module includes a first wakeup model in a multiple-input single-output form, where the first-stage wakeup module is further configured to:

input the multi-channel feature data and the first separation data into the first-stage wakeup model to output the first wakeup data, where the first wakeup data includes a first confidence level, and the first confidence level indicates a probability that the original first microphone data includes a preset wakeup keyword.

In another possible implementation, the first-stage wakeup module includes a first wakeup model in a multiple-input multiple-output form and a first post-processing module, where the first-stage wakeup module is further configured to:

input the multi-channel feature data and the first separation data into the first wakeup model to output phoneme sequence information respectively corresponding to a plurality of pieces of sound source data; and input the phoneme sequence information respectively corresponding to the plurality of pieces of sound source data into the first post-processing module to output the first wakeup data, where the first wakeup data includes second confidence levels respectively corresponding to the plurality of pieces of sound source data, and the second confidence level indicates an acoustic feature similarity between the sound source data and a preset wakeup keyword.

In another possible implementation, the second-stage wakeup module includes a second wakeup model in a multiple-input single-output form, where the second-stage wakeup module is further configured to:

input the multi-channel feature data, the first separation data, and the second separation data into the second-stage wakeup model to output the second wakeup data, where the second wakeup data includes a third confidence level, and the third confidence level indicates a probability that the original first microphone data includes the preset wakeup keyword.

In another possible implementation, the second-stage wakeup module includes a second wakeup model in a multiple-input multiple-output form and a second post-processing module, where the second-stage wakeup module is further configured to:

input the multi-channel feature data, the first separation data, and the second separation data into the second-stage wakeup model to output the phoneme sequence information respectively corresponding to the plurality of pieces of sound source data; and input the phoneme sequence information respectively corresponding to the plurality of pieces of sound source data into the second post-processing module to output the second wakeup data, where the second wakeup data includes fourth confidence levels respectively corresponding to the plurality of pieces of sound source data, and the fourth confidence level indicates the acoustic feature similarity between the sound source data and the preset wakeup keyword.

It should be noted that, when the apparatus provided in the foregoing embodiment implements functions of the apparatus, division of the foregoing functional modules is merely used as an example for description. During actual application, the foregoing functions may be allocated to different functional modules for implementation based on a requirement. To be specific, an internal structure of a device is divided into different functional modules, to implement all or some of the functions described above. In addition, the apparatus provided in the foregoing embodiments and the method embodiments belong t0 a same concept. For a specific implementation process of the apparatus, refer to the method embodiments. Details are not described herein again.

An embodiment of this application provides an electronic device. The electronic device includes a processor and a memory configured to store instructions that can be executed by the processor. The processor is configured to implement the foregoing method performed by the electronic device when executing the instructions.

An embodiment of this application provides a computer program product, including computer-readable code or a non-volatile computer-readable storage medium carrying the computer-readable code. When the computer-readable code is run in a processor of an electronic device, the processor in the electronic device performs the foregoing method performed by the electronic device.

An embodiment of this application provides a voice wakeup system. The voice wakeup system is configured to perform the foregoing method performed by an electronic device.

An embodiment of this application provides a non-volatile computer-readable storage medium. The non-volatile computer-readable storage medium stores computer program instructions. When the computer program instructions are executed by a processor, the method performed by the electronic device is implemented.

The computer-readable storage medium may be a tangible device that may retain and store instructions used by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage medium include a portable computer disk, a hard disk, a random access memory (RAM), a read-only memory (ROM), an erasable programmable read-only memory (EPROM, or flash memory), a static random access memory (SRAM), a portable compact disc read-only memory (CD-ROM), a digital video disc (DVD), a memory stick, a floppy disk, a mechanical coding device like a punching card or a groove protrusion structure that stores instructions, and any suitable combination thereof.

Computer-readable program instructions or code described herein may be downloaded from the computer-readable storage medium to each computing/processing device, or downloaded to an external computer or an external storage device over a network, for example, the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instructions from the network, and forwards the computer-readable program instructions for storage in the computer-readable storage medium in each computing/processing device.

The computer program instructions used to perform operations in this application may be assembly instructions, instruction set architecture (ISA) instructions, machine instructions, machine-related instructions, microcode, firmware instructions, status setting data, or source code or target code written in one or any combination of a plurality of programming languages. The programming language includes an object-oriented programming language, for example, Smalltalk or C++, and a conventional procedural programming language, for example, a "C" language or a similar programming language. The computer-readable program instructions may be executed completely on a user computer, executed partially on the user computer, executed as a standalone software package, executed partially on the user computer and partially on a remote computer, or executed completely on the remote computer or a server. When the remote computer is involved, the remote computer may be connected to the user computer over any type of network, including a local area network (LAN) or a wide area network (WAN), or may be connected to an external computer (for example, connected by using an Internet service provider over the Internet). In some embodiments, an electronic circuit, for example, a programmable logic circuit, a field programmable gate array (FPGA), or a programmable logic array (PLA), is customized by using status information of the computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by the computer-readable program instructions.

These computer-readable program instructions may be provided to a general-purpose computer, a dedicated computer, or a processor of another programmable data processing apparatus to produce a machine, so that when executed by the computer or the processor of the another programmable data processing apparatus, the instructions generate an apparatus for implementing functions/actions specified in one or more blocks in the flowcharts and/or the block diagrams. Alternatively, the computer-readable program instructions may be stored in a computer-readable storage medium. The instructions enable the computer, the programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, the computer-readable program instructions may be loaded onto the computer, the another programmable data processing apparatus, or another device, so that a series of operation steps are performed on the computer, the another programmable data processing apparatus, or the another device to generate a computer-implemented process. Therefore, the instructions executed on the computer, the another programmable data processing apparatus, or the another device implement functions/actions specified in one or more blocks in the flowcharts and/or the block diagrams.

The flowcharts and the block diagrams in the accompanying drawings show system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may alternatively occur in a sequence different from that marked in the accompanying drawings. For example, two consecutive blocks may actually be executed substantially in parallel, and sometimes may be executed in a reverse order. This depends on a function involved.

It should also be noted that each block in the block diagrams and/or the flowcharts and a combination of blocks in the block diagrams and/or the flowcharts may be implemented by hardware (for example, a circuit or an ASIC (application-specific integrated circuit)) that performs a corresponding function or action, or may be implemented by a combination of hardware and software, for example, firmware.

Although this application is described with reference to each embodiment, in a process of implementing this application that claims protection, a person skilled in the art may understand and implement another variation of the disclosed embodiments by viewing the accompanying drawings, disclosed content, and appended claims. In the claims, the word "comprising" does not exclude another component or another step, and "a" or "one" does not exclude a case of multiple. A single processor or another unit may implement several functions enumerated in the claims. Some measures are recorded in dependent claims that are different from each other, but this does not mean that the measures cannot be combined to generate better effect.

Embodiments of this application are described above. The foregoing descriptions are examples, are not exhaustive, and are not limited to the disclosed embodiments. Many modifications and changes are clear to a person of ordinary skill in the art without departing from the scope and spirit of the described embodiments. The selection of terms used in this specification is intended to best explain the principles of embodiments, actual application, or improvements to technologies in the market, or to enable another person of ordinary skill in the art to understand embodiments disclosed in this specification.

What is claimed is:

1. A voice wakeup method applied to an electronic device, wherein the method comprises:

obtaining first microphone data;

performing first-stage processing based on the first microphone data to obtain first wakeup data, wherein the first-stage processing comprises first-stage separation processing and first-stage wakeup processing that are based on a neural network model;

wherein the first wakeup data comprises a first confidence level, and the first confidence level indicates a probability that the first microphone data comprises a preset wakeup keyword which comprises N wakeup keywords, wherein N is a natural number;

wherein the first confidence level is an (N+1) dimensional vector in which N dimensions correspond to the N wakeup keywords; and based on the first confidence level being greater than a first threshold, the first wakeup data indicates that a pre-wakeup succeeds;

performing second-stage processing according to the first microphone data to obtain second wakeup data, based on the first wakeup data indicating that the pre-wakeup succeeds, wherein the second-stage processing comprises second-stage separation processing and second-stage wakeup processing that are based on the neural network model; and determining a wakeup result based on the second wakeup data.

2. The method according to claim 1, wherein the performing the first-stage processing based on the first microphone data to obtain the first wakeup data comprises:

preprocessing the first microphone data to obtain multi-channel feature data;

invoking, based on the multi-channel feature data, a first-stage separation module that completes training in advance to output first separation data, wherein the first-stage separation module is configured to perform first-stage separation processing; and invoking, based on the multi-channel feature data and the first separation data, a first-stage wakeup module that completes training in advance to output the first wakeup data, wherein the first-stage wakeup module is configured to perform first-stage wakeup processing.

3. The method according to claim 2, wherein the performing the second-stage processing based on the first microphone data to obtain the second wakeup data based on the first wakeup data indicating that the pre-wakeup succeeds comprises:

based on the first wakeup data indicating that the pre-wakeup succeeds, invoking, according to the multi-channel feature data and the first separation data, a second-stage separation module that completes training in advance to output second separation data, wherein the second-stage separation module is configured to perform second-stage separation processing; and invoking, based on the multi-channel feature data, the first separation data, and the second separation data, a second-stage wakeup module that completes training in advance to output the second wakeup data, wherein the second-stage wakeup module is configured to perform second-stage wakeup processing.

4. The method according to claim 2, wherein the first-stage separation module comprises a first-stage multi-feature fusion model and a first-stage separation model, and the invoking, based on the multi-channel feature data, the first-stage separation module that completes training in advance to output the first separation data comprises:

inputting the multi-channel feature data into the first-stage multi-feature fusion model to output first single-channel feature data; and inputting the first single-channel feature data into the first-stage separation model to output the first separation data.

5. The method according to claim 2, wherein the first-stage wakeup module comprises a first wakeup model in a multiple-input single-output form, and the invoking, based on the multi-channel feature data and the first separation data, the first-stage wakeup module that completes training in advance to output the first wakeup data comprises:

inputting the multi-channel feature data and the first separation data into a first-stage wakeup model to output the first wakeup data.

6. The method according to claim 2, wherein the first-stage wakeup module comprises a first wakeup model in a multiple-input multiple-output form and a first post-processing module, and the invoking, based on the multi-channel feature data and the first separation data, the first-stage wakeup module that completes training in advance to output the first wakeup data comprises:

inputting the multi-channel feature data and the first separation data into the first wakeup model to output phoneme sequence information respectively corresponding to a plurality of pieces of sound source data; and inputting the phoneme sequence information respectively corresponding to the plurality of pieces of sound source data into the first post-processing module to output the first wakeup data, wherein the first wakeup data comprises second confidence levels respectively corresponding to the plurality of pieces of sound source data, and the second confidence levels indicate an acoustic feature similarity between the sound source data and a preset wakeup keyword.

7. A voice wakeup apparatus, wherein the apparatus comprises:

a processor; and a memory, configured to store instructions to be executed by the processor, wherein upon executing the instructions, the processor is configured to implement the following:

obtaining first microphone data;

performing first-stage processing based on the first microphone data to obtain first wakeup data, wherein the first-stage processing comprises first-stage separation processing and first-stage wakeup processing that are based on a neural network model;

wherein the first wakeup data comprises a first confidence level, and the first confidence level indicates a probability that the first microphone data comprises a preset wakeup keyword which comprises N wakeup keywords, wherein N is a natural number;

wherein the first confidence level is an (N+1) dimensional vector in which N dimensions correspond to the N wakeup keywords; and based on the first confidence level being greater than a first threshold, the first wakeup data indicates that a pre-wakeup succeeds;

performing second-stage processing according to the first microphone data to obtain second wakeup data, based on the first wakeup data indicating that the pre-wakeup succeeds, wherein the second-stage processing comprises second-stage separation processing and second-stage wakeup processing that are based on the neural network model; and determining a wakeup result based on the second wakeup data.

8. The apparatus according to claim 7, wherein upon executing the instructions, the processor is further configured to implement the following:

preprocessing the first microphone data to obtain multi-channel feature data;

performing first-stage separation processing based on the multi-channel feature data to output first separation data; and performing first-stage wakeup processing based on the multi-channel feature data and the first separation data to output the first wakeup data.

9. The apparatus according to claim 8, wherein upon executing the instructions, the processor is further configured to implement the following:

based on the first wakeup data indicating that the pre-wakeup succeeds, performing second-stage separation processing based on the multi-channel feature data and the first separation data to output second separation data; and performing second-stage wakeup processing based on the multi-channel feature data, the first separation data, and the second separation data to output the second wakeup data.

10. The apparatus according to claim 9, wherein the first-stage separation processing is streaming sound source separation processing, and the first-stage wakeup processing is streaming sound source wakeup processing; and/or the second-stage separation processing is offline sound source separation processing, and the second-stage wakeup processing is offline sound source wakeup processing.

11. The apparatus according to claim 9, further comprising:

at least one wakeup model in a multiple-input single-output form or a multiple-input multiple-output form.

12. The apparatus according to claim 9, wherein a dual-path conformer network structure is used.

13. The apparatus according to claim 8, further comprising: a first-stage multi-feature fusion model and a first-stage separation model, wherein the first-stage separation model is further configured to:

input the multi-channel feature data into the first-stage multi-feature fusion model to output first single-channel feature data; and input the first single-channel feature data into the first-stage separation model to output the first separation data.

14. The apparatus according to claim 8, wherein a first-stage wakeup module comprises a first wakeup model in a multiple-input single-output form, wherein upon executing the instructions, the processor is further configured to implement the following:

inputting the multi-channel feature data and the first separation data into the first-stage wakeup module to output the first wakeup data.

15. The apparatus according to claim 8, further comprising: a first wakeup model in a multiple-input multiple-output form and a first post-processing device, wherein upon executing the instructions, the processor is further configured to implement the following:

inputting the multi-channel feature data and the first separation data into the first wakeup model to output phoneme sequence information respectively corresponding to a plurality of pieces of sound source data; and inputting the phoneme sequence information respectively corresponding to the plurality of pieces of sound source data into the first post-processing device to output the first wakeup data, wherein the first wakeup data comprises second confidence levels respectively corresponding to the plurality of pieces of sound source data, and the second confidence level indicates an acoustic feature similarity between the sound source data and a preset wakeup keyword.

16. The apparatus according to claim 9, further comprising a second wakeup model in a multiple-input single-output form, wherein upon executing the instructions, the processor is further configured to implement the following:

inputting the multi-channel feature data, the first separation data, and the second separation data into a second-stage wakeup model to output the second wakeup data, wherein the second wakeup data comprises a third confidence level, and the third confidence level indicates a probability that the first microphone data comprises the preset wakeup keyword.

17. The apparatus according to claim 9, further comprising a second wakeup model in a multiple-input multiple-output form and a second post-processing device, wherein upon executing the instructions, the processor is further configured to implement the following:

inputting the multi-channel feature data, the first separation data, and the second separation data into a second-stage wakeup model to output phoneme sequence information respectively corresponding to a plurality of pieces of sound source data; and inputting the phoneme sequence information respectively corresponding to the plurality of pieces of sound source data into the second post-processing device to output the second wakeup data, wherein the second wakeup data comprises fourth confidence levels respectively corresponding to the plurality of pieces of sound source data, and the fourth confidence level indicates an acoustic feature similarity between the sound source data and the preset wakeup keyword.

18. A non-transitory computer-readable storage medium, wherein the non-transitory computer-readable storage medium stores computer program instructions, and upon the computer program instructions being executed by a processor, the processor is configured to implement the following:

obtaining first microphone data;

performing first-stage processing based on the first microphone data to obtain first wakeup data, wherein the first-stage processing comprises first-stage separation processing and first-stage wakeup processing that are based on a neural network model;

wherein the first wakeup data comprises a first confidence level, and the first confidence level indicates a probability that the first microphone data comprises a preset wakeup keyword which comprises N wakeup keywords, wherein N is a natural number;

wherein the first confidence level is an (N+1) dimensional vector in which N dimensions correspond to the N wakeup keywords; and based on the first confidence level being greater than a first threshold, the first wakeup data indicates that a pre-wakeup succeeds;

performing second-stage processing according to the first microphone data to obtain second wakeup data, based on the first wakeup data indicating that the pre-wakeup succeeds, wherein the second-stage processing comprises second-stage separation processing and second-stage wakeup processing that are based on the neural network model; and determining a wakeup result based on the second wakeup data.

19. A voice wakeup system, wherein the voice wakeup system is configured to perform the method according to claim 1.

20. The non-transitory computer-readable storage medium according to claim 18, wherein the performing the first-stage processing based on the first microphone data to obtain the first wakeup data comprises:

preprocessing the first microphone data to obtain multi-channel feature data;

invoking, based on the multi-channel feature data, a first-stage separation module that completes training in advance to output first separation data, wherein the first-stage separation module is configured to perform first-stage separation processing; and invoking, based on the multi-channel feature data and the first separation data, a first-stage wakeup module that completes training in advance to output the first wakeup data, wherein the first-stage wakeup module is configured to perform first-stage wakeup processing.

* * * * *